United States Patent [19]

Itatani

[11] Patent Number: 5,202,411
[45] Date of Patent: Apr. 13, 1993

[54] TRI-COMPONENT POLYIMIDE COMPOSITION AND PREPARATION THEREOF

[75] Inventor: Hiroshi Itatani, Chiba, Japan

[73] Assignee: W. R. Grace & Co.-Conn., New York, N.Y.

[21] Appl. No.: 679,963

[22] Filed: Apr. 3, 1991

[30] Foreign Application Priority Data

Apr. 6, 1990 [JP] Japan .................................. 2-91946
Oct. 8, 1990 [JP] Japan .................................. 2-270334

[51] Int. Cl.⁵ .................... C08C 69/26; C08C 73/10
[52] U.S. Cl. .................................. 528/353; 528/125;
528/126; 528/128; 528/170; 528/172; 528/173;
528/179; 528/183; 528/185; 528/188; 528/220;
528/229; 528/350; 528/351; 428/473.5
[58] Field of Search ............... 528/353, 350, 170, 172,
528/179, 183, 188, 185, 220, 229, 351, 125, 128,
126, 173; 428/473.5

[56] References Cited

U.S. PATENT DOCUMENTS

| | | | |
|---|---|---|---|
| 4,440,643 | 4/1984 | Makino et al. | 428/473.5 |
| 4,485,234 | 11/1984 | Makino et al. | 528/329 |
| 4,590,258 | 5/1986 | Linde et al. | 528/189 |
| 4,778,872 | 10/1988 | Sasaki et al. | 528/176 |
| 4,795,798 | 1/1989 | Tamai et al. | 528/185 |
| 4,883,718 | 11/1989 | Ohta et al. | 428/473.5 |
| 4,904,758 | 2/1990 | Kunimune et al. | 528/353 |
| 4,912,197 | 3/1990 | Hayes | 528/353 |
| 4,931,531 | 6/1990 | Tamai et al. | 528/125 |
| 4,931,539 | 6/1990 | Hayes | 528/125 |
| 4,933,132 | 6/1990 | Vora | 528/185 |
| 4,960,824 | 10/1990 | Olson et al. | 524/600 |
| 4,978,594 | 12/1990 | Bruce et al. | 430/14 |

FOREIGN PATENT DOCUMENTS

| | | |
|---|---|---|
| 51-34300 | 3/1976 | Japan . |
| 60-166326 | 8/1985 | Japan . |
| 61-296031 | 12/1986 | Japan . |
| 62-25405 | 2/1987 | Japan . |
| 63-66852 | 3/1988 | Japan . |
| 63-314242 | 12/1988 | Japan . |
| 1-1494 | 1/1989 | Japan . |
| 1-5056 | 1/1989 | Japan . |
| 1-16835 | 1/1989 | Japan . |
| 1-21165 | 4/1989 | Japan . |
| 1-96220 | 4/1989 | Japan . |
| 1-261422 | 10/1989 | Japan . |
| 1-54365 | 11/1989 | Japan . |
| 2-91124 | 3/1990 | Japan . |
| 2-97527 | 4/1990 | Japan . |

OTHER PUBLICATIONS

"New Heat-Resistant Resins", by Lee, Stoffey and Neville, Tokyo Kagaku Kojin K.K., pp. 216–227. (Copy of original English text enclosed).
CA 104(10): 69916m.
CA 104(18): 150052y.
CA 104(10): 69915k.
CA 92(24): 199243j.
CA 93(10): 96136t.

*Primary Examiner*—John Kight, III
*Assistant Examiner*—P. Hampton-Hightower
*Attorney, Agent, or Firm*—Valerie E. Looper

[57] ABSTRACT

A tri-component polyimide copolymer and the process of preparing the copolymer are disclosed. A mixed reaction medium or solvent system comprising phenol and at least one compound of resorcinol, 1,6-dimethyl phenol and 4-methoxy phenol is used to produce the copolymer by direct imidization without isolating or purifying the imide oligomer as an intermediate.

23 Claims, 22 Drawing Sheets

FIG. 2-(a)-1
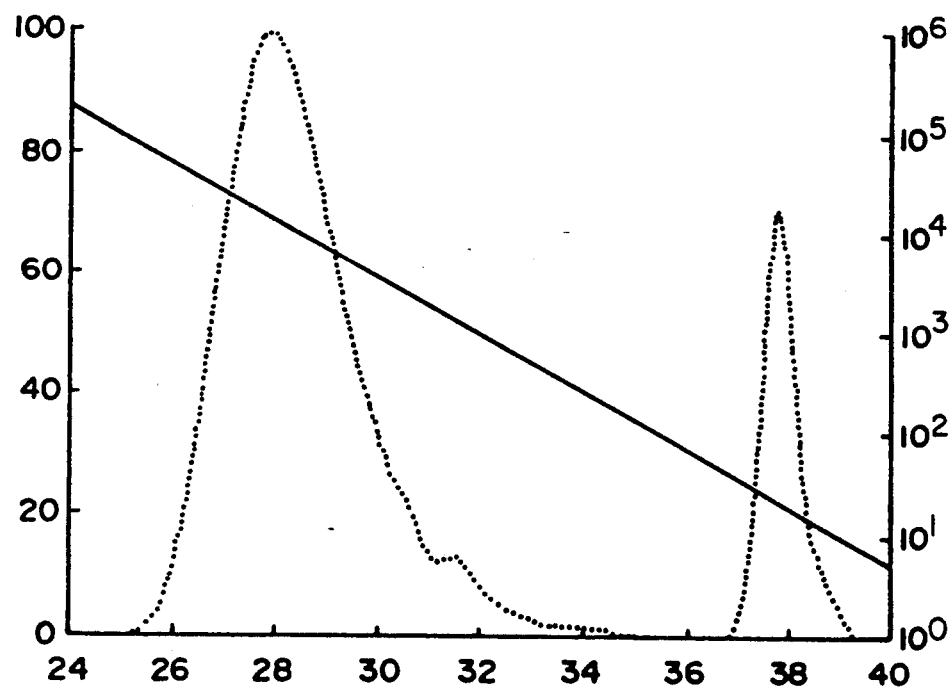
FIG. 2-(a)-2
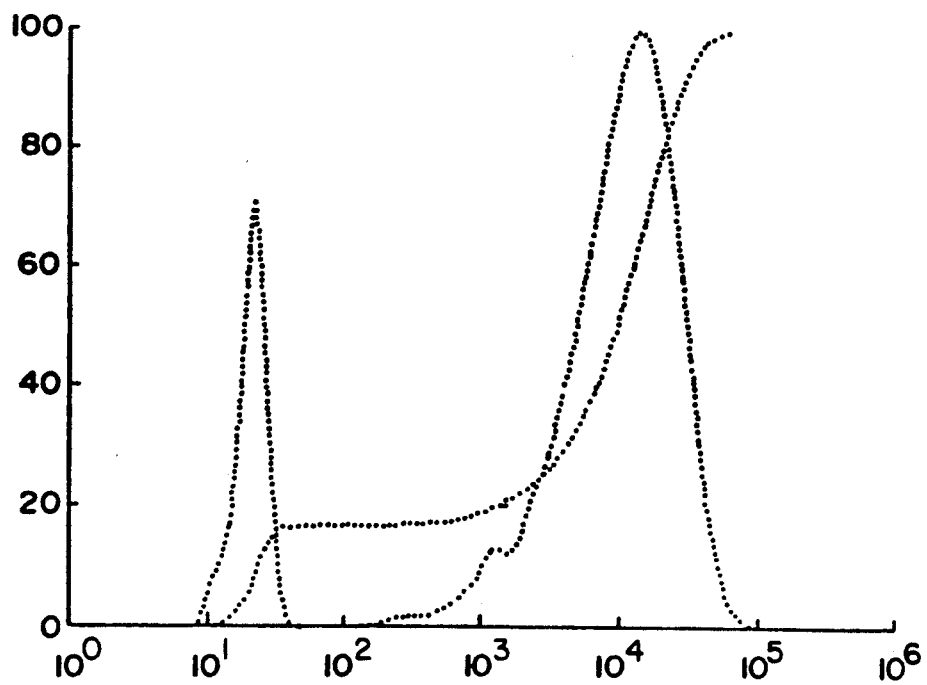

FIG. 2-(b)-1
A(9mols) + B(10mols) ⟶ (A-B)n
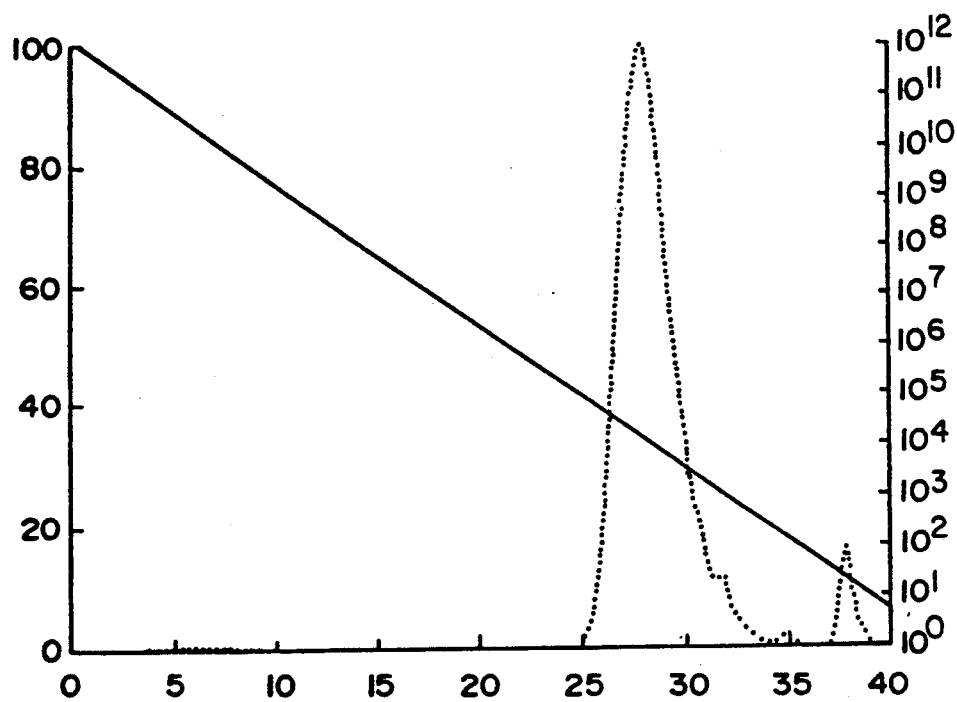
FIG. 2-(b)-2
A(9mols) + B(10mols) ⟶ (A-B)n
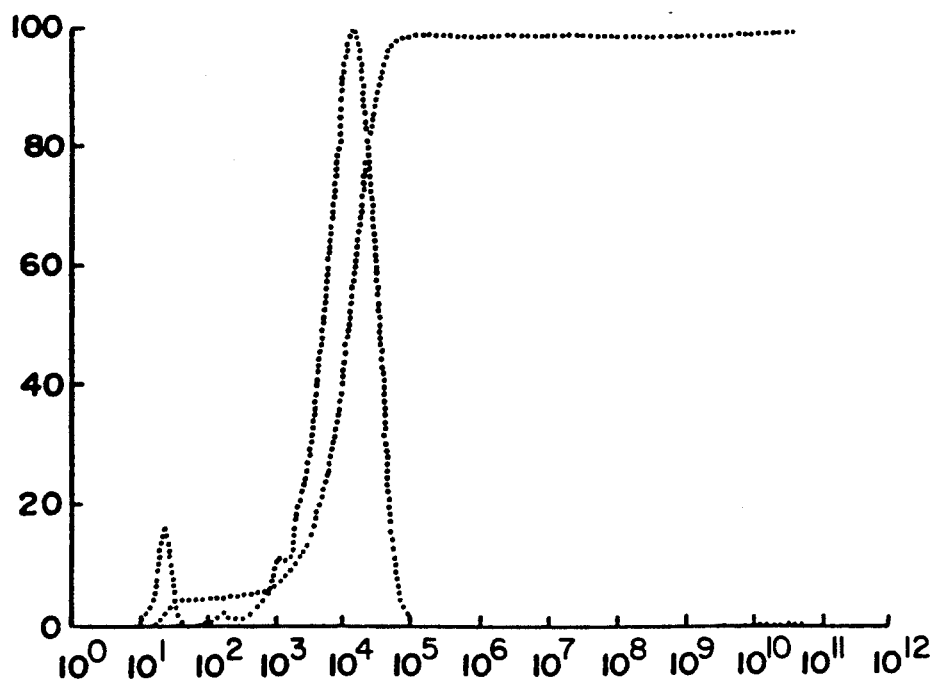

TRI-COMPONENT POLYIMIDE COMPOSITION AND PREPARATION THEREOF

FIELD OF THE INVENTION

This invention relates to new tri-component polyimide resins, and their method of manufacture. More specifically, it relates to a method of making polyimide resins having selected physical characteristics. Selected tetracarboxylic acid derivatives are reacted with diamines in a new phenolic solvent mixture. A tri-component polyimide composition is formed by reacting two molar equivalents of a tetracarboxylic acid derivative and less than one molar equivalent of diamine to form an imide intermediate, and then the intermediate is reacted with an amine. The resulting polyimide resins can be tailored to exhibit the more optimal traits of their various components, as opposed to average values.

BACKGROUND OF THE INVENTION

Polyimide resins have Outstanding thermal resistance and solvent stability, as well as good mechanical strength and tensile properties. They are used in wide areas, such as photographic films, insulation materials for heavy electrical equipment, carrier tapes, and heat-insulating laminating materials in aircraft and spaceships. They are also used as the matrix resin in varnish, tape, adhesives and fiberreinforced composite materials.

Current research and development work attempts to create new types of polyimides that have advantages in addition to the known polyimide properties. In particular materials which can be used to make films having excellent dimensional stability and dimensional accuracy are highly desirable. Other properties which are being sought include excellent storage stability, moldability and improved impact resistance. Polyimide resins exhibiting such traits could be used for the preparation of highly selective separation membranes or heat resistant adhesives.

Generally, polyimides are made by mixing equal mols of highly pure acid dianhydride and aromatic diamine, running a polycondensation reaction in a polar solvent at low temperature to form a high molecular weight polyamic acid, followed by casting the polyamic acid solution, and finally running a dehydration/ring closure reaction by heating or by chemical treatment such as by addition of acetic anhydride ["New Heat-resistant Resins," by Lee, Stoffey and Neville, published by Tokyo Kagaku Dōjin K.K., page 216].

The polyamic acid formed as an intermediate in this method is unstable upon heating. Imidization takes place along with the formation of water. The formed water is known to act on the polyamic acid, enhance hydrolysis of polyamic acid, and cut the molecular chain to form lower molecular weight polyamic acids. In order to prepare a polyimide that has high performance and high molecular weight, a method of preparation of a high molecular weight polyamic acid at room temperature or a lower temperature is generally used.

Generally, the high molecular weight polyamic acid intermediate is soluble in polar solvents such as N-methyl pyrrolidone ("NMP") or dimethylformamide and so on, but is insoluble in nearly all of other solvents. For this reason, a two-step synthetic process for preparation of polyimide via polyamic acid is often used.

On the other hand, phenolic solvents, particularly 4-chlorophenol, can dissolve a certain type of polyimides. Therefore, polyimide has been prepared in one step using this solvent, without going through the polyamic acid intermediate [Japanese Patent Publication (Kokoku) SHO 62-25405 (1987)].

And, since some polyimides are soluble in N-methyl-pyrrolidone, dimethylformamide, nitrobenzene and m-cresol, a high molecular weight polyamic acid can be prepared in such solvent, and then the high molecular weight polyamic acid is treated chemically to obtain a polyimide resin composition dissolved in the solvent. Particularly when cresol or nitrobenzene was used, the formed water is removed from the reaction system by azeotropic distillation to obtain a high molecular weight polyimide resin composition of a type which is soluble in the solvent [Japanese Patent Publication (Kokoku) SHO 64-1494 (1989)].

The above-described polyimides are two-component homopolymers. Physical and chemical properties of homopolymers can be regulated by the properties of the two components that constitute such homopolymers. Homopolymers having poor mechanical strength are improved by treating with homopolymers that have entirely different types of components. With the tricomponent polyimide resin composition, a deficiency in mechanical strength may be corrected by adding yet another component. Thus, the resin can be modified to suit a desired application by complementing an inferior properties while retaining its original function.

Polyimide resins made from three or more components are conventionally prepared by a random copolymerization process or by a block copolymerization process.

Normally, tri-component polyimides are prepared by a random copolymerization process where three components are mixed and polycondensed at the same time to form a resin. In Japanese Patent Publication (Kokoku) SHO 63-66852 (1988), two different types of diamines and an acid dianhydride are mixed together at the same time to form a high molecular weight polyamic acid, and then heated or chemically treated to acquire a polyimide with modified physical properties: softness, resiliency, flexibility and elongation to film or fibers. In Japanese Patent Publication (Kokai) SHO 61-296031 (1986), a tri-component random copolymer has been prepared for a purpose of improving the softness, resiliency, workability and melt flow properties. In Japanese Patent Publication (Kokai) SHO 63-314242 (1988), which discloses a method for preparation of polyimide having acceptable dimensional stability, diamine A and 40-90 mol % of acid dianhydride are reacted to prepare an amic acid prepolymer, and then 90-10 mol %, relative to the total diamine components, of diamine B is added to prepare a solution of the polyamic acid copolymer, and this solution is cast or coated to form a film which is then dried and heated or chemically treated to dehydrate/close the ring/imidize the amic acid copolymer, to form a polyimide copolymer membrane. And, in Japanese Patent Publication (Kokai), HEI 1-96220 (1989), two types of diamines are mixed with an acid dianhydride, and then they are imidized and condensed in one step to obtain a random copolymer that can serve as a copolymer resin with outstanding moldability and has an excellent balance of heat resistance and mechanical properties.

Polyimide resins made of three components or more can be prepared easily by the random copolymerization process. However, control of the final product character is not easily achieved. Particularly when a two-step poly-condensation process that goes through polyamic acid is adopted and the conventional polyimide preparation method is employed, the high molecular weight polyamic acid intermediate is unstable against heat. Hydrolysis by the formed water is enhanced to cause fission of the molecular chains, which may recondense at the imidization stage to enhance the polymer's randomness. Furthermore, it is known that 15 the high molecular weight polyamic acid intermediate can undergo exchange of acid amide groups among molecules easily and quickly. Therefore, the polyimide resins that went through a polyamic acid intermediate can be called polyimides that have a random character. This random copolymer is noted as having inferior physical and chemical properties as opposed to alternate copolymers or block copolymers. This has been attributed to the appearance of the average properties of the formed copolymer, which is inferior to the excellent properties of each of the constitutive components.

Polyimides made by a block copolymerization process might exhibit improved physical properties compared to the random copolymers. Some block polyimides have been prepared.

In Japanese Patent Publication (Kokai) SHO 60-166326 (1985), an oligomer of sulfonamide is prepared, and then this oligomer is added with an acid dianhydride to obtain a blocking polyimide resin. This resin has improved the mechanical strength, heat resistance, resistance against heating and aging and workability. In Japanese Patent Publication (Kokaku) HEI 1-21165 (1989), 1.5-2.0 mols of an acid is added to a diamine, and the reaction is run in a polar solvent at low temperature, to synthesize an oligomer of amidic acid. If an equivalent amount of isocyanate is added to carry out the reaction, a polyimideamidecarboxylic acid is obtained, while generating carbon dioxide gas. This substance is cast and then treated with heat, to prepare a polyimide film that shows improved properties. In Japanese Patent Publication (Kokai) HEI 2-91124 (1990), an acid dianhydride is added to the copolymer of diaminosiloxane to form a block copolymer of siloxane amic acid, and then an equivalent amount of diamine is added to form a polyamic acid, and finally it is treated by heat or chemically, to prepare a block copolymer of siloxane-imide. That polyimide membrane exhibits excellent bondability to the substrate. In Japanese Patent Publication (Kokai) SHO 64-16835 (1989) and Japanese Patent Publication (Kokaku) Hei 1-21165, a method of preparing a polyimide copolymer by sequential addition process is described. Excess or deficient amount of acid dianhydride is added to the aromatic diamine and they are reacted to prepare a polyamic acid prepolymer, and then a supplementary amount of diamine is added to obtain a copolymer of polyamic acid. Finally, it is treated chemically or by heating, to prepare a polyimide copolymer. Because this process goes through an intermediate polyamic acid, the exchange reaction of the formed polyamic acid occurs, and therefore, a block polymer with random properties is formed.

And, when the resin is used as a separation membrane, the polyimide separation membrane made of three components which is a random copolymer or a block copolymer will show a decrease in its selectivity when an attempt is made to improve its separating properties. On occasion, the mechanical properties may decline also.

As to the polyamides, alternate copolymers have been prepared, as illustrated in Japanese Patent Publication (Kokai) HEI 2-97527 (1990). In Japanese Patent Publication (Kokai) SHO 51-34300 (1976), an equivalent amount of diamine is reacted with polyamidic dianhydride to prepare a polyamideimide, and thus an attempt has been made to develop new applications that take advantage of the properties of block copolymers.

SUMMARY OF THE INVENTION

This invention provides a method of preparing a tri-component polyimide resin, which is different from the conventional method of preparation of a randomly copolymerized polyimide resin or a block copolymerized polyimide resin, by which to provide a tri-component polyimide resin composition with outstanding functionality.

The two-step polycondensation process via polyamic acid, which is used for production of conventional polyimide resin, has certain disadvantages. For example, it not only forms a thermally unstable high molecular weight polyamic acid as an intermediate and causes fission of the molecular chain, but also causes an exchange reaction easily between the amidic acid group among molecules. As a result, the end product shows random copolymerization. This invention avoids those difficulties by carrying out the imidization reaction in solution by heating in one step, instead of going through the amic acid intermediate. The end product is a block copolymerized polyimide having block copolymerizability or alternate copolymerizability while excluding random copolymerizability. Furthermore, the chemical properties of the acid dianhydride and aromatic diamine are taken into consideration, and a polycondensation process by sequential addition is adopted to form an imide prepolymer at each step and the sequential polymeric imidization is repeated to prepare a block polyimide. This polyimide, unlike the conventional polyimide, is a block copolymer which is linked by block segments.

BRIEF DESCRIPTION OF THE DRAWINGS

FIG. 1-($b$) is a diagram to illustrate the results of GPC determination of imide intermediate obtained from 4 mol parts of 5FDA and 1 mol part of FDA.

FIGS. 2-($a$)-1 and 2-($a$)-2 are diagrams to illustrate the results of GPC determination of the imide intermediate obtained from 10 mol parts of 6FDA and 9 mol parts of FDA.

FIGS. 2-($b$)-1 and 2-($b$)-2 are diagrams to illustrate the results of GPC determination of the imide intermediate obtained from 9 mol parts of 6 FDA and 10 mol parts of FDA.

FIGS. 2-($a$)-1 and 2-($b$)-1 are calibration curves and elution curves and FIGS. 2-($a$)-2 and 2-($b$)-2 are differential and integral molecular weight distribution curves.

DETAILED DESCRIPTION OF THE INVENTION

1. Selection of Reaction Medium

Figure 1A:
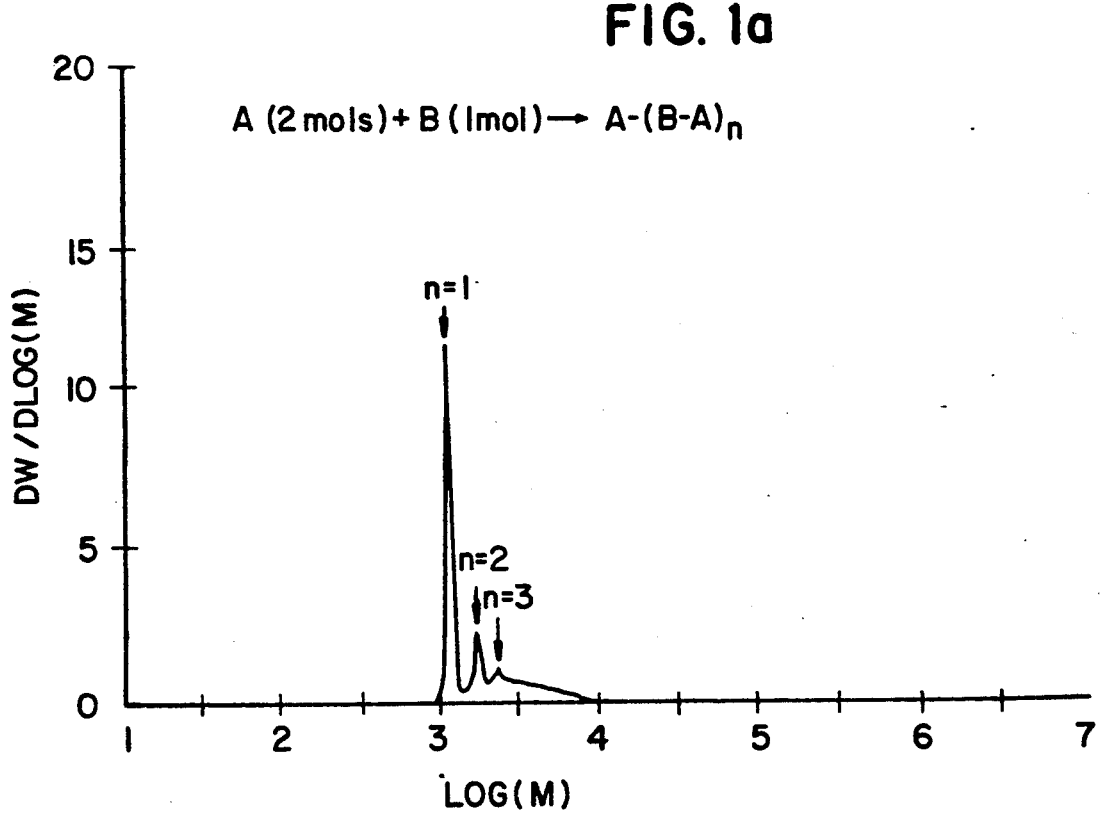
FIG. 1-($a$) is a diagram to illustrate the results of GPC determination of imide intermediate obtained from 2 mol parts of 6FDA and 1 mol part of FDA.

Generally speaking, because polyimides are 15 insoluble in organic solvents, they are prepared by a two-step polycondensation process using a polar solvent such as N-methyl-pyrrolidone or dimethylformamide and so on. First, in order to form a high molecular weight polyamic acid as an intermediate, substantially equal mols of a highly pure acid dianhydride and a highly pure diamine are used, as well as a solvent which has been carefully dehydrated and purified. The intermediate, polyamic acid, is unstable against heat and can easily undergo an exchange reaction. For that reason, the polycondensation reaction has to be carefully carried out at room temperature or at a temperature lower than room temperature.

An advantage of the preparation method to be used in this invention is that a high molecular weight polyimide can be obtained by shifting the equilibrium easily through elimination of formed water from the reaction system. Another advantage is that it is not accompanied by the exchange reaction or the depolymerization caused by dehydration of the polyamic acid intermediate. The polyimide is thermally stable, and the decomposition or exchange reaction can hardly occur. The reaction medium to be used has to be able to dissolve a high molecular weight polyimide, have weak hydrophilicity so that it can be easily separated from water, and low a boiling point to allow the reaction medium to be evaporated and removed.

While p-chlorophenol or m-cresol can be used as the reaction medium for a certain type of polyimide, environmental protection measures must be used. These include using a specially sealed system to prevent emission of the reaction medium, because the reaction medium is toxic. A drawback of m-cresol is that it does not dissolve many high molecular weight polyimides.

This invention includes the use of a new phenolic reaction medium mixture.

This invention is characterized by using a reaction medium comprising phenol and at least one compound selected from the group consisting of a benzene substituted with two hydroxyl groups, a phenol substituted with one or two $C_{1-3}$ alkyl groups and a phenol substituted with one $C_{1-3}$ alkoxy group.

Examples of such phenolic reaction media include phenol/4-methoxyphenol, phenol/2,6-dimethylphenol, phenol/resorcinol, phenol/4-methoxyphenol/resorcinol and phenol/2,6-dimethylphenol/resorcinol.

Illustrated in the following Table 1 is a pertinent properties of the new phenolic reaction media to be used in this invention. Phenol, 4-methoxyphenol, 2,6-dimethylphenol and resorcinol have a high melting point and are in a crystalline form at room temperature. When they are mixed appropriately, they show melting point depression to become a liquid at room temperature. The phenol/4-methoxyphenol mixture becomes a liquid at room temperature if the mixing weight ratio remains in the 70/30–40/60 range. The phenol/2,6-dimethylphenol mixture becomes a liquid at room temperature if the mixing weight ratio remains in 60/40–40/60 range. And the phenol/resorcinol mixture remains in a semi-molten state at room temperature if the mixing weight ratio remains in a 70/30–40/60 range. It has now been discovered that the phenolic reaction media having a mixing weight ratio in this range can dissolve a high molecular weight polyimide. It has also been discovered that the tri-component reaction medium containing 1–4 parts by weight of resorcinol and parts by weight of phenol/4-methoxyphenol mixture (weight ratio=70/30–40/60) is a liquid at room temperature, and particularly the phenol/4-methoxyphenol/resorcinol mixture having a weight ratio of 7:3:3 has a melting point of −2° C. and could dissolve a particularly insoluble high molecular weight polyimide. Finally, the tri-component reaction medium comprising 1–4 parts by weight of resorcinol and 10 parts by weight of phenol/2,6-dimethylphenol (weight ratio=60/40-40/60) is a liquid at room temperature, and particularly the phenol/2,6-dimethylphenol/ resorcinol mixture having a weight ratio of 6:4:3 has a melting point lower than −18° C. and can dissolve a particularly difficult high molecular weight polyimide resin, which proved to be insoluble in NMP.

When an acid dianhydride component and an aromatic diamine component are added sequentially in such quantities to bring the combined amount finally to an equimolar level and heated, a polyimide composition can be obtained easily. The heating temperature is 100–250° C., preferably 140–200° C. As a result, a polyimide resin composition dissolved in the phenolic reaction medium can be obtained.

When toluene, xylene or octane is added to the reaction system, the water formed during the reaction can be distilled and removed from the reaction system by azeotropic distillation. And, if a base such as pyridine, picoline, triethylamine, methyl morpholine, or hexamethylenetetramine is added in an amount of 0.1 to 1 mol per mol of the acid dianhydride to enhance imidization, the reaction time of imidization can be reduced. Since the formed imide is chemically and thermally stable, there is no particular need to purify the reaction medium which can be used in the reaction. Thus, even if a commercial phenol is mixed and used directly, a high molecular weight polyimide composition can be obtained.

TABLE 1

| Composition of Reaction Medium | (weight ratio) | Melting point (°C.) | Boiling point (°C.) |
|---|---|---|---|
| Phenol | | 40.9 | 181.6 |
| 4-Methoxyphenol | | 55–57 | 243 |
| 2,6-Dimethylphenol | | 49.0 | 203 |
| Phenol/4-methoxyphenol | 7:3 | 15 | |
| Phenol/2,6-dimethylphenol | 6:4 | 8 | |
| Resorcinol | | 109–110 | 270 |
| Phenol/resorcinol | 7:3 | 27 | |
| Phenol/4-methoxyphenol/resorcinol | 7:3:3 | 2 | |
| Phenol/2,6-dimethyl phenol/resorcinol | 6:4:3 | Lower than −18 | |

2. Imidization/condensation process by sequential addition

In this invention, copolymerized polyimides are prepared by a one-step imidization reaction based on a sequential addition technique in order to obtain block copolymerized polyimides while excluding random copolymerization.

What needs to be considered in this case is that the aromatic tetracarboxylic acid is a strong acid and an aromatic diamine is a far weaker base than an aliphatic diamine. Therefore, the molecular weight distribution of the oligomers being formed as the imide intermediates is narrower the larger the amount of the acid. It is necessary to prepare an imide intermediate having a constant molecular weight and a narrow distribution, that is the constituent component of the imide intermediate. The imide intermediate prepared by using a large amount of an amine and a small amount of acid will have a broad molecular weight distribution. An imide intermediate formed from a large amount of acid dianhydride and a small amount of diamine will give an intermediate with a narrow width of molecular weight distribution and its terminal has an acid anhydride structure. Therefore, the tri-component polyimide composition of this invention is preferably a block polyimide composition formed by reacting about two molar equivalents of an acid dianhydride and less than about one molar equivalent of diamine to form an imide intermediate which has acid anhydride group at both ends, followed by reacting with an amine.

Japanese Patent Publication (Kokoku) No. SHO 64-5056 (1989) illustrates that the molecular weight and molecular weight distribution of the formed polyimide precursor change with the ratio and concentrations of an acid dianhydride and diamine (see Table 2).

TABLE 2

| Amine/acid mol ratio | Mol. wt. of precursor | Composition |
|---|---|---|
| 3 | 1086 | 2,4-Diaminotoluene (0.45 M) + BTDA (0.15 M) |
| 3 | 1500 | 2,4-Diaminotoluene (0.375 M) + BTDA (0.125 M) |
| 1.5 | 3100 | 3,3'-Diaminobenzophenone (0.0094 M) + BTDA (0.0063 M) |
| 1.0 | 2500 | 3,3'-Diaminodiphenylsulfone (0.0054 M) + BTDA (0.0054 M) |
| 0.81 | 4000 | 4,4'-Methylene-bis(2-ethylaniline) (0.1 M) + BTDA (0.00667 M) |

TABLE 2-continued

| Amine/acid mol ratio | Mol. wt. of precursor | Composition |
|---|---|---|
| | | (0.00667 M) |

The method of preparation of the polyimide copolymers of this invention is explained in detail, based on the reaction illustrated in the following Table 3.

When excess acid dianhydride and an aromatic diamine are reacted, the following reaction formula is established.

$$2nA + nB \rightarrow A\text{-}(B\text{-}A)_n + (n-1)A + 2nH_2O$$

wherein A is an acid dianhydride and B is an aromatic diamine.

If A exists in larger excess than B, then n is 1.

Figure 1B:
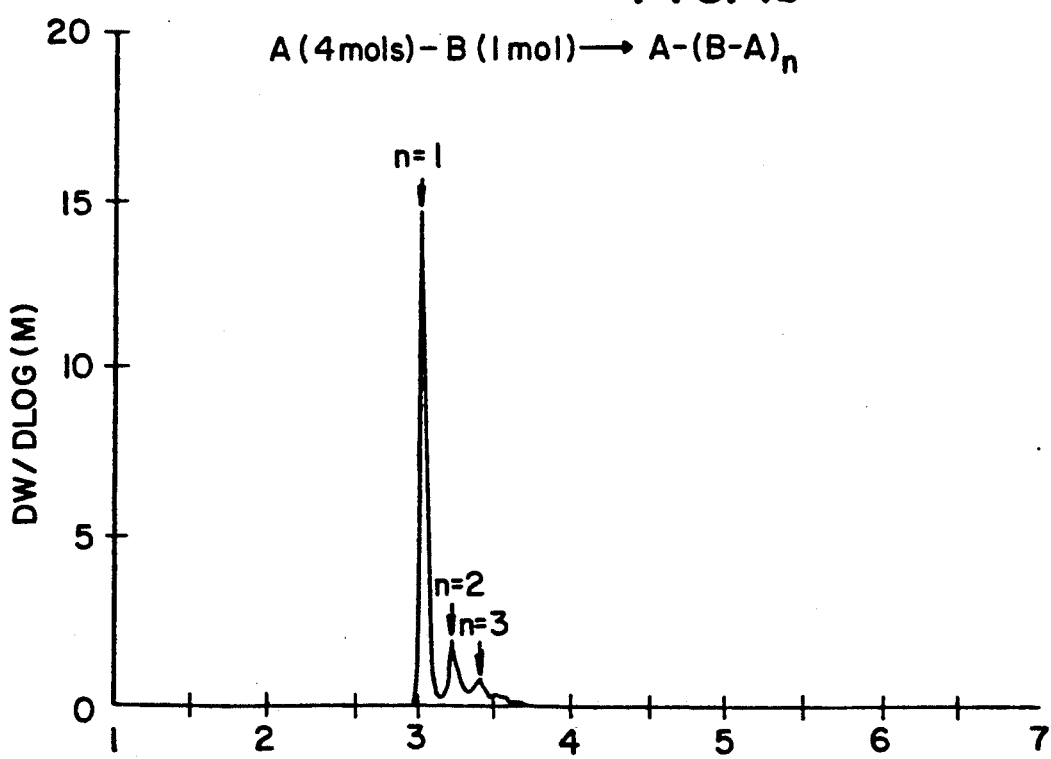

The results of GPC determination of the imide intermediate obtained from the reaction of 2 mol parts 6FDA {5,5'-[2,2,2-trifluoro-1-(trifluoromethyl)ethylidene]-bis-1,3-isobenzofuran-dione} and 1 mol part FDA [9,9-bis(4-aminophenyl)fluorene] is illustrated in FIG. 1-(a). Likewise, the result of GPC determination of the imide intermediate obtained from 4 mol parts 6FDA and 1 mol part FDA is illustrated in FIG. 1-(b). The molecular weight of the imide intermediate at n=1 is 1201.

Formation of an imide from 2 mol parts 6FDA and 1 mol part FDA for GPC determination was carried out in the following manner. 2.664 g 6FDA, 1.047 g FDA, and 45 g reaction medium consisting of phenol and 4-methylphenol (weight ratio=7:3), and 0.6 g pyridine were mixed, and this mixture was agitated at room temperature for 1 hour, at 80° C. for 2 hours and at 180° C. for 2 hours. The reaction solution was then subjected to GPC analysis. And, formation of an imide intermediate from 4 mol parts 6FDA and 1 mol part FDA for GPC analysis was carried out by reacting a mixture of 5.34 g 6FDA, 1.047 g FDA and 45 g of a reaction medium consisting of phenol and 4-methylphenol (weight ratio=7:3) in the same manner as described above, and the reaction solution thus obtained was subjected to GPC analysis.

The molecular weight data obtained from FIG. 1-(a) and FIG. 1-(b) are shown in the following table. The molecular weight is based on the standard polystyrene molecular weight.

| Sample | MN/10³ | MW/10³ | MZ/10³ | MW/MN | MZ/MW |
|---|---|---|---|---|---|
| 6FDA 2 mols + FDA 1 mol | 1.58 | 2.15 | 3.37 | 1.36 | 1.57 |
| 6FDA 4 mols + FDA 1 mol | 1.30 | 1.46 | 1.78 | 1.13 | 1.22 |

*MN: Number average molecular weight,
MW: Weight average molecular weight,
MZ: Z Average molecular weight, and
MW/MN and MZ/MW: Degrees of polydispersity.

Figure 3:
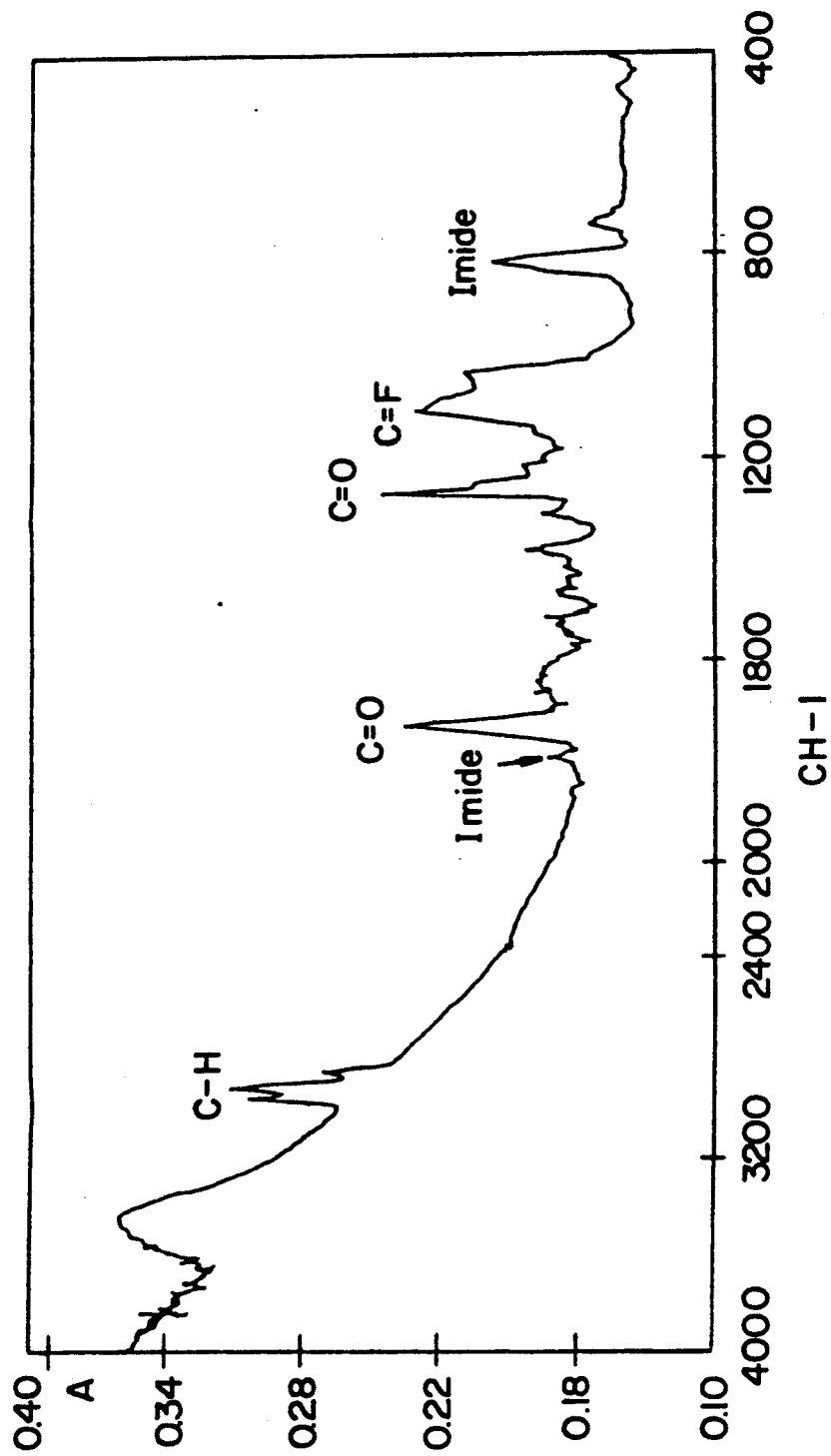
FIG. 3 is a diagram to illustrate the IR absorption spectrum obtained from analysis of the first peak shown in FIG. 1-($b$).

The infrared absorption spectrum obtained by analyzing the first peak illustrated in FIG. 1-(b) is shown in FIG. 3. The spectrum illustrated in FIG. 3 indicates that the formed product is an imide compound and both terminals are acid anhydride groups.

The imide intermediate formed from the reaction of 2 molar equivalents acid dianhydride and the 1 molar equivalent diamine is a component that has a width of n=1-4 where the n=1 component occupies 80% of the whole and the number average molecular weight is 1580. And the imide intermediate formed from the 4 molar equivalents acid dianhydride and the 1 molar equivalent diamine gives a composition having a width of n=1-4. In this case, however, the n=1 component occupies 88% of the whole and its number average molecular weight is 1300.

When a diamine C {2,2-bis[4-(4-aminophenoxy)-phenyl]hexafluoropropane}, which is the second component of the diamine, was reacted with this imide intermediate, the imide intermediate acted as a blocking agent and a polyimide of the following formula was formed.

$$[(A-B)_k-(A-C)_\mu]_h$$

wherein k is smaller than 4 and a major part of k is 1-2.

A brief outline of the procedure, and the results of a series of polycondensation reactions, are illustrated in Table 3. That table summarizes the properties of the polyimides obtained by the sequential addition polymerization process (thermal decomposition temperature determined by TG analysis, DSC data and molecular weight obtained by GPC analysis, calculated based on polystyrene).

When 2 molar equivalents of A and 1 molar equivalent of B are reacted, the average molecular weight of the imide intermediate is 1580 and this imide intermediate consists of 80% of A-B-A, the molecular weight of the polyimide acquired by reacting C with the imide intermediate (Run No. V) is 80,000. A monomeric intermediate segment (mainly n=1) is linked with the second diamine C at a molar ratio of about 1:1 to form a copolyimide. Therefore, it can be regarded as a polyimide having an alternating arrangement with random properties, where a random polymer is crosslinked by an oligomer (mainly n=1) which is the linking segment. This copolyimide consists of segments having small n and m. Comparison of Run No. V and Run No. VIII which indicates the random polymer which is not produced by the sequential addition process reveals that their properties are similar. Therefore, the sequential addition polymerization process illustrated in Example V can yield a polymer that shows a relatively random properties. However, the monomeric segment-linked polymer has a higher decomposition temperature and glass transition temperature than the random polymer, and it shows also a greater elongation when formed into a film.

In this invention, such monomeric segment-linked polymer can be expressed by the following formulae.

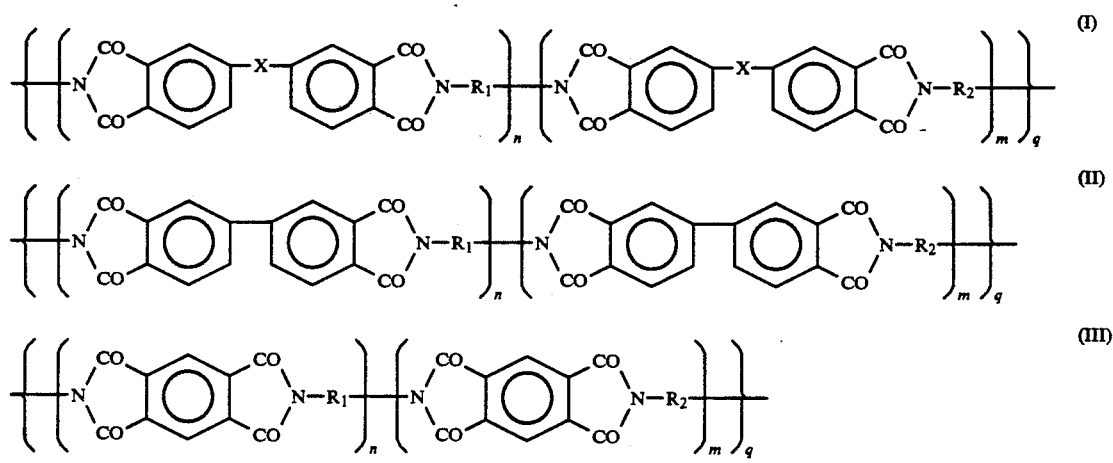

wherein $R_1$ is the first aromatic diamine whose amino groups are deleted, $R_2$ is the second aromatic diamine whose amino groups are deleted, X is a divalent group selected from the group consisting of Co, O, S, So$_2$,

and CF$_3$CCF$_3$, n is 1-4, the content of the n = 1 segment is at least 70%, m is 1-6 and q is 10-100.

The polyimide has a relatively lower molecular weight as large as 50,000-200,000, based on the standard polystyrene molecular weight.

Such a monomeric segment-linked polymer can be prepared by reacting $\frac{1}{4}$-$\frac{1}{2}$mol part of the first diamine with 1 mol part of an acid dianhydride in the first step of the reaction to directly form an imide compound and then reacting the imide compound with a second diamine in such an amount that the mol ratio of the acid dianhydride employed to the total amount of the first diamine and the second diamine is 0.95~1.05.

And when 4 molar equivalents of A and one molar equivalent of B are reacted, the number average molecular weight of the obtained imide intermediate is low (1300) as in Run No. II. A high molecular weight polyimide is obtained by the action of this linking segment. In Run No. II, the imide intermediate comprises 88% of the n=1 component and the copolymer formed has a molecular weight of 190,000. Therefore, this polymer can be postulated as to be a polyimide where k=1-3 and more than 80% of k is 1 in the formula [(A—B)$_k$-—(A—C)$\mu$]$_h$, or in other words, a polyimide where a relatively large (A-C)$\mu$ block copolymer is linked by the monomer segment (A-B)$_k$. Unlike other polymers, this polymer shows a giant endothermic phenomenon near 300° C. What needs particular attention is the fact that, when diamines having two different types of properties are used, it can cause a difference in the molecular weight and even in the properties of the polyimide, depending on the order of their addition. If this situation is explained based on the examples shown in Table 3, FDA is an amine having a bulky substituent group whose presence will increase the gas permeability. And HFBAPP is a component which is used to improve the mechanical properties (to increase the molecular weight). Thus, in Run No. 2 where the amount of HFBAPP added is large, the molecular weight is as high as 190,000. On the other hand, in Run No. 1 where the amount of HFBAPP added is small, the molecular weight is 80,000.

In this invention such monomer segment-linked block polymer can be represented by the following formulae.

weight is drastically increased without significant change in the gas permeability.

Furthermore, the two-step sequential polymerization process for the preparation of the polyimide can be improved by the three-step sequential polymerization process which is illustrated in the following formulae.

$$m_1 < m_2 (1 < \frac{m_2}{m_1} < 1.2) \quad (i)$$

$$m_1A + m_2B \longrightarrow (A - B)_{m_3} \xrightarrow{n_1A} (A - B)_{m_3} \longrightarrow$$

$$A + (n_1 - m_2)A \xrightarrow{n_2C} [(A - B)_{m_3}(A - C)_{n_3}]_q$$

$$m_1 > m_2 (1 < \frac{m_1}{m_2} < 1.25) \quad (ii)$$

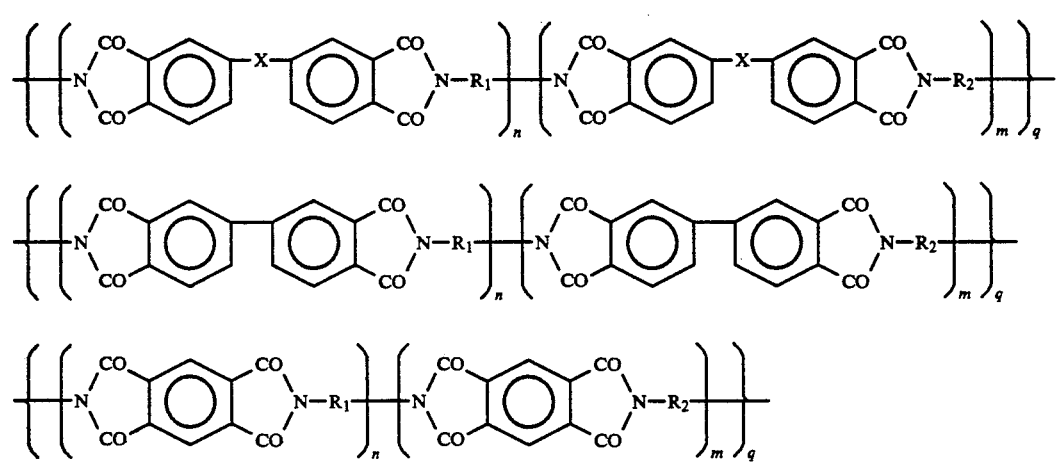

wherein $R_1$ is a first aromatic diamine whose amino groups are deleted; $R_2$ is a second aromatic diamine whose amino groups are deleted; X is a divalent group selected from the group consisting of Co, O, S, $So_2$, $CH_3CCH_3$, —OO—, and $CF_3CCF_3$; n is 1-3; the content of the n = 1 segment is higher than 80%; m is 2-20 and q is 10-100.

The molecular weight of this polyimide is 50,000-400,000, based on the standard polystyrene molecular weight. Such monomer segment-linked polymer can be prepared by reacting ⅓-½mol part of the first diamine with 1 mol part of an acid dianhydride in the first step of the reaction and reacting the imide intermediate formed with a second diamine in such an amount that the mol ratio of the acid dianhydride employed to the total amount of the first diamine employed and the second amine is 1:0.95-1.05.

Thus, it is possible to correct the structural weak point of a two-component polyimide while maintaining its function by preparing a desired oligomer segment-linked polymer in this manner.

For example, when the content of FDA is increased for the purpose of increasing the gas permeability (see, Run No. I and Run No. V), the molecular weight does not increase particularly but the permeability rate of $CO_2$ is increased 1.5-fold without substantial decrease in the selectivity. Also, when the content of HFBAPP is increased for the purpose of increasing the mechanical strength (see Run No. II and Run No. V), the molecular $$m_1A + m_2B \longrightarrow (A - B)_{m_3} \xrightarrow{n_1C} C - (A - B)_{m_3} +$$

$$(n_1 - m_3)C \xrightarrow{n_2A} [(A - B)_{m_3}(A - C)_{n_3}]_q$$

$$[m_1 + n_1 = m_2 + n_2 \text{ in (i) and (ii)}]$$

A brief outline of the above-described reaction and its results are illustrated in Run No. II and Run No. IV of Table 3. A block polymer is obtained by this three-step sequential polycondensation reaction. The characteristics of this block polymer are its extremely high molecular weight, blocking properties, high decomposition temperature and presence of glass transition point near 300° C.

Because this polymer is made of two types of blocks, it will give an elastic polymer (block-block polymer) which has stable structure, high mechanical strength, and high elongation.

The result of GPC determination of the imide intermediate obtained from the reaction of 9 mol parts 6FDA and 10 mol parts FDA is shown in FIGS. 1-(a)-1 and 2-(a)-2. Likewise, the result of GPC determination of the imide intermediate obtained from the reaction of 10 mol parts 6FDA and 9 mol parts FDA is shown in FIGS. 2-(b)-1 and 2-(b)-2. In these cases, the imide intermediates have a relatively high molecular weight at their peaks such as 142,000 (m=18) in FIGS. 2-(a)-1 and 2-(a)-2 and 152,000 (m=20) in FIGS. 2-(b)-1 and 2-(b)-2.

Block polymer composition can be obtained by the chain extension reaction of these imide intermediates as the segments.

The imide intermediate was prepared by heating a mixture solution of 10 millimols 6FDA, 9.5 millimols FDA, 120 g M solution and 10 millimols pyridine at 140° C. for one hour and at 180° C. for two hours in a stream of nitrogen gas with stirring at a rate of 400 rpm, and the reaction solution thus obtained was subjected to GPC analysis and the results are shown in FIGS. 2-(a)-1 and 2-(a)-2. In the same manner, 9 millimols 6FDA and 10 millimols FDA were reacted to give an imide intermediate reaction solution, and the reaction solution was subjected to GPC analysis. The results are shown in FIGS. 2-(b)-1 and 20-(b)-2.

The molecular weight data obtained from FIGS. 2-(a)-1, 2-(a)-2, 2-(b)-1 and 2-(b)-2 are shown in the following table.

The molecular weight of the block-block polymer is 50,000 to 500,000, based on the standard polystyrene molecular weight.

Such block-block polymers can be prepared by reacting 10 mol parts of an acid dianhydride and 10.5–12 mol parts of the first amine to form directly an imide compound (or intermediate) in one step, reacting the imide compound formed again with 5–30 mol parts of the acid dianhydride to form an imide oligomer whose terminals are the acid anhydride groups, followed by reacting the imide oligomer with the second diamine in such an amount that the mol ratio of the total amount of the acid anhydride to the total amount of the first aromatic diamine and the second aromatic diamine is 1:0.95–1.05 to conduct direct imidization, or by reacting 10 mol parts of an acid dianhydride with 8–9.5 mol parts of the first diamine to form an imide compound (imide intermediate) directly in one step, reacting the imide compound with 5–30 mol parts of the second diamine to form an imide oligomer whose terminals are amine groups, and subsequently reacting the imide oligomer with the acid dianhydride in such an amount that the mol ratio of the total amount of the first diamine and second diamine to the total amount of the acid dianhydride employed and the acid dianhydride is 0.95–1.05:1 to conduct a direct imidization.

TABLE 2(a)

| Sample | Peak* | MN/10³ | MW/10³ | MZ/10³ | MW/MN | MZ/MW |
|---|---|---|---|---|---|---|
| 6FDA 10 mols + FDA 9 mols | 142,000 | 5.28 | 14.0 | 22.5 | 2.65 | 4.26 |
| 6FDA 4 mols + FDA 10 mols | 152,000 | 6.17 | 15.8 | 26.4 | 2.55 | 4.72 |

Peak: Maximum molecular weight in the GPC curve
*MN: Number average molecular weight,
MW: Weight average molecular weight,
MZ: Z Average molecular weight, and
MW/MN and MZ/MW: Degrees of polydispersity.
The calculated molecular weight is based on the standard polystyrene molecular weight.

In this invention, such block-block polymers can be represented by the following formula.

Run No. VI and Run No. VII illustrate a polymer

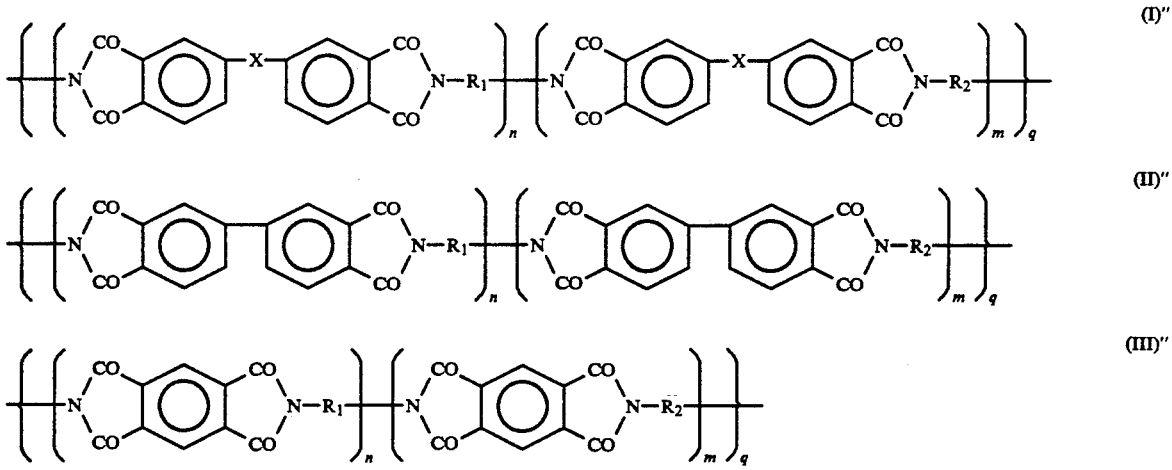

(I)"

(II)"

(III)"

wherein $R_1$ is a first aromatic diamine whose amino groups are deleted; $R_2$ is a second aromatic diamine whose amino groups are deleted; X is a divalent group selected from the group consisting of CO, O, $SO_2$, $CH_3CCH_3$, —O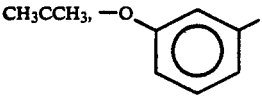O— and $CF_3CCF_3$; $5 < n$, and $m < 100$; q is 2 to 20.

TABLE 3

| Ex. No. | Run No. | Method of reaction | inh | Molecular weight ($10^4$) | Decomposition temperature (°C.) | DSC (°C.) $T_g$ | DSC (°C.) Heat absorbing temp. |
|---|---|---|---|---|---|---|---|
| 14 | I | $4A + C \xrightarrow{3B}$ | (a) 0.6 | 8 | 534 | — | 286 |
| 16 | II | $4A + B \xrightarrow{3C}$ | (a) 1.16 | 19 | 532 | — | 274 |
| 19 | III | $9A + 10B \xrightarrow{6A} \xrightarrow{5C}$ | (b) 0.99 | 15 | 544 | 303 | — |
| 20 | IV | $10A + 9B \xrightarrow{6C} \xrightarrow{5A}$ | (b) 1.25 | 22 | 549 | 302 | — |
| 21 | V | $4A + 2B \xrightarrow{2C}$ | (c) 0.75 | 8 | 534 | 296 | — |
| 17 | VI | $10A + C \xrightarrow{9B}$ | (e) 0.42 | 12 | 541 | — | — |
| 18 | VII | $10A + 0.5C \xrightarrow{9.5B}$ | (e) 0.4 | 10 | 544 | — | — |
| 22 | VIII | $4A + 2B + 2C \longrightarrow$ | (d) 0.82 | 12 | 532 | 294 | — |
| 23 | IX | $4A + 3B + C \longrightarrow$ | (d) 0.6 | 7 | 533 | — | 283 |
| 24 | X | $A + B \longrightarrow$ | (f) 0.58 | 9 | 539 | — | — |
| 15 | XI | $4A + 3B \xrightarrow{C}$ | (a) 0.61 | 8 | 531 | — | 283 |

(A: 6FDA; B:FDA; C:HFBAPP)
(a) monomer segment-linked block polymer
(b) block segment-linked block polymer
(c) monomeric segment-linked polymer
(d) random polymer
(e) homopolymer-like polymer
(f) homopolymer where the linking segment is 5 to 10% in the amide intermediate in the first step. Although its characteristic is close to the characteristic of the homopolymer illustrated in Run No. X, the molecular weight is greater than the pure homopolymer due to the presence of linking segments.

Thus, the polyimides having the monomer segment-linked polymer structure, the monomeric segment-linked polymer structure or the block segment-linked structure lo are different from the conventional random copolymers and block copolymers which can be obtained by using the direct imidization process through sequential addition in the phenolic reaction medium. The characteristic feature of the tri-component polyimide is its ability to complement the defective properties of the two-component polyimides such as to give a mechanical strength an elasticity to weak films while maintaining their original functions.

3. Hard Segment and soft segment

Although various types of block polymers can be prepared by the sequential addition process for the preparation of the tri-component polyimide composition of this invention, the properties of the polyimides are most drastically affected by the constituent components rather than by the method of its preparation.

Japanese Patent Publication (Kokoku) No. HEI 1-54365 (1989) describes a method of preparation of block copolymers that have various properties, from soft elastomers to strong structural plastics, by the combination of a hard segment (crystalline polymer) and a soft segment (elastic polymer).

The acid dianhydride and aromatic diamine to be used in the preparation of the tri-component polyimide of this invention can be divided into the soft segment and the hard segment as illustrated below. The polyimides of this invention formed by their combinations can be utilized for various applications, based on the combination of these segments.

Type I Acid Anhydride Segment (Hard Acid Segment)

The compounds having X=O or $SO_2$ in the following formula, such as 1,2,4,5-benzenetetracarboxylic dianhydride and biphenyl-3,4,3',4-tetracarboxylic dianhydride belong to this group.

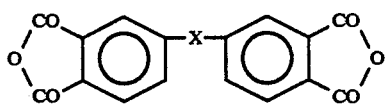

Type II Acid Anhydride Segment (Soft Acid Segment)

The compounds having X=CO, $CF_3$—C—$CF_3$ or

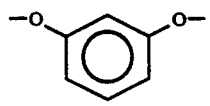

in the following formula belong to this type

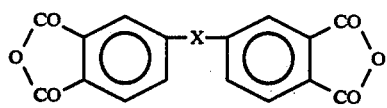

Type III Diamine Segment (Hard Diamine Segment)

Examples are p-phenylenediamine, m-phenylenediamine, 4,4'-diaminodiphenylether, 4,4'-diaminodiphenylsulfide, 2,6-diaminopyridine, 4,4'-diaminodiphenylmethane, 9,9-di-(4-aminophenyl)fluorene, 3,3'-dimethyl-4,4'-diaminobiphenyl, 4,4'-diaminophenylsulfone, trimethylp-phenylenediamine, 3,3'-dimethyl-4,4'-diaminobiphenyl6,6'-disulfonic acid, 3,3'-dimethyl-4,4'-diaminobiphenylsulfone ("o-tolidine sulfone"). 3,3'-5,5'-tetramethyl-4,4'-diaminobiphenyl, and so on.

Type IV Diamine Segment (Soft Diamine Segment)

Examples are 1,4-bis(4-aminophenoxy)benzene, 2,2-bis[4-(4-aminophenoxy)phenyl]propane, 2,2-bis[4-(4-aminophenoxy)phenyl]hexafluoro propane, bis-[4(4-aminophenoxy)phenyl]sulfone, 1,3-bis(4-aminophenoxy) benzene, 4,4'-bis(4-aminophenoxy)biphenyl and so on.

According to this invention, the monomeric segment-linked polymers, monomer segment-linked block polymers, and block segment-linked block polymers can be prepared by combining various types of the above described components and using different methods of preparation.

With the di-component homopolymers known in the prior art, the high molecular weight polyimide obtained by combining a hard acid segment and a hard diamine segment is a polymer which has a high degree of crystallinity and high tensile elastic modulus, which is utilized widely in polyimide fibers and polyimide films.

Further, the polyimide homopolymer formed from a soft acid segment and a soft diamine segment gives a highly elastic polymer which is made commercially available as the polyimide with improved impact resistance, adhesives, or as a moldable polymer.

Polyimide homopolymers obtained from a soft acid segment and a hard diamine segment or from a hard acid segment and a soft diamine segment excel in such properties as bondability, dimensional stability, moldability, and as a reinforcing agent, and they are utilized widely by taking advantage of these properties.

Even in the tri-component polyimide of this invention, a polyimide with an outstanding function and desirable physical and chemical properties can be provided by combining various components as shown below.

A) Hard acid segment—Hard amine segment—Hard amine segment.
B) Hard acid segment—Soft amine segment—Hard amine segment.
C) Hard acid segment—Soft amine segment—Soft amine segment.
D) Soft acid segment—Soft amine segment—Hard amine segment.
E) Soft acid segment—Soft amine segment—Soft amine segment.
F) Soft acid segment—Hard amine segment—Soft amine segment.

Compared to the two-component homopolymers, the tri-component polyimide of this invention has more varieties of its embodiments, and furthermore a broader utilization can be expected.

For example, Type A polyimide can impart higher elasticity to the conventional polyimide fiber, improve the heat resistance through elevation of its glass transition point, or, in case of forming a film, it can control its elongation. Furthermore, it can be made into a film with a satisfactory dimensional stability to permit utilization in circuit substrates. In addition, it can improve the water resistance and chemical resistance.

With Type B polyimide, bondability of polyimides can be improved. And improvement of storage stability can be expected. Or it can be formed into a film with improved moisture resistance and low thermal expansion coefficient to serve as a printing substrate, or as the heat insulation material or material with improved impact resistance for aircraft.

Type C polyimide can be utilized as the extrusion molded material, with an improved flexibility. It can also reduce the shrinkage ratio during the molding process. Utilization as the structural material for a matrix or as an adhesive can be contemplated. And it can improve the solubility of the varnish for enameled cable, improve the storage stability, and also improve the insulation properties.

Type D polyimide provides a polyimide film with improved moisture resistance and heat resistance, to serve as the insulation film for multilayered wires of semiconductors.

Type F polyimide can give a polyimide resin with improved impact resistance. This polyimide can provide a further improved polyimide to serve as the insulation material for heavy electrical equipment and also as a laminating material for aircraft.

And Type E polyimide provides a polyimide resin with improved electrical properties, bondability, heat resistance and molding workability to serve as a matrix for varnish, tape, and fiber-reinforced composite materials.

And, in case of fabricating polyimide resin into a gas separation membrane, a diamine that has a large substituent group and a broader space occupancy is used as the first diamine to improve the gas permeability and another diamine is used as the second diamine to increase the mechanical strength of the polyimide separation membrane and raise its gas separability, to provide a physically strong separation membrane which has outstanding gas selectivity and separability.

Examples of the diamine having a large substituent group and has a broad space occupancy to serve as the first diamine, are 9,9-bis(4-aminophenyl)fluorene, 9,9-bis(4-aminophenyl)-10-hydroanthracene and so on. I0 And examples of the diamine which can improve the mechanical strength of the formed polyimide membrane, improve its gas permeability and selectivity to serve as the second diamine are 2,2-bis[4-(4-aminophenoxy) phenyl]hexafluoropropane, 2,2-bis[4-(4-aminophenoxy) phenyl]propane, bis-[4-(4-aminophenoxy)phenyl]sulfone, 4,4'-bis(4-aminophenoxy)-biphenyl, 1,3-bis(4-aminophenoxy)benzene, 1,4-bis(4-aminophenoxy)benzene, 4,4'-diaminodiphenylether, 4,4'-diaminodiphenylsulfide, 4,4'-diaminodiphenylsulfone, 4,4'-diaminodiphenylmethane, 1,4-diaminobenzene, 3,3'-dimethyl-4,4'-diaminobiphenyl, 3,3'-dimethyl-4,4'-diaminobiphenyl-6,6'-disulfonic acid, 3,3'-dimethyl-4,4'-diaminobiphenyl-6,6'-disulfonic acid 2,3,6-trimethyl-1,4-diaminobenzene, 2,2',6,6'-tetramethyl-4,4'-diaminobiphenyl, 2,6-diaminopyridine and so on. Of them, 2,2-bis[4-(4-aminophenoxy)phenyl]hexafluoropropane is particularly preferred, for improvement of gas selectivity and improvement of mechanical strength. Such fluorinecontaining aromatic diamines are known to give a polymer which has outstanding transparency and low dielectric constant when they are used in the two-component polyimide [Japanese Patent Publication (Kokai) HEI 1-261422 (1989)]. When 2,2-bis[4-(4-aminophenoxy)phenyl] hexafluoropropane is used in tri-component polyimides, it will give an aromatic polyimide that has high molecular weight, high mechanical strength and high heat stability. And, because the fluorine atom contained in the diamine can facilitate its contact with the gas, a polyimide separation membrane with outstanding gas permeability and excellent selectivity for separation can be obtained.

A synergistic effect can be expected by using a combination of components which have mutually opposing properties in this invention. Thus, a broad range of utilization, from soft elastomer to hard structural polyimides, is possible. For example, broad 5 utilization, such as the polyimides having low thermal expansion coefficient and yet having excellent thermal resistance and high elasticity; polyimides having outstanding mechanical properties, electrical properties, solvent resistance and heat resistance; and heat resistant structural material, are possible.

The polyimide prepared by the method of this invention can be made easily into a gas permeable membrane which has high mechanical strength, outstanding gas permeability and excellent selectivity, by casting the polyimide dissolved in a reaction medium on a sheet of glass plate, for example, by the method known in the prior art, followed by removing the reaction medium and drying the membrane. Particularly, gas permeability for various types of gases, such as hydrogen, helium, $CH_4$, $N_2$, CO, Ar, and $CO_2$, can be obtained by using 9,9-bis(4-aminophenyl) fluorene as the diamine component. And, a polyimide separation membrane that has high gas selectivity, high molecular weight and high mechanical strength can be obtained by using 2,2-bis[4-(4-aminophenoxy)phenyl]hexafluoropropane as one of the diamine components. Particularly when these two of the abovesaid diamines are used together, a polyimide separation membrane with high selectivity can be obtained, in spite of the high gas permeability and reinforced mechanical strength of the membrane. And, in the conventional method of preparation of a polyimide membrane that had to go through polyamic acid, a polyimide membrane was obtained by forming a film from the solution of polyamic acid which is an intermediate product and then dehydrating the film. Therefore, it tended to form pinholes and create a rough surface. In contrast, with the preparation method of this invention, the dehydration technique is not used in the film formation and therefore a flat and smooth polyimide membrane with minimal pinholes can be obtained.

EXAMPLES

The examples, which are given for illustrative purposes, are not meant to limit the invention described herein.

The following abbreviations have been used throughout in describing the invention.

BTDA: benzophenone-3,4,3',4'-tetracarboxylic acid dianhydride (a product of Chemie Linz G.m.b.H, Austria)

FDA: 9,9-bis[4-aminophenyl)fluorene (a product of Wakayama Seika K.K.)

6FDA: 5,5'-[2,2,2-trifluoro-1-(trifluoromethyl)ethylidene]-bis-1,3-dicarboxylphenyl)hexafluoro propane dianhydride (a product of Hoeschst Cellanese Co.)

HFBAPP 2,2-bis[4-(4-aminophenoxy)phenyl]hexafluoropropane (a product of Wakayama Seika K.K.)

BPDA biphenyl-3,4,3',4'-tetracarboxylic acid dianhydride (a product of Ube Kosan K.K.)

PMDA (pyromellitic dianhydride) 1,2,4,5-benzenetetracarboxylic dianhydride (a product of Tokyo Kasei Kogyo Co., Ltd.)

In the following description, inherent viscosity is defined as follows.

$$\text{Inherent viscosity } inh = \frac{\ln(t/t_0)}{0.5}$$

In the above equation, t is the falling velocity of the polymer solution (sample 0.5 g of the sample was dissolved in 100 ml of NMP), and $t_0$ is the falling velocity of the reaction medium alone.

Tensile tests were conducted according to the procedure specified in ASTM D-882, and TG and DSC were measured, respectively, by means of a Schimatzu Seisakusho TGA-50 and DSC-50.

Infrared absorption spectrum was measured on the film itself or by KBr disc method.

Gas permeability of the film was measured by the high vacuum method, described in Membrane, 11 (1), pages 48–52 (1986), written by K. Haraya, K. Obata, T. Hakuta, and H. Yoshitune. The data reported in the same literature was used as the data of the polyimide membrane which served as the reference sample.

A mixture of phenol and 4-methoxyphenol (weight ratio=7:3) was called "M solution," and a mixture of phenol and 2,6-dimethylphenol (weight ratio=6:4) was called "X solution."

EXAMPLE 1

An agitator (a stainless steel anchor type) was mounted in a 500 ml separable three-necked flask, a cooling condenser (with glass balls) was mounted on the trap that had a stopcock so that nitrogen gas could flow freely through silica gel. 32.222 g (100 millimols) benzophenone tetracarboxylic dianhydride (a commercial product of Chemie Linz G m.b.H., Austria; "BTDA"), 17.426 g (50 millimols) 9,9-bis(4-aminophenyl) fluorene (a product of Wakayama Seika K.K., "FDA"), 200 g M solution, and 9 g pyridine were added to the flask. They were agitated, in the presence of nitrogen gas, at room temperature for 30 minutes, at 140° C. for 30 minutes, and at 180° C. for 1 hour (500 rpm). The reaction mixture was cooled in air, and then a solution containing 14.61 g (50 millimols) 1,3-bis-(4-aminophenoxy)benzene, 100 ml M solution and 4 g pyridine was added, and then 15 ml toluene was added further. This mixture was agitated at room temperature for 30 minutes, and heated at 140° C. for 30 minutes, and then at 180-190° C. for 8 hours. Water formed during the reaction was removed through the stopcock.

The reaction mixture was cooled to room temperature, and then poured in excess methanol (about one liter), and then it was agitated vigorously by means of a mixer VA-W-25 (a product of Hitachi Seisakusho K.K.), to obtain a yellow powder. This powder was collected by filtration under suction, and washed with methanol. After air-drying, the product was dried at 160° C. under a reduced pressure, to obtain 60.6 g of polyimide powder.

Infrared absorption spectrum of the powder was measured. Characteristic absorption peaks of the imide were detected at 721, 1372, 1722 and 1799 cm$^{-}$.

TG measurement gave the decomposition starting temperature at 559° C.

The powder 0.5 g was dissolved in 100 ml NMP, and the viscosity was measured at 30° C. inh=0.62.

EXAMPLE 2

An apparatus of Example 1 was used. 16.111 g (50 millimols) BTDA, 8.713 g (25 millimols) FDA, 100 g M solution, and 4 g pyridine were charged in the reactor. While introducing nitrogen gas, the flask was agitated at room temperature for 60 minutes, and heated and agitated at 150° C. for 90 minutes (400 rpm). The reaction mixture was cooled in air, and then a warm solution containing 6.208 g (25 millimols) 4,4'-diaminodiphenylsulfone, 50 g M solution, and 4 g pyridine was added, and then 10 ml toluene was added. It was agitated at room temperature for 1 hour, and heated and agitated at 190° C. for 9 hours, in a stream of nitrogen gas. The water formed from the reaction was removed through a stopcock. The reaction mixture was processed as in Example 1, to obtain 32.2 g of polyimide powder. Inherent viscosity was measured by the procedure described in Example 1, and it was 1.38. Infrared analysis revealed the characteristic absorption peaks of imide at 722, 1370, 1724 and 1780 cm$^{-1}$. Thermal decomposition temperature, determined by TG, was 569° C.

EXAMPLE 3

The apparatus of Example 1 was used. 44.25 g (100 millimols) 6FDA, 17.42 g (50 millimols) FDA, 200 g M solution, and 8 g pyridine were charged in the flask. It was agitated at room temperature for 110 minutes, and then heated and agitated at 160° C. for 2 hours. The reaction mixture was cooled in air, and then 21.62 g (50 millimols) bis[4-(4-aminophenoxy)-phenyl]sulfone and 15 ml toluene were added, and then the reaction mixture was heated and agitated at 160° C. for 1 hour and at 190° C. for 7 hours in a stream of nitrogen gas. The reaction mixture was processed as in Example 1, to obtain 81.0 g of polyimide powder. The infrared absorption spectrum showed the characteristic absorption peaks of imide at 723, 1380, 1731 and 1788 cm. Thermal decomposition temperature, determined by TG, was 538° C.

EXAMPLE 4

The procedure was run the same way as Example 1. 16.111 g (50 millimols) BTDA, 5.408 g (25 millimols) 4,4'-diaminodiphenylsulfide, 200 g X solution and 4 g pyridine were added to the flask. They were agitated at room temperature for 30 minutes, and heated and agitated at 120° C. for 1 hour and at 140° C. for 1 hour in a stream of nitrogen gas. The reaction mixture was cooled in air, and then 7.308 g (25 millimols) 1,3-bis(4-aminophenoxy)benzene and 15 ml toluene were added. The reaction mixture was heated and agitated at 140° C. treated in the same way as before, to obtain 31.1 g of yellow polyimide powder. Characteristic absorption peaks were noted at 734, 1372, 1722, and 1780 cm$^{-1}$ in the infrared absorption spectrum.

EXAMPLE 5

The procedure was run the same way as Example 1. 32.222 g (100 millimols) BTDA, 17.218 g (50 millimols) 2,2'-benzidinedisulfonic acid, 260 g M solution and 20 g (200 millimols) triethylamine were added. They were heated and agitated at 80° C. for 30 minutes and at 150° C. for 2 hours. Subsequently, 20.72 g (50 millimols) 2,2-bis-[4-(4-aminophenoxy)phenyl]propane and 15 ml toluene were added, and they were heated and agitated at 150° C. for 30 minutes and 190° C. for 9 hours in a stream of nitrogen gas. Then, the reaction mixture was treated the same way as before, to obtain 53.5 g of polyimide powder. Rotor viscosity of the polyimide solution after completion of the reaction was 14,000 cps (30° C.). This reaction mixture was cast directly on a glass plate, and heated, under reduced pressure, at 80° C. for 1 hour and then at 160° C. for 1 hour. Then, it was heated at 160° C. for 2 hours under an infrared lamp, to obtain a polyimide film.

Thermal decomposition temperature of this polyimide was 555° C. and the glass transition temperature was 324° C. Result of IR analysis revealed characteristic peaks of imide at 757, 1369, 1724 and 1779 cm.

EXAMPLE 6

The procedure was run the same way as Example 1. 32.222 g (100 millimols) BTDA, 17.218 g (50 millimols) 2,2'-benzidinedisulfonic acid, 260 g M solution, and 16 g (200 millimols) pyridine were added. It was heated and agitated at 80° C. for 1 hour, 140° C. for 1 hour and at 160° C. for 1 hour in nitrogen atmosphere. After cooling in air, 21.62 g (50 millimols) bis[4-(4-aminophenoxy)phenyl]sulfone and 15 ml toluene were added. The reaction mixture was heated and agitated at 160° C. for 30 minutes and at 190° C. for 7 hours. It was treated the same way as Example 1 to obtain 72 g of polyimide.

The reaction mixture was cast directly on a glass plate and then dried in air at 140° C., to obtain a strong, yellow-colored film.

Based on TG determination, thermal decomposition temperature was 547° C. The glass transition temperature was 308° C. According to IR analysis, characteristic absorption peaks of imide existed at 748, 1356, 1724 and 1782 cm.:

EXAMPLE 7

The procedure was run the same way as in Example 1. 32 222 g (100 millimols) BTDA, 18.62 g (50 millimols) 3,3'-dimethyl-4,4'-diaminobiphenyl-6,6'-disulfonic acid (a product of Wakayama Seika K.K.), 200 g M solution, and 16 g pyridine were added. They were heated and agitated at 80° C. for 30 minutes and at 140° C. for 2 hours, and then 5.485 g (50 millimols) 2,6-diaminopyridine and 15 ml toluene were added. The mixture was agitated at room temperature for 30 minutes and heated and agitated at 190° C. for 6 hours. Reaction mixture was poured in methanol, to obtain 41.6 g of polyimide. Rotor viscosity of the reaction mixture at 30° C. was 500 cps (30° C.). IR absorption spectrum showed the characteristic absorption peaks of imide at 727, 1390, 1723 and 1781 cm. TG determination showed the thermal decomposition temperature at 546° C., and endothermic peaks were noted at 307° C. and 417° C.

EXAMPLE 8

The procedure was run the same way as in Example 1. 16.111 g (50 millimols) BTDA, 9.26 g (25 millimols) 4,4'-diaminostilbene-2,2'-disulfonic acid (commercial product), 130 g M solution, and 8 g pyridine were added. They were heated and agitated at 80° C. for 90 minutes and at 140° C. for 1 hour. Subsequently, 2.73 g (25 millimols) 2,6-diamino-pyridine and 15 ml toluene were added, and then they were agitated at room temperature for 30 minutes and then heated and agitated at 190° C. for 3 hours. The reaction mixture was poured in methanol, to obtain 31.0 g of polyimide powder. TG determination showed peaks at 299° C. and 417° C., and thermal decomposition temperature was 548° C. DSC determination showed a large endothermic peak, and uptake of heat started at 197° C. and 336° C. IR absorption spectrum showed the characteristic absorption peaks of imide at 746, 1376, 1725 and 1782cm$^{-1}$.

EXAMPLE 9

The procedure was run the same way as in Example 1. 16.111g (50 millimols) BTDA, 9.25 g (25 millimols) 4,4'-diaminostilbene-2,2'-disulfonic acid (commercial product), 130 g M solution, and 8 g pyridine were added. They were heated and agitated at 80° C. for 90 minutes and at 140° C. for 1 hour, and then 6.21 g (25 millimols) 4,4'-diaminodiphenylsulfone and 15 ml toluene were added. Reaction mixture was agitated at room temperature for 30 minutes and heated and agitated at 190° C. for 3 hours. The reaction mixture was poured in methanol, to obtain 37.5 g of polyimide powder. TG determination revealed peaks at 298° C. and 417° C., and thermal decomposition temperature was at 535° C. DSC analysis showed a large endothermic peak, and uptake of heat started at 197° C. and 336° C. IR absorption spectrum showed the characteristic absorption peaks of imide at 721, 1372, 1724 and 1780 cm .

EXAMPLE 10

The procedure was run the same way as in Example 1. 16.111 g (50 millimols) BTDA, 2.729 g (25 millimols) 2,6-diaminopyridine, 100 g M solution, and 4 g pyridine were added, and then they were agitated at room temperature for 30 minutes and heated and agitated at 140° C. for 1 hour and then at 150° C. for 90 minutes. Subsequently, 7.307 g (25 millimols) 1,3-bis(4-aminophenoxy)benzene and 10 ml toluene were added, and the reaction mixture was heated and agitated at 150° C. for 30 minutes and at 190° C. for 90 minutes, to obtain 24.7 g of polyimide powder. TG analysis showed peaks at 299° C. and 417° C., and the thermal decomposition temperature was 548° C. IR absorption spectrum showed the characteristic absorption peaks of imide at 722, 1379, 1724 and 1782 cm$^{-1}$.

EXAMPLE 11

The procedure was run the same way as in Example 1. 16.111 g (50 millimols) BTDA, 3.83 g (25 millimols) 4-nitro-1,3-diaminobenzene, a mixture solution of 40 g resorcinol and 80 g phenol and 4 g pyridine were added. They were agitated at room temperature for 30 minutes and heated and agitated at 140° C. for 90 minutes. Then, 0.26 g (25 millimols) 2,2-bis[4-(4-aminophenoxy)phenyl]propane and 20 g M solution were mixed to form a solution and this solution was added to the reaction mixture. Then 15 ml toluene was added, and the reaction mixture was heated and agitated at 160° C. for 30 minutes and at 190° C. for 4 hours, to obtain 20.9 g of yellow polyimide powder. IR absorption spectrum showed the characteristic absorption peaks of imide at 721, 1377, 1727, and 1781 cm$^{-1}$.

EXAMPLE 12

The same apparatus as employed in Example 1 was used.

7.25 g (22.5 millimols) BTDA, 8.71 g (25 millimols) FDA, 70 g M solution and 2 g (25 millimols) pyridine were added in the flask to prepare a mixed solution. Then the mixed solution was agitated at a rate of 400 rpm at 80° C. for one hour, at 140° C. for one hour and at 180° C. for one hour in a stream of nitrogen gas. The reaction solution thus obtained was cooled in air, and then 4.83 g (15 millimols) BTDA and 10 ml toluene were added to the reaction solution, and the reaction mixture solution thus obtained was agitated at a rate of 400 rpm at 140° C. for one hour and at 180° C. for one hour in a stream of nitrogen gas. Subsequently, the reaction solution thus obtained was cooled in air, and 5.41 g (12.5 millimols) bis[4-(4-aminophenoxy)phenyl]sulfone, 50 g M solution, 0.6 g pyridine and 10 ml toluene were added to the reaction solution. The reaction mixture solution obtained was agitated at a rate of 400 rpm at 140° C. for one hour and then at 180° C. for 75 minutes in a stream of nitrogen gas while removing the toluene during the reaction. The reaction solution thus obtained was treated in the same manner as in Example 1 to give 26 g of polyimide powder.

The infrared absorption spectrum of the powder showed characteristic absorption peaks of imide at 720, 1374, 1729 and 1779 cm$^{-1}$. The thermal decomposition temperature of the powder was 570° C. and the glass transition temperature by the DSC measurement was 322° C.

EXAMPLE 13

The procedure employed was substantially the same as that of Example 12.

7.25 g (22.5 millimols) BTDA, 8.71g (25 millimols) FDA, 70 g M solution and 2 g (25 millimols) pyridine were added in the flask to prepare a mixture solution. Then this mixture solution was agitated at the rate of 400 rpm at 80° C. for one hour, at 140° C. for one hour and at 180° C. for one hour in a stream of nitrogen gas. The reaction solution thus obtained was cooled in air, and then 4.83 g (15 millimols) BTDA, 50 g M solution, 1.2 g (15 millimols) pyridine and 10 ml toluene were added to the reaction solution, and the reaction mixture solution thus obtained was agitated at the rate of 400 rpm at 140° C. for one hour and at 180° C. for one hour in a stream of nitrogen gas. Subsequently, the reaction solution thus obtained was cooled in air, and 3.65 g (12.5 millimols) 1,3-bis(4-aminophenoxy)benzene, 50 g M solution, 0.6 g (7.5 millimols) pyridine and 10 ml toluene were added to the reaction solution. The reaction mixture solution thus obtained was agitated at the rate of 400 rpm at 140° C. for one hour and then at 180° C. for 75 minutes in a stream of nitrogen gas while removing the toluene during the reaction. The reaction solution thus obtained was treated in the same manner as in Example 1 to give 24 g of polyimide powder.

The infrared absorption spectrum of the powder showed characteristic absorption peaks of imide at 720, 1369, 1718 and 1777 cm$^{-1}$. The thermal decomposition temperature of the powder by the TG measurement was 594° C. and the glass transition temperature by the DSC measurement was 377° C.

EXAMPLE 14

An agitator (stainless steel anchor type) was attached to a 500 ml three-necked separable flask and a condenser containing glass balls was mounted on top of the trap equipped with a stopcock, so that nitrogen gas could flow through the silica gel. 35.54 g (80 millimols) 6FDA, 10.37 g (20 millimols) HFBAPP, 200 g M solution and 4 g pyridine were added. In a nitrogen atmosphere, they were agitated at room temperature for 60 minutes and heated and agitated at 80° C. for 1 hour and at 180° C. for 1 hour (500 rpm). Then the reactor was allowed to cool in air, and then a solution containing 20.91g (60 millimols) FDA, and 100 g M solution was added, and then 4 g pyridine and 15 ml toluene were added. The reaction mixture was agitated at room temperature for 60 minutes and at 180° C. for 2 hours. The water formed during the reaction was removed from the stopcock.

The reaction mixture was cooled down to room temperature and poured in excess methanol, and agitated vigorously in a Hitachi Seisakusho's mixer VA-W-25, to obtain a faintly yellow powder. The precipitate was collected by filtration under a reduced pressure, to obtain 70.7 g of polyimide powder.

This polyimide powder was dissolved in NMP to form a 0.5% solution, and the inherent viscosity ( inh) was measured at 30° C. It was 0.6. Molecular weight, determined by GPC, was 80,000. IR absorption spectrum showed the characteristic absorption peaks of imide at 722, 1371, 1726 and 1787 $cm^{-1}$.

Thermal decomposition temperature, determined by TG analysis, was 534° C., and $T_8$ was 204° C. by DSC analysis. Endothermic point was 286° C. Physical characteristics are shown in I of Table 3.

Figure 4:
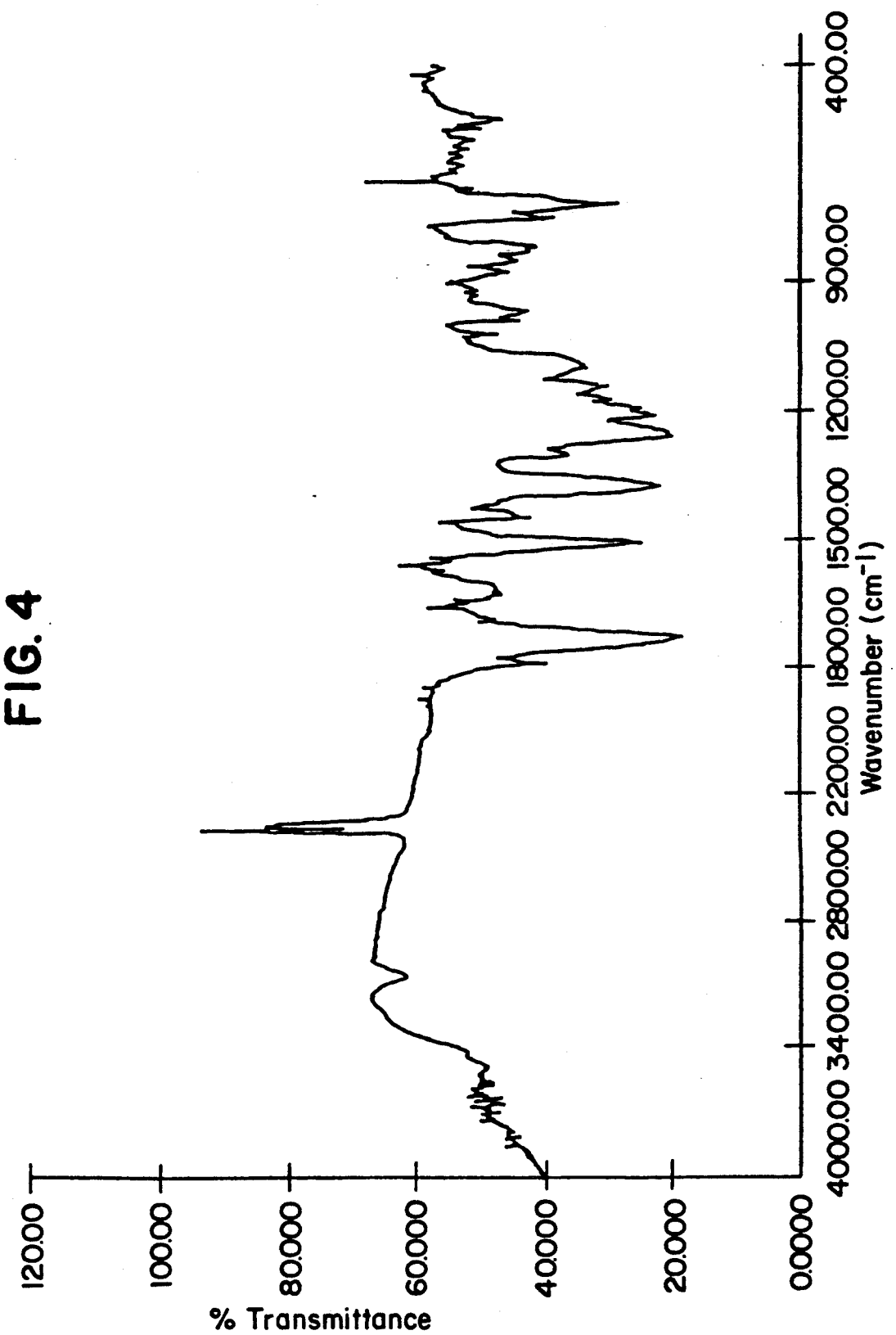
FIG. 4 is a diagram to illustrate the IR spectrum of the product obtained in Example 14.
Figure 5:
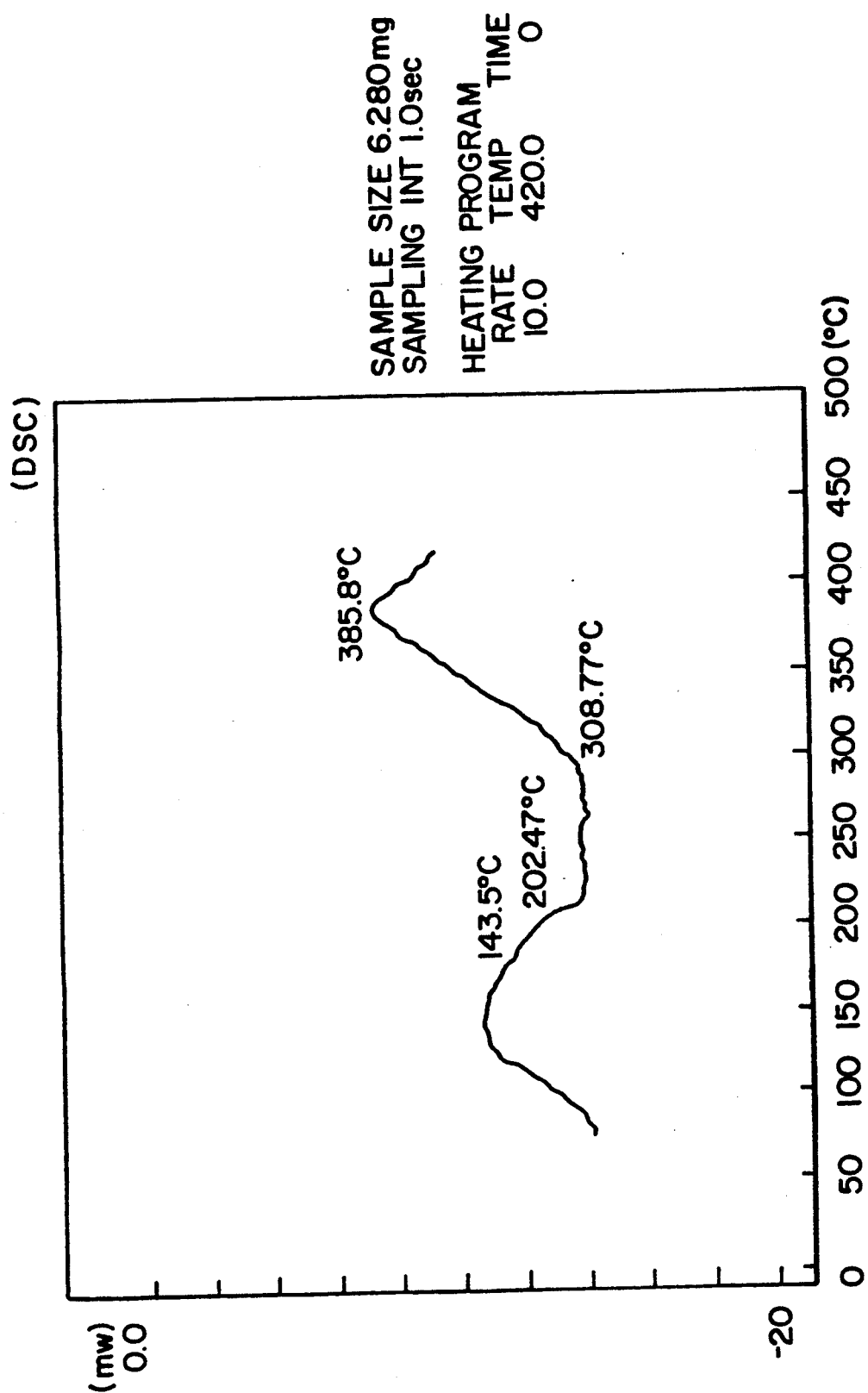
FIG. 5 is a diagram to illustrate the DSC curve of the product obtained in Example 14.
Figure 6:
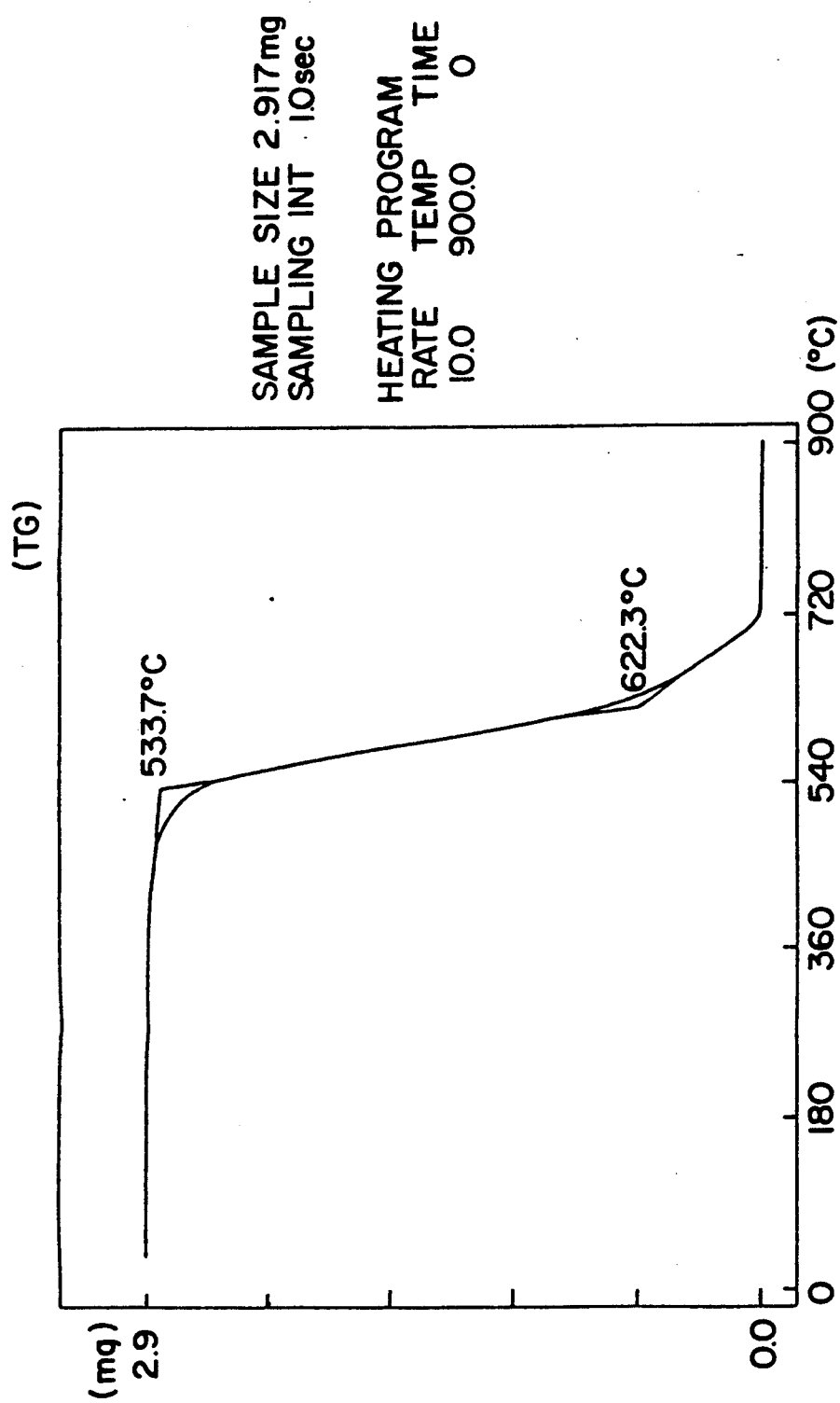
FIG. 6 is a diagram to illustrate the TG curve of the product obtained in Example 14.

80 g NMP was added to 20 g of powder, to dissolve the powder at 160° C. in nitrogen gas atmosphere. While the solution was still hot, it was filtered by applying a pressure, and air bubbles were removed by reducing the pressure. The cast sheet was dried at 85° C. for 2 hours under reduced pressure (1 mm Hg), and then at 160° C. for 2 hours, and finally heated under at IR lamp at 160° C. for 2 hours. The resulting film was peeled off the glass plate, and then dried under reduced pressure (1 mm Hg) at 165° C. for 3 hours, to obtain a polyimide membrane. Gas permeability and selectivity were measured at 30° C. by high vacuum method. The procedure described in *Membrane*, 11(1), pages 48–52 (1986) was used for the measurement. Gas permeability and selectivity are shown in Table 4. $CO_2$ permeability was high and $Co_2/CH_4$ selectivity was also high. It was 48 times greater than the $CO_2$ permeation rate of the polyimide reported in literature. IR spectrum, DSC curve and TG curve of the product are illustrated, respectively, in FIG. 4, FIG. 5 and FIG. 6.

EXAMPLE 15

17.78 g (40 millimols) 6FDA, 10.455 g (30 millimols) FDA, 100 g M solution, and 4 g pyridine were added to the three-necked flask of Example 14. While introducing a stream of nitrogen gas, it was agitated at room temperature for 30 minutes, at 80° C. for 2 hour and at 190° C. for 1 hour (400 rpm)

After cooling the reaction mixture in air, a solution containing 5.19 g (10 millimols) HFBAPP, 50 g M solution and 2 g pyridine (they were dissolved by heating) was added to the flask, and then 15 ml toluene was added. The reaction mixture was agitated at room temperature for 30 minutes and then at 190° C. for 7 hours. The water formed during the reaction was removed from the stopcock. The reaction mixture was cooled in air, and then poured in excess methanol, agitated vigorously, to obtain a faintly yellow powder. The precipitate was collected by filtration under suction, washed with alcohol, and let stand in air, and finally dried at 160° C. under a reduced pressure, to obtain 14.4 g of polyimide powder.

Inherent viscosity was measured as in Example 14. It was 0.61. Molecular weight by GPC analysis was 80,000. IR analysis showed the characteristic peaks of imide at 722, 1372, 1725 and 1787 $cm^{-1}$. A membrane was prepared as in Example 14, and the gas permeability was measured. Thermal decomposition temperature was 531° C. and an endothermic point was found at 283° C.

EXAMPLE 16

35.54 q (80 millimols) 6FDA, 6.97 g (20 millimols) FDA, 200 g M solution, and 4 g pyridine were added to the three-necked flask of Example 14. While introducing a stream of nitrogen gas, it was agitated at room temperature for 60 minutes, at 80° C. for 1 hour and then at 180° C. for 1 hour (400 rpm). The reaction mixture was cooled in air, and a hot solution containing 31.10 g (60 millimols) HFBAPP, 100 g M solution, and 4 g pyridine were added, and then 15 ml toluene was added. The reaction mixture was agitated 15 at room temperature for 1 hour and then at 180° C. for 9 hours. The water formed from the reaction was removed from the stopcock. The reaction mixture was treated the same way as Example 1, to obtain 67.4 g of polyimide powder. Inherent viscosity was 1.16, and molecular weight by GPC analysis was 125,000. IR analysis showed the characteristic absorption peaks of imide at 723, 1372, 1727, and 1787 $cm^{-1}$. Thermal decomposition temperature was 532° C. and the endothermic point was 274.

A membrane was fabricated by the procedure of Example 14, and its gas permeability was measured. Results are presented in Tables 4 and 5. In spite of the high $CO_2$ gas permeability, the $CO_2/CH_4$ selectivity was also high. Although the FDA content was nearly one-half of Example 21, gas permeability and selectivity were nearly identical to that example.

EXAMPLE 17

17.77 g (40 millimols) 6FDA, 2.074 g (4 millimols) HFBAPP, 100 g M solution, and 4 g pyridine were added to the flask of Example 14. While introducing a stream of nitrogen gas, they were agitated at room temperature for 40 minutes, at 120° C. for 1 hour and then at 160° C. for 1 hour (400 rpm). The reaction mixture was cooled in air, and then a hot solution containing 12.546 g (36 millimols) FDA, 50 g M solution, and 4 g pyridine was added, and then 15 ml toluene was added. The reaction mixture was agitated at 160° C. for 80 minutes and then at 180° C. for 5 hours. It was treated as in Example 14, to obtain 38.1 g of powder. Inherent viscosity was measured as in Example 14, and it was 0.242. Molecular weight, determined by GPC, was 120,000, and thermal decomposition temperature was 541° C. Physical characteristics are shown in Run No. VI of Table 3. IR analysis showed the characteristic absorption peaks of imide at 722, 1373, 1733 and 1786 cm$^{-1}$.

EXAMPLE 18

The procedure was essentially identical to Example 17. In this case, however, 17.77 g (40 millimols) 6FDA, 1.037 g (2 millimols) HFBAPP, and 13.243 g (38 millimols) FDA were used. It was treated as before to obtain 37.4 g of powder. Viscosity was 0.4. IR analysis showed the characteristic absorption peaks of imide at 722, 1371, 1722 and 1786 cm$^{-1}$. Thermal decomposition temperature was 544° C., but no glass transition point was detected by DSC analysis. Physical characteristics are shown in Run No. VII of Table 3.

EXAMPLE 19

19.99 g (45 millimols)6FDA, 17.43 g (50 millimols) FDA, 100 g M solution and 3 g pyridine were added to the flask of Example 14. While introducing a stream of nitrogen gas, they were agitated at room temperature for 4 hours, at 140° C. for 1 hour, and at 180° C. for 2 hours. After cooling the reaction mixture in air, a hot solution containing 13.33 g (30 millimols) 5FDA, 30 g M solution, and 1.5 g pyridine was added, and then 15 ml toluene was added. The reaction mixture was agitated at room temperature for 3 hours, at 140° C. for 30 minutes and then at 180° C. for 2 hours. Subsequently, the reaction mixture was cooled in air, and then 12.97 g (25 millimols) HFBAPP, 25 g M solution, 1.5 g pyridine and 10 ml toluene were added. This reaction mixture was agitated at room temperature for 1 hour, at 140° C. for 30 minutes and then at 180° C. for 5 hours. Formed water was removed from the trap. Toluene was removed also. It was treated as in Example 14, to obtain 82.3 g of polyimide powder. Inherent viscosity was measured by the procedure described in Example 14. It was 0.99. IR absorption spectrum showed the characteristic absorption peaks of imide at 723, 1375, 1725, and 785 cm$^{-1}$. Molecular weight, determined by GPC, was 50,000, thermal decomposition temperature was 549° C., and glass transition temperature was found at 303° C. Physical characteristics are shown in Run No. III of Table 3.

EXAMPLE 20

Figure 7:
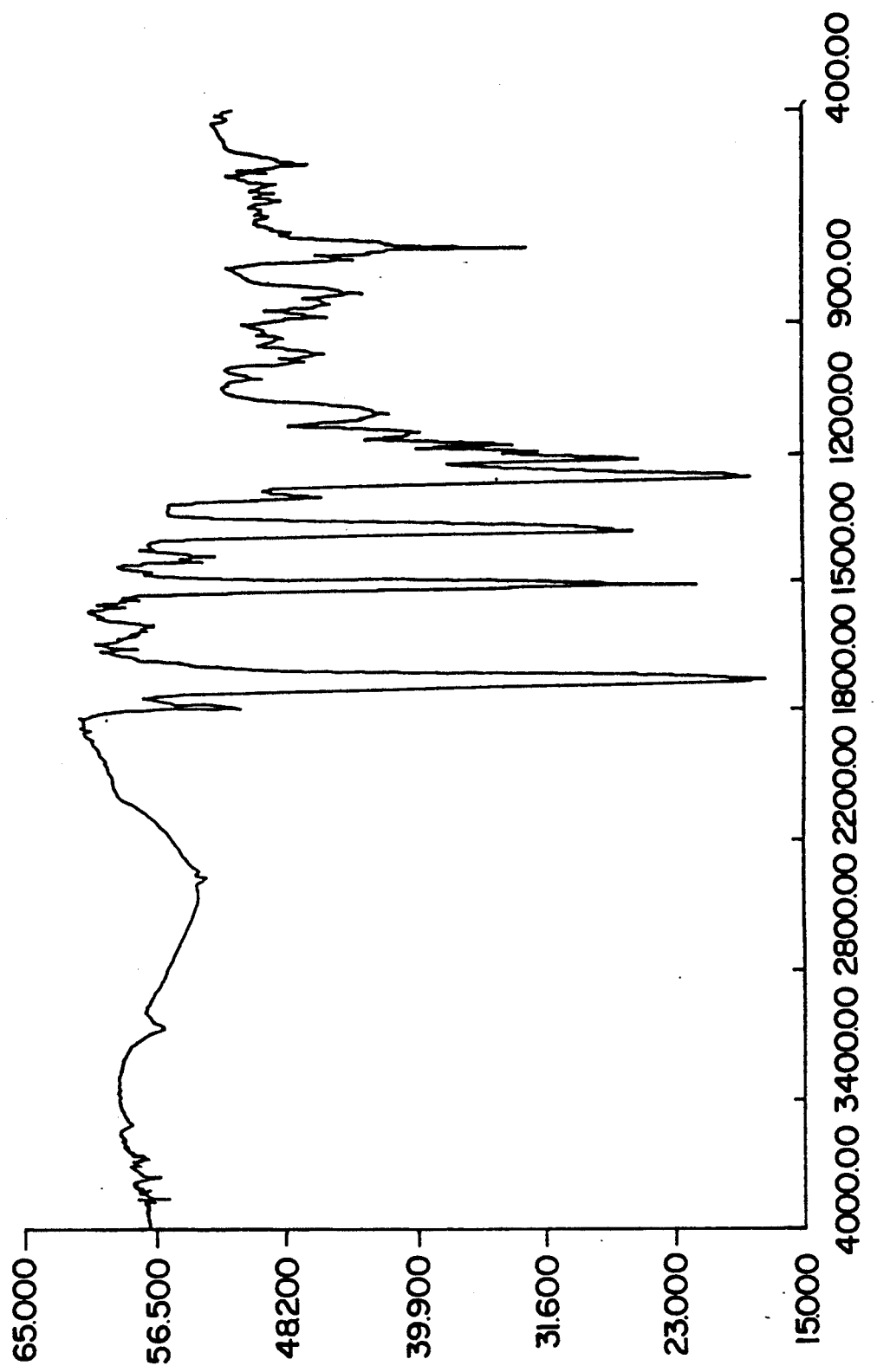
FIG. 7 is a diagram to illustrate the IR spectrum of the product obtained in Example 20.
Figure 8:
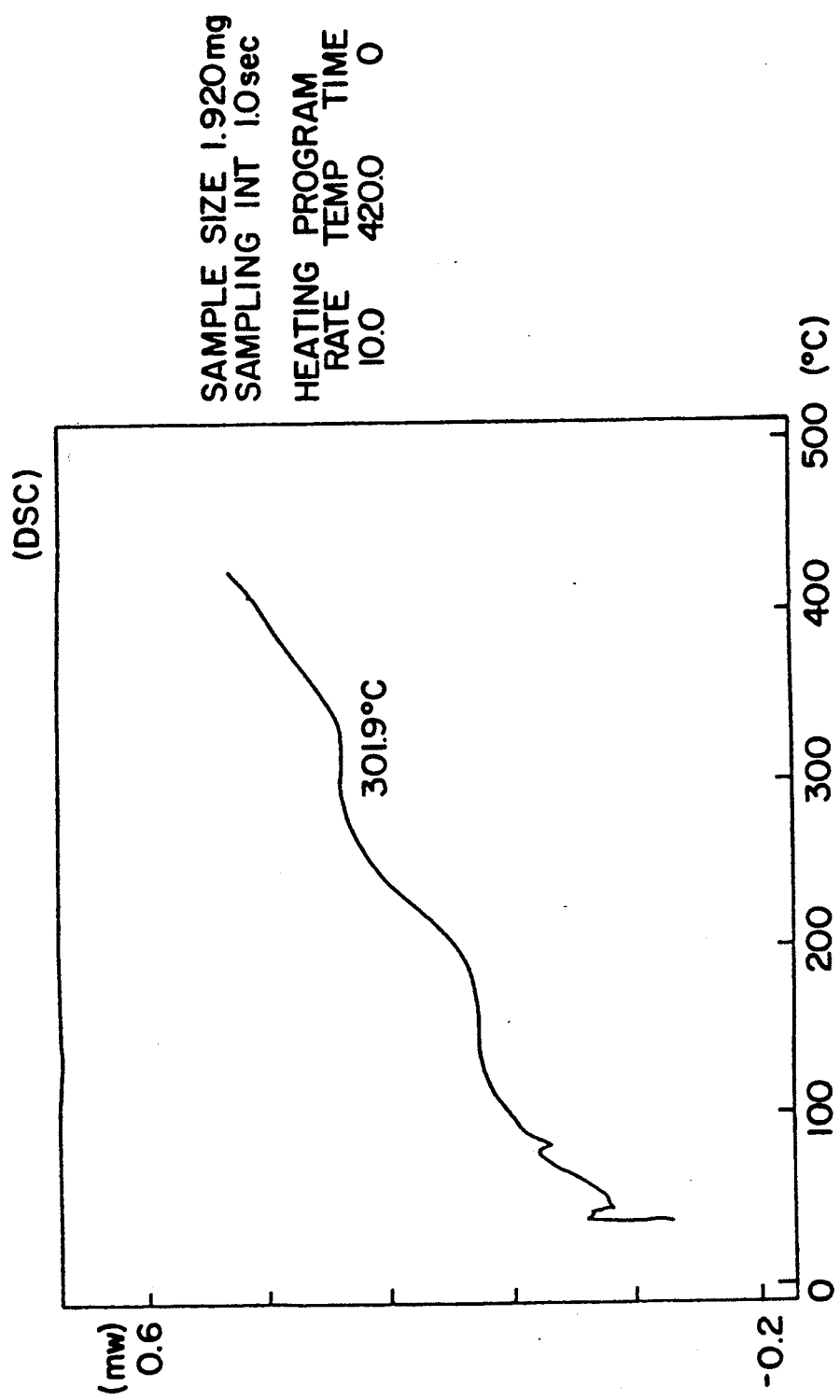
FIG. 8 is a diagram to illustrate the DSC curve of the product obtained in Example 20.
Figure 9:
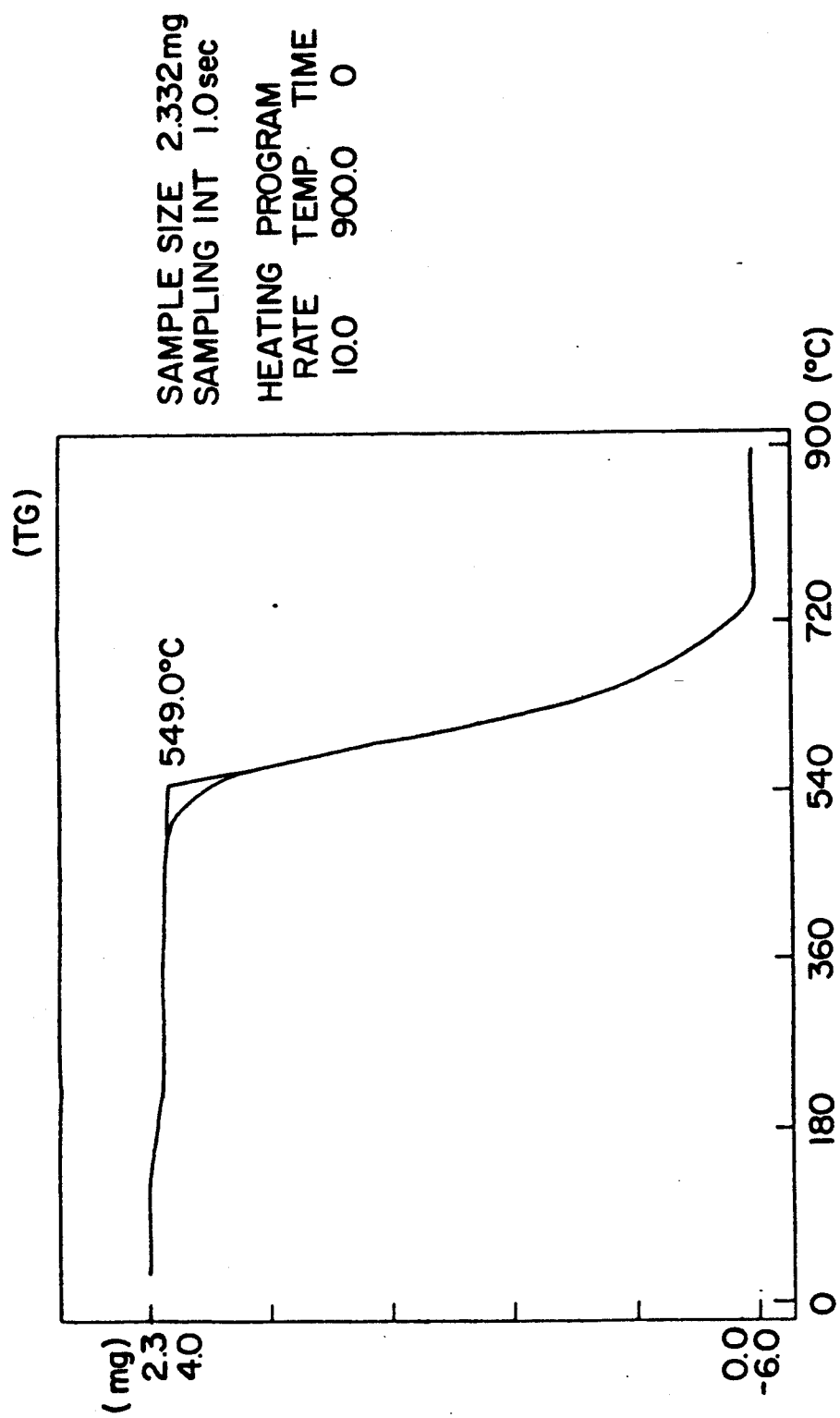
FIG. 9 is a diagram to illustrate the TG curve of the product obtained in Example 20.

The procedure was run the same way as in Example 14. 22.21 g (50 millimols) 6FDA, 15.69 g (45 millimols) FDA, 100 g M solution, and 3 g pyridine were added, and they were heated and agitated. The reaction mixture Was cooled in air, and then 15.55 g (30 millimols) HFBAPP, 30 g M solution, 1.5 g pyridine and 10 ml toluene were added and again they were heated and agitated. After cooling the reaction mixture in air, 11.12 g (25 millimols) 6FDA, 25 g M solution, 1.5 g pyridine, and 10 ml toluene were added, and reaction and treatment were carried out in the same manner as in Example 19, to obtain 71.6 g of powder. Inherent viscosity was 1.25. Molecular weight, determined by GPC, was 220,000. Thermal decomposition temperature was 549° C., and glass transition temperature ($T_g$) was found at 302° C. Gas permeability is shown in Tables 4 and 5. IR absorption spectrum showed the characteristic absorption peaks of imide at 722, 1375, 1726, and 1786 cm$^{-1}$. Physical characteristics are shown in Run No. IV of Table 3. IR spectrum, DSC curve, and TG curve of the product are illustrated, respectively, in FIG. 7, FIG. 8 and FIG. 9.

EXAMPLE 21

The apparatus of Example 14 was used. 22.213 g (50 millimols) 6FDA, 8.713 g (25 millimols) FDA, 100 g M solution and 4 g pyridine were added. They were agitated at room temperature for 110 minutes and at 160° C. for 2 hours in a stream of nitrogen gas. After cooling in air, 12.963 g (25 millimols) HFBAPP and 15 ml toluene were added, and the reaction mixture was heated and agitated at 160° C. for 1 hour, at 190° C. for 2 hours and 25 minutes, and then at 160° C. for 6 hours. It was treated as in Example 14, to obtain 41.7 g of powder. Viscosity was 0.75. Molecular weight, determined by GPC analysis, was 80,000. Thermal decomposition temperature was 534° C., and glass transition point was found at 296° C. Gas permeability is shown in Tables 4 and 5. IR spectrum showed the characteristic absorption peaks of imide at 722, 1375, 1725 and 1786 cm$^{-1}$. Physical characteristics are shown in Run No. V of Table 3.

EXAMPLE 22

Figure 10:
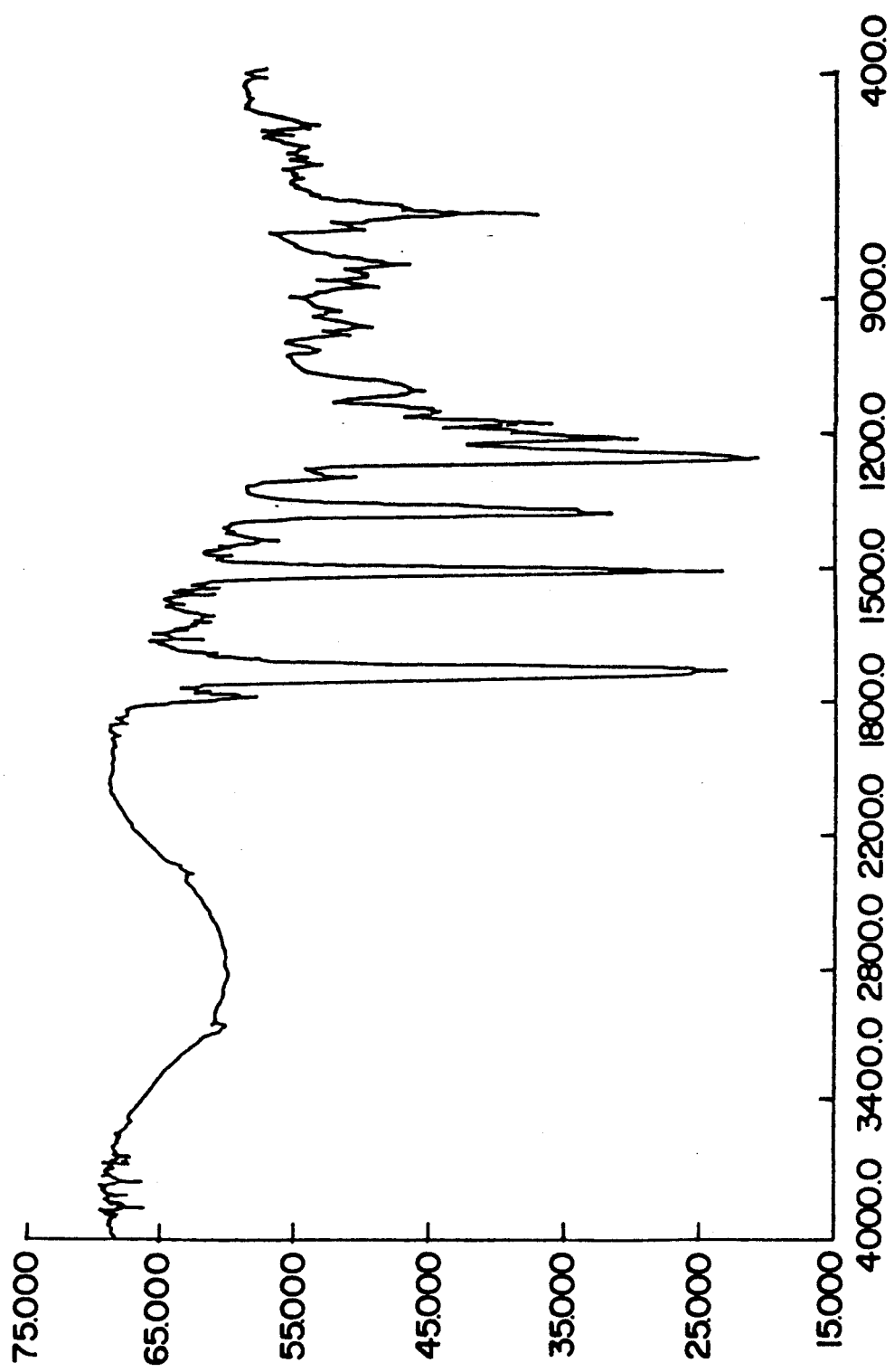
FIG. 10 is a diagram to illustrate the IR spectrum of the product obtained in Example 22.
Figure 11:
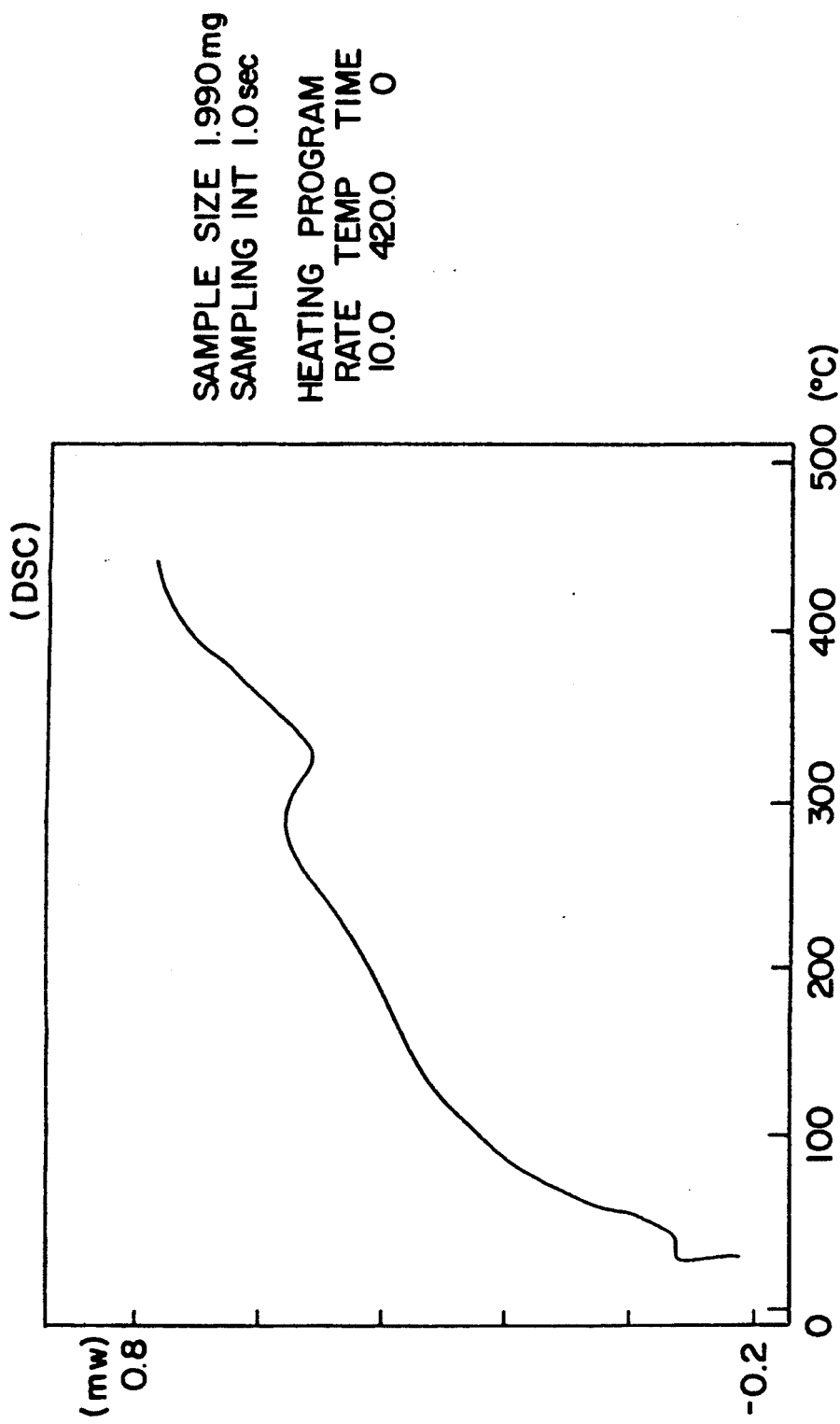
FIG. 11 is a diagram to illustrate the DSC curve of the product obtained in Example 22.
Figure 12:
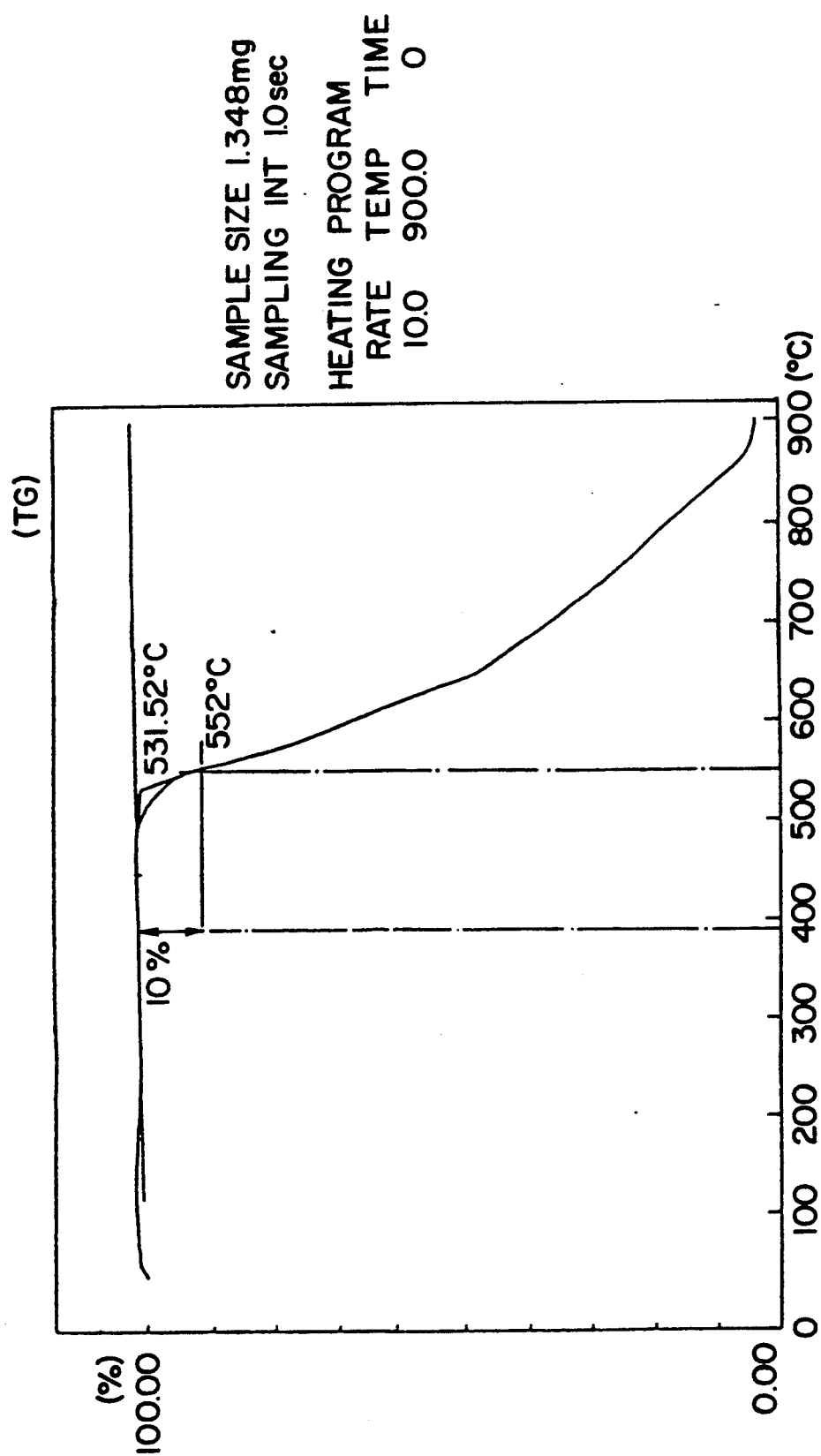
FIG. 12 is a diagram to illustrate the TG curve of the product obtained in Example 22.

The apparatus of Example 14 was used. 22.12 g (50 millimols) 6FDA, 8.71 g (25 millimols) FDA, 12.963 g (25 millimols) HFBAPP, 150 g M solution, 4 g pyridine and 15 ml toluene were added. They were agitated at room temperature for 1 hour, at 80° C. for 1 hour, at 160° C. for 1 hour, and then at 180° C. for 7 hours. Formed water was removed. The reaction mixture was treated as in Example 14, to obtain 36.9 g of random polyimide powder. Viscosity was 0.82, molecular weight, determined by GPC analysis, was 120,000, and thermal decomposition temperature was 532° C. Glass transition temperature was discovered at 294° C. IR absorption spectrum showed the characteristic absorption peaks of imide at 722, 1375, 1726, and 1786 cm$^{-1}$. Physical characteristics are shown in Run No. VIII of Table 3. IR spectrum, DSC curve, and TG curve of the product are illustrated, respectively in FIG. 10, FIG. 11 and FIG. 12.

EXAMPLE 23

The apparatus of Example 14 was used. 17.776 g (40 millimols) 6FDA, 10.455 g (30 millimols) FDA, 5.185 g (10 millimols) HFBAPP, 150 g M solution, 4 g pyridine and 10 ml toluene were added. They were heated and agitated in nitrogen atmosphere. Reaction was carried out at room temperature for 30 minutes at 80° C. for 2 hours and at 180° C. for 4 hours. The reaction mixture was treated as in Example 14, to obtain 29.0 g of random polyimide. Viscosity was 0.6, molecular weight was 80,000, thermal decomposition temperature was 533° C., and it showed an endothermic point at 283° C. IR absorption spectrum showed the characteristic absorption peaks of imide at 722, 1371, 1724, and 1781 cm$^{-1}$. Physical characteristics are shown in Run No. IX of Table 3.

EXAMPLE 24

The same apparatus as in Example 14 was used. 22.113 g (50 millimols) 6FDA, 17.426 g (50 millimols) FDA, 150 g M solution, 4 g pyridine, and 15 ml toluene were added. They were agitated at room temperature for 1 hour, at 80° C. for 1 hour, at 160° C. for 1 hour, and at 180° C. for 7 hours in nitrogen gas atmosphere. The reaction mixture was treated as in Example 14, to obtain 36.9 g of homopolymer.

A 20% by weight NMP solution was prepared as in Example 14, and this solution was cast on a glass plate, to obtain a polyimide film. Viscosity was 0.58, molecular weight was 90,000, and thermal decomposition temperature was 539° C. Gas permeability and gas selectivity are shown in Table 4 and Table 5. Physical characteristics are shown in Run No. X of Table 3. Although the permeability of the homopolymer was higher than block polymer membrane, it was a very brittle film. IR absorption spectrum showed the characteristic absorption peaks of imide at 722, 1371, 1724 and 1786 cm$^{-1}$.

EXAMPLE 25

An agitator (stainless steel anchor type) was attached to a 500 ml separable three-necked flask, and a condenser with glass balls was mounted on top of the trap that had a stopcock, so that nitrogen gas could flow through the silica gel. 22.22 g (50 millimols) 6FDA, 8.713 g (25 millimols) FDA, 100 g M solution, and 4 g pyridine were added, and they were agitated at room temperature for 30 minutes and then at 160° C. for 1 hour (500 rpm) in nitrogen gas atmosphere. Then, the reaction mixture was cooled down to room temperature, and 12.963 g (25 millimols) HFBAPP and 15 ml toluene were added. The reaction mixture was agitated at 160° C. for 30 minutes and then at 190° C. for 4.5 hours. The water formed during the reaction was removed from the stopcock.

The reaction mixture was cooled down to room temperature, and poured in excess methanol, and agitated vigorously with a Hitachi mixer VA-W-25, to obtain a yellow powder. The precipitate was collected by filtration under suction and washed with methanol. After air drying, it was dried at 160° C. under a reduced pressure, to obtain 41.9 g of polyimide powder.

This polyimide powder was dissolved in NMP to form a 0.5% solution, and inherent viscosity was measured at 30° C. It was 1.29. IR analysis showed the characteristic absorption peaks of imide at 722, 1374, 1725 and 1780 cm$^{-1}$.

A 15 g sample of the powder was placed in 85 g NMP and dissolved at 160° C. under nitrogen atmosphere to prepare a 15% solution. It was filtered under application of pressure while the solution was still hot, and air bubbles were removed under a reduced pressure. Then, the solution was cast on a glass plate by means of a doctor knife. This was dried at 85° C. for 2 hours under a reduced pressure and then at 160° C. for 2 hours, and finally heated at 160° C. for 2 hours using an infrared lamp. The resulting membrane was peeled off the glass plate, and dried at 165° C. for 3 hours. under a reduced pressure, to obtain a polyimide membrane.

Thickness of the formed polyimide membrane and its physical properties are presented in Table 6, and the data relating to gas permeability are shown in Tables 4 and 5. As reference, the data of the polyimide gas separation membrane described in the earlier literature, *Membrane*, 11(1), pages 48–52 (1986) are also shown in the same tables.

EXAMPLE 26

29.42 g (100 millimols) BPDA, 17.43 g (50 millimols) FDA, 200 g M solution and 4 g pyridine were added to the three-necked flask of Example 25. While introducing a stream of nitrogen gas, they were agitated at room temperature for 30 minutes and then at 160° C. for 1 hour (400 rpm). The reaction mixture was cooled in air, and then a hot solution containing 25 92 g (50 millimols) HFBAPP, 100 g M solution, 4 g pyridine and 15 ml toluene was added. The reaction mixture was agitated at 160° C. for 30 minutes and then at 190° C. for 10 hours. The water formed during the reaction was removed from the stopcock. The reaction mixture was cooled in air, added with excess methanol, and agitated vigorously, to obtain a yellow powder. This precipitate was harvested by filtration under suction, washed with alcohol, and let stand in air. Then, it was dried at 160° C. under a reduced pressure, to obtain 68.5 g of polyimide powder.

Inherent viscosity was measured as in Example 1. It was 1.38. IR analysis showed the characteristic absorption peaks of imide at 737, 1371, 1720 and 1777 cm$^{-1}$ A membrane was prepared by the method of Example 25, and physical properties and gas separation ability were measured. Results are presented in Tables 4–6.

EXAMPLE 27

32.222 g (100 millimols) BTDA, 17.426 g (50 millimols) FDA, 200 g M solution and 4 g pyridine were added to the flask of Example 25. While introducing a stream of nitrogen gas, they were agitated at room temperature for 30 minutes, at 140° C. for 1 hour and then at 160° C. for 1 hour (500 rpm). The reaction mixture was cooled in air, and then a solution containing 25.926 g (50 millimols) HFBAPP, 100 g M solution, 4 g pyridine and 15 ml toluene was added, and they were agitated at 160° C. for 30 minutes and then at 190° C. for 7 hours. The reaction mixture was poured in excess methanol, and agitated vigorously, to obtain a yellow powder. This precipitate was collected by filtration under suction, washed with methanol, dried in air, and finally dried at 160° C. under a reduced pressure. Thus, 71.3 g of polyimide powder was obtained.

Inherent viscosity was measured as in Example 25. It was 0.78. IR analysis showed the characteristic absorption of imide at 722, 1373, 1727, and 1780 cm$^{-1}$.

A membrane was fabricated as in Example 25, and physical properties and gas separating ability were measured. Results are presented in Tables 4–6.

EXAMPLE 28

32.222 g (100 millimols) BTDA, 17.426 g (50 millimols) FDA, 200 g M solution and 4.0 g pyridine were added to the flask of Example 25. While introducing a stream of nitrogen gas, they were agitated at 120° C. for 30 minutes and then at 160° C. for 1 hour. The reaction mixture was cooled down to room temperature, and a solution containing 21.62 g (50 millimols) bis[4-(4-aminophenoxy)phenyl]sulfone, 100 g M solution, 4 g pyridine and 15 ml toluene was added, and the reaction mixture was agitated at 180° C. for 1 hour and then at 190° C. for 8 hours in nitrogen gas atmosphere. The solution was cooled in air and poured in excess methanol, and agitated vigorously, to obtain yellow powder. It was dried in the same manner as in Example 1, to obtain 70.2 g of polyimide powder.

Inherent viscosity was measured as in Example 25. It was 0.46. IR analysis showed the characteristic absorption peaks of imide at 721, 1374, 1724, and 1779 cm$^{-1}$.

A membrane was fabricated as in Example 25, and its physical properties and gas separating ability were measured. Results are presented in Tables 4–6.

EXAMPLE 29

In this example, a random polyimide copolymer was obtained by using the same proportions of the monomer components as Example 26 to mix and polymerize at the same time.

29.42 g (100 millimols) BPDA, 17.43 g (50 millimols) FDA, 25.92 g (50 millimols) HFBAPP, 300 g M solution, 4 g pyridine and 15 ml toluene were added to the flask of Example 25. While introducing a stream of nitrogen gas, they were agitated at 30° C. for 90 minutes, at 120° C. for 1 hour and then at 190° C. for 10 hours (500 rpm). Thus, 68.8 g of polyimide powder was obtained by the procedure of Example 26.

A membrane having a thickness of 22 μm was fabricated by the method of Example 26, and the physical properties were measured. Although the tensile strength was 21 kg/mm² which was identical to the polyimide membrane obtained in Example 26, elongation was only 6%, which was equal to 67% of the polyimide membrane shown in Example 26.

EXAMPLE 30

In this example, monomer components of Example 27 were used at the same proportion and they were mixed and polymerized in a similar manner, to obtain a random polyimide copolymer.

32.222 g (100 millimols) BTDA, 17.426 g (50 millimols) FDA, 25.926 g (50 millimols) HFBAPP, 150 g M solution, 4 g pyridine and 15 ml toluene were added to the flask of Example 25. They were agitated at 30° C. for 90 minutes, at 120° C. for 1 hour, and then at 190° C. for 10 hours. Using the same procedure as Example 27, 71.0 g of polyimide powder was thus obtained.

A membrane having a thickness of 22 μm was fabricated by the method of Example 27, and physical properties were measured. Tensile strength was 21 kg/mm², which was equivalent to the polyimide membrane illustrated in Example 3. However, elongation was 6%, which was 67% of the polyimide membrane of Example 26.

EXAMPLE 31

An agitator (stainless steel anchor type) was attached to a 500 ml separable three-necked flask, and a condenser with glass balls was attached on top of the trap with stopcock so that nitrogen gas could flow through the silica gel. 14.71 g (50 millimols) BPDA, 9.31 g (25 millimols) 3,3'-dimethyl-4,4'-diaminobiphenyl-6,6'-disulfonic acid (a product of Wakayama Seika K.K.), 130 g M solution, and 8 g pyridine (100 millimols) were added, and they were agitated at 80° C. for 30 minutes, at 120° C. for 1 hour, and then at 140° C. for 1 hour (500 rpm). The reactor was cooled in air, and then 10.26 g (25 millimols) 2,2-bis [4-(4-aminophenoxyl)phenyl]propane and 15 ml toluene were added, and then the reaction mixture was heated and agitated at 140° C. for 30 minutes and 190° C. for 6 hours. The water formed during the reaction was removed from the stopcock.

TABLE 4

Gas permeability of polyimide membranes

| | $H_2$ | He | $CH_4$ | $N_2$ | CO | $O_2$ | Ar | $CO_2$ |
|---|---|---|---|---|---|---|---|---|
| Example 14 | 10700 | 9640 | 197 | 281 | 458 | 1410 | 591 | 7080 |
| Example 16 | 7200 | 7740 | 121 | 187 | 296 | 903 | 342 | 4400 |
| Example 20 | 5700 | 5700 | 89 | 135 | 211 | 702 | 262 | 3550 |
| Example 21 | 7140 | 7250 | 128 | 199 | 300 | 934 | 353 | 4650 |
| Example 24 | 10700 | 8990 | 209 | 286 | 470 | 1410 | 537 | 7100 |
| Example 25 | 7140 | 7250 | 128 | 199 | 300 | 934 | 353 | 4650 |
| Example 26 | 3360 | 3140 | 49.8 | 64.9 | 114 | 346 | 122 | 1820 |
| Example 27 | 1620 | 1750 | 16.8 | 22.2 | 38.5 | 140 | 44.8 | 704 |
| Example 28 | 916 | 900 | 8.68 | 9.51 | 18.6 | 70 | 20.9 | 380 |
| Example 59 | 7730 | 7570 | 103 | 174 | 279 | 885 | 326 | 4910 |
| Data of polyimide reported in literature | 512 | 592 | 3.19 | _ 3.15 | 6.53 | 25.1 | 6 | 148 |

R at high pressure side: About 1.1 kg/cm²; unit = $10^{-12}$ cm³ (STD) cm/cm².S.cm Hg

TABLE 5

Gas Selectivity of polyimide membranes

| | $He/CH_4$ | $H_2/CH_4$ | $CO_2/CH_4$ | $H_2/CO$ | $O_2/N_2$ | $He/N_2$ | $CO_2/N_2$ |
|---|---|---|---|---|---|---|---|
| Example 14 | 49 | 54 | 36 | 23 | 5.0 | 34 | 25 |
| Example 16 | 64 | 60 | 36 | 24 | 4.8 | 41 | 24 |
| Example 20 | 66 | 64 | 40 | 27 | 5.2 | 44 | 26 |
| Example 21 | 57 | 56 | 36 | 24 | 4.7 | 36 | 23 |
| Example 24 | 43 | 51 | 34 | 23 | 4.9 | 31 | 25 |
| Example 25 | 63 | 67 | 37 | 29 | 5.3 | 48 | 28 |
| Example 26 | 57 | 56 | 36 | 24 | 4.7 | 36 | 23 |
| Example 27 | 104 | 96 | 42 | 42 | 6.3 | 79 | 32 |
| Example 28 | 104 | 106 | 44 | 49 | 7.4 | 95 | 40 |
| Example 59 | 73 | 75 | 48 | 28 | 5.1 | 44 | 28 |
| Data of polyimide reported in literature | 164 | 142 | 46 | 78 | 8 | 188 | 48 |

TABLE 6

Physical properties of polyimide membranes

| | Membrane thickness (μm) | Tensile strength (kg/mm²) | Elongation (%) | inh (30° C.) |
|---|---|---|---|---|
| Example 25 | 30 | 15 | 10 | 1.29 |
| Example 26 | 16 | 21 | 9 | 1.38 |
| Example 27 | 30 | 21 | 9 | 0.78 |
| Example 28 | 22 | 18 | 2.5 | 0.46 |
| Example 29 | 22 | 21 | 6 | 1.24 |
| Example 30 | 22 | 21 | 6 | 1.12 |

The reaction mixture was cooled down to near the room temperature, and poured in excess methanol (about 1 liter), and agitated vigorously with a Hitachi mixer VA-W-25, to obtain a yellow powder. The precipitate was collected by filtration under suction and washed with methanol. After air drying, 33.5 g of polyimide powder was obtained. The IR spectrum showed the characteristic absorption peak of imide at 721, 1383, 1718 and 1775 cm$^{-1}$.

Figure 13:
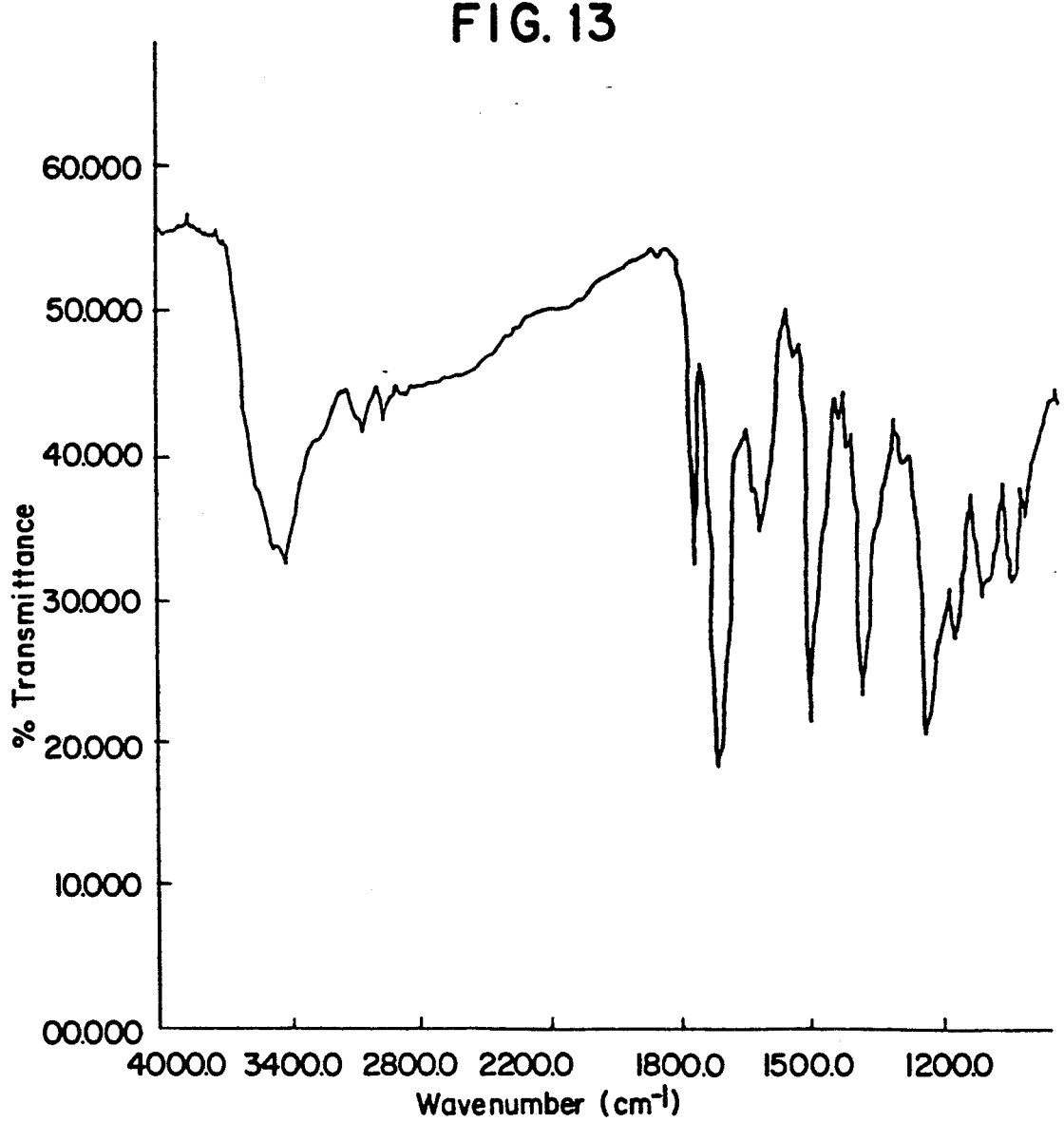
FIG. 13 is a diagram to illustrate the IR spectrum of the product obtained in Example 31.
Figure 14:
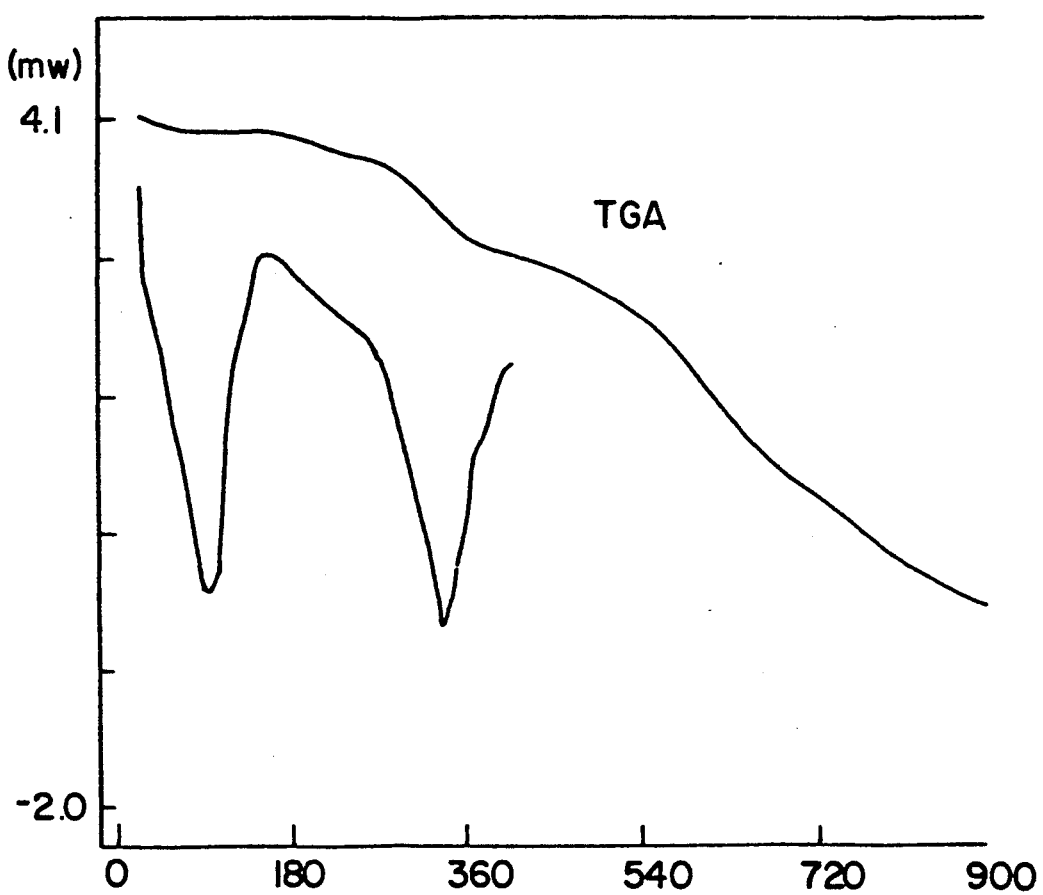
FIG. 14 is a diagram to illustrate the DSC curve and TG curve of the product obtained in Example 31.

Fifteen grams of the sample was dissolved in 85 g of NMP, and the solution was filtered by applying a pressure while it wa still hot, and the air bubbles were removed by reducing the pressure. The solution was cast on a glass plate by means of a doctor knife. This membrane was seried at 85° C. under a reduced pressure for 2 hours and then at 160° C. for 2 hours. The membrane was then heated under an IR lamp at 160° C. for 2 hours. The membrane was peeled off the glass plate, and dried at 165° C. under a reduced pressure for 3 hours, to obtain a polyimide membrane. Gas permeability was measured by high vacuum method. H$_2$ permeation rate was 598 (10$^{-12}$ cm$^3$ (CTP) cm/cm$^2$.S.cm Hg. With the polyimide reported in literature, it was 512. CO permeability was 8.5. Thus, CO/H$_2$ selectivity was 70, which is excellent for a H$_2$ separation membrane. Weight loss was noted at 285° C., 424° C. and 571° C. by TG analysis. IR spectrum, DSC curve and TG curve of the product are illustrated, respectively, in FIG. 13 and FIG. 14.

EXAMPLE 32

The apparatus of Example 31 was used. 29.42 g (100 millimols) BPDA, 18.62 g (50 millimols) 3,3'-dimethyl-4,4'-diaminobiphenyl-6,6'-disulfonic acid, 260 g M solution and 16 g pyridine were addes. While introducing nitrogen gas, they were heated and agitated at 140° C. for 30 minutes and at 160° C. for 1 hour (400 rpm). The reaction mixture was cooled in air, and then 25.92 g (50 millimols) HFBAPP and 20 ml toluene were added, and they were agitated at 160° C. for 30 minutes and at 190° C. for 10 hours in nitrogen gas atmosphere. Formed water was removed. The reaction mixture was poured in methanol, as in Example 1, to obtain 67.0 g of polyimide powder. IR absorption spectrum showed the characteristic absorption peaks of imide at 722, 726, 1383, 1720, and 1776 cm$^{-1}$.

EXAMPLE 33

Figure 15:
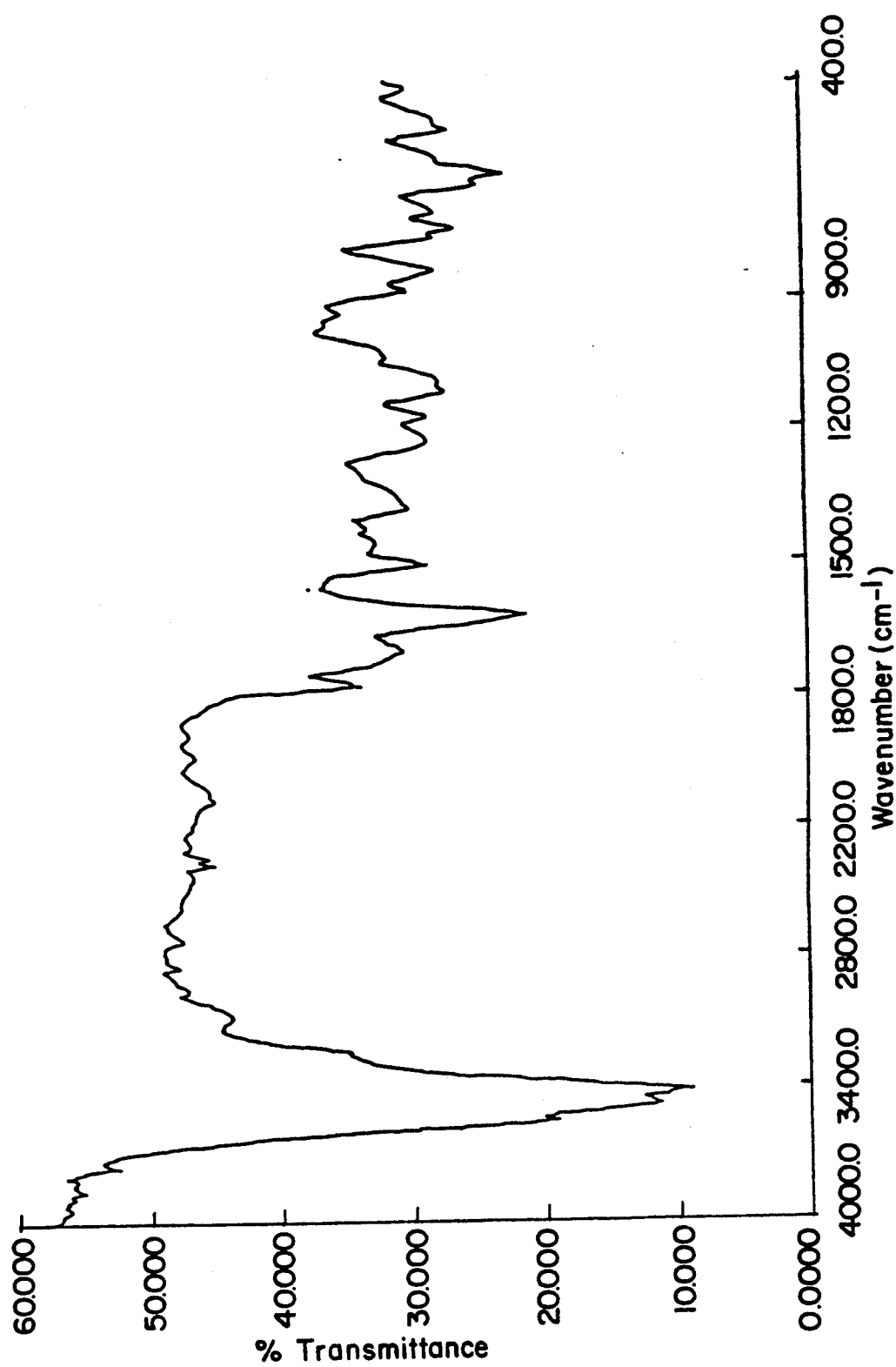
FIG. 15 is a diagram to illustrate the IR spectrum of the product obtained in Example 33.

The procedure and apparatus of Example 31 were used. 17.66 g (60 millimols) BPDA, 1.64 g (15 millimols) 2,6-diaminopyridine (product of Merck Company), 80 g M solution and 2 pyridine were added. In nitrogen gas atmosphere, they were agitated at room temperature for 30 minutes, at 100° C. for 1 hour, and at 160° for 80 minutes. The reaction mixture was cooled in air, and then 9.03 g (45 millimols) 4,4'-diaminodiphenylether, 40 g M solution and 10 ml toluene were added. The reaction mixture was agitated at room temperature for 30 minutes, at 160° C. for 1 hour and at 180° C. for 3 hours. A highly viscous reaction mixture was thus obtained. It as poured in methanol, to obtain 32.2 g of polyimide powder. The IR spectrum showed the characteristic absorption peaks of imide at 759, 1382, 1705 and 1775 cm$^{-1}$. IR spectrum of the product is illustrated in FIG. 15.

EXAMPLE 34

The procedure and apparatus of Example 31 were used. 17.65 g (60 millimols) BPDA, 5.65 g (30 millimols) 2,4-diaminobenzenesulfonic acid, 130 g M solution, and 4 g pyridine were added to the flask. In nitrogen atmosphere, they were agitated at room temperature for 30 minutes, at 140° C. for 1 hour and then at 160° C. for 1 hour. The reaction mixture was cooled in air, and then 3.27 g (30 millimols) 2,6-diaminopyridine and 10 ml toluene were added, and agitated at 160° C. for 30 minutes and at 190° C. for 4 hours. The highly viscous fluid was poured in methanol, to obtain 27.7 g of yellow polyimide powder. Inherent viscosity of the 0.5% solution in NMP was 0.57. The 15% polyimide solution in NMP was cast on a glass plate, and dried by heating to obtain a strong film. IR spectrum showed the characteristic absorption peaks of imide at 737, 1358, 1729 and 1777 cm$^{-1}$.

EXAMPLE 35

The procedure and apparatus of Example 31 were used. 17.65 g (60 millimols) BPDA, 5.65 g (30 millimols) 2,4-diaminobenzene sulfonic acid, 4 g pyridine and 130 g M solution were added to the flask. They were agitated at room temperature for 30 minutes and heated at 140° C. for 1 hour and at 160° C. for 1 hour, and then 3.27 g (30 millimols) 2,6-diaminopyridine and 15 ml toluene were added. The reaction mixture was heated and agitated at 120° C. for 1 hour and at 180° C. for 5 hours. The reaction mixture was poured in methanol, to obtain 28.2 g of polyimide powder.

TG analysis showed an endothermic peak at 356° C., and the thermal decomposition temperature was 531° C.

EXAMPLE 36

The procedure and apparatus of Example 31 were used. 14.711 g (50 millimols) BPDA, 2.72 g (25 millimols) 2,6-diaminopyridine, 100 g M solution and 6.8 g (200 millimols) pyridine were added. Reaction took place at room temperature for 30 minutes, at 80° C. for 1 hour and at 135° C. for 1 hour. After cooling in air, 9.31 g (25 millimols) 3,3'-dimethyl-4,4'-diaminobiphenyl-6,6'-disulfonic acid, 10 g pyridine and 10 ml toluene were added, and the reaction mixture was agitated at room temperature for 1 hour, at 140° C. for 1 hour, and at 196° C. for 5 hours in nitrogen gas atmosphere.

The reaction mixture was poured in methanol, to obtain 26.0 g of polyimide powder. IR spectrum showed the characteristic absorption peaks of imide at 722, 1351, 1720, and 1777 cm$^{-1}$. In TG analysis, weight loss started at 314° C. and at 515° C.

EXAMPLE 37

The procedure and apparatus of Example 31 were used. 14.712 g (50 millimols) BPDA, 3.13 g (25 millimols) 2,4-diamino-6-methyl-s-triazine, and 120 g M solution were added, and they were agitated at room temperature for 30 minutes, at 120° C. for 1 hour and at 150° C. for 2 hours. Then, 5.0 g (25 millimols) 4,4'-diaminodiphenylether and 10 ml toluene were added, and they were reacted at room temperature for 30 minutes and at 180° C. for 5 hours. The reaction mixture was poured in methanol, to obtain 18.6 g of polyimide powder. IR spectrum showed the characteristic absorption peaks at 737, 1328, 1381, 1720 and 1722 cm$^{-1}$.

EXAMPLE 38

The procedure and apparatus of Example 31 were used. 14.71 g (25 millimols) BPDA, 9.31 g (25 millimols) 3,3'-dimethyl-4,4'-diaminobiphenyl-6,6'-disulfonic acid, 130 g M solution and 8 g pyridine were added, and they were heated and agitated at 80° C. for 30 minutes, at 120° C. for 1 hour and then at 140° C. for 1 hour. Then, 10.81 g (25 millimols) bis-[4-(4-aminophenoxy)phenyl]- sulfone, and 10 ml toluene were added, and heated and agitated at 140° C. for 30 minutes and at 190° C. for 6 hours and 20 minutes. The reaction mixture was poured in methanol, to obtain 33.7 g of polyimide powder. IR spectrum showed the characteristic absorption peaks of imide at 716, 742, 1320, 1717 and 1775 cm$^{-1}$.

In TG analysis, weight loss started to occur at 295° C. and 505° C.

EXAMPLE 39

The procedure and apparatus of Example 31 were used. 14.711 g (50 millimols) BPDA, 7.130 g (25 millimols) 2,4-diaminoazobenzenedihydrochloride, 100 g M solution, and 12 g pyridine were added, and they were agitated at room temperature for 30 minutes and at 160° C. for 1 hour. Then 7.31 g (25 millimols) 1,3-bis(4-aminophenoxy)benzene and 10 ml toluene were added, and heated and agitated at 140° C. for 1 hour and at 190° C. for 2 hours. The reaction mixture was poured in methanol, to obtain 28.6 g of polyimide powder.

IR spectrum showed the imide absorption peaks at 739, 1375, 1721, and 1776 cm$^{-1}$. In TG analysis, thermal decomposition temperature was 566° C.

EXAMPLE 40

The procedure and apparatus of Example 31 were used. 14.71 g (50 millimols) BPDA, 5.31 g (25 millimols) 3,3'-dimethyl-4,4'-diaminobiphenyl, 150 g M solution, and 8 g pyridine were added, and heated and agitated at 80° C. for 1 hour and at 160° C. for 1 hour. Then, 10.26 g (25 millimols) 2,2-bis[4-(4-aminophenoxy)phenyl]propane, 50 g M solution and 15 ml toluene were added, and heated and agitated at 190° C. for 4 hours. The reaction mixture was poured in methanol, to obtain 27.9 g of polyimide powder. By TG analysis, thermal decomposition temperature was found at 541° C.

EXAMPLE 41

The procedure and apparatus of Example 31 were used. 14.71 g (50 millimols) BPDA, 3.83 g 25 millimols) 2,4-diaminonitrobenzene, 120 g M solution, and 4 g pyridine were added, and they were agitated at room temperature for 30 minutes and at 140° C. for 90 minutes. Then, 10.26 g (25 millimols) 2,2-bis[4-(4-aminophenoxy)phenyl]propane, 20 g M solution and 15 ml toluene were added, and they were heated and agitated at 140° C. for 1 hour and at 190° C. for 4 hours. The reaction mixture was poured in methanol, to obtain 20.9 g of yellow polyimide powder. IR spectrum showed the characteristic absorption peaks at 738, 1376, 1721, and 1778 cm$^{-1}$.

EXAMPLE 42

The procedure and apparatus of Example 31 were used. 14.71 g (50 millimols) BPDA, 9.31 g (25 millimols) 3,3'-dimethyl-4,4'-diaminobiphenyl-6,6'-disulfonic acid, 130 g M solution and 9 g pyridine were added, and they were agitated at room temperature for 30 minutes and at 140° C. for 2 hours. Then, 9.46 g (25 millimols) 4,4'-diaminodiphenylmethane and 10 ml toluene were added, and heated and agitated at 120° C. for 30 minutes and then at 190° C. for 4 hours. The reaction mixture was poured in alcohol, to obtain 29.1 g of polyimide powder. Inherent viscosity of this polyimide powder at 30° C. was 0.75. The powder was dissolved in NMP to form a 15% solution and the solution was cast on a glass plate, and dried by heating, to obtain a strong film. IR spectrum showed the characteristic absorption peaks at 721, 1373, 1719 and 1776 cm$^{-1}$.

EXAMPLE 43

The procedure and apparatus of Example 31 were used. 14.71 g (50 millimols) BPDA, 9.31 g (25 millimols) 3,3'-dimethyl-4,4'-diaminobiphenyl-6,6'-disulfonic acid, 130 g X solution and 8 g pyridine were added. They were heated and agitated at 140° C. for 2 hours, and then 4,4'-diaminodiphenylsulfone 6.21 g (25 millimols) and toluene 10 ml were added, and they were heated and agitated at 140° C. for 1 hour and then at 190° C. for 3 hours. The reaction mixture was poured in alcohol, to obtain 30.4 g of white powder. IR spectrum showed the characteristic absorption peaks at 721, 1373, 1719, and 1776 cm$^{-1}$.

EXAMPLE 44

The procedure and apparatus of Example 31 were used. 17.41 g (50 millimols) BPDA, 9.31 g (25 millimols) 3,3'-dimethyl-4,4'-diaminobiphenyl-6,6'-disulfonic acid, 130 g M solution and 8 g pyridine were added, and heated and agitated at 120° C. for 2 hours. Then, o-tolidine sulfone (product of Wakayama Seika K.K.) 6.86 g (25 millimols) and 10 ml toluene were added, and the reaction mixture was heated and agitated at 120° C. for 2 hours and then at 190° C. for 3 hours. The reaction mixture was poured in methanol, to obtain 31.5 g of polyimide powder. Inherent viscosity was 0.82 at 30° C. The powder was dissolved in NMP and cast on a glass plate. The film was heated and dried, to obtain a strong film. IR spectrum showed the characteristic absorption peaks at 722, 1375, 1371, 1719, and 1776 cm$^{-1}$.

EXAMPLE 45

The procedure and apparatus of Example 31 were used. 4.71 g (50 millimols) BPDA, 9.2 g (25 millimols) 4,4'-diaminostilbene-2,2'-disulfonic acid, 130 g 8 pyridine were charged in the reactor. They were heated and agitated at 80° C. for 1 hour and then at 140° C. for 2 hours. Then 6.21 g (25 millimols) 4,4'-diaminodiphenylsulfone and 10 ml toluene were added, and then agitated at room temperature for 30 minutes and at 190° C. for 4 hours. The reaction mixture was poured in methanol, to obtain 34.5 g of powder. IR spectrum showed the characteristic absorption peaks at 739, 1369, 1721 and 1775 cm$^{-1}$. In TG analysis, weight loss started to occur at 289° C. and 552° C.

EXAMPLE 46

The procedure and apparatus of Example 31 were used. 29.42 g (100 millimols) BPDA, 17.426 g (50 millimols) FDA, 260 g M solution, and 6 g pyridine were charged in the flask. They were heated and agitated at 120° C. for 30 minutes and then at 150° C. for 90 minutes. Then 18.62 g (50 millimols) 3,3'-dimethyl-4,4'-diaminobiphenyl-6,6'-disulfonic acid, 10 g pyridine and 20 ml toluene were added, and heated and agitated at 150° C. for 1 hour and then at 190° C. for 10 hours. The reaction mixture was poured in methanol, to obtain 68.5 g of polyimide powder. Rotor viscosity of the reaction mixture was 10,500 cp (30° C.), and the IR spectrum showed the characteristic absorption peaks at 742, 1376, 1716, and 1775 cm$^{-1}$.

EXAMPLE 47

The procedure and apparatus of Example 31 were used. 14.71 g (50 millimols) BPDA, 8.61 g (25 millimols) 2,2'-benzidinedisulfonic acid, 130 g M solution, and 8 g pyridine were added. They were heated and agitated at 80° C. for 30 minutes and then at 130° C. for 1 hour.

Then 7.31 g (25 millimols) 1,3-bis-(3-aminophenoxy)-benzene and 10 ml toluene were added and heated and agitated at 130° C. for 30 minutes and then at 180° C. for 3 hours. The reaction mixture was poured in methanol, to obtain polyimide powder. The powder was dissolved in NMP to prepare a 10% solution, and the solution was cast on a glass plate, heated and dried, to obtain a strong film. IR absorption spectrum showed the characteristic absorption peaks at 739, 1374, 1718, and 1774 cm$^{-1}$. In TG analysis, weight loss started to occur at 314° C. and 576° C.

EXAMPLE 48

The procedure and apparatus of Example 31 were used. 14.71 g (50 millimols) BPDA, 6.844 g (25 millimols) Acridine Yellow G (purity=90%) (a product of Aldrich Chemical Co., Inc.), 110 g M solution, and 8 g pyridine were added. They were heated and agitated at 100° C. for 2 hour and then at 140° C. for 1 hour. Then 9.31 g (25 millimols) 2,2'-benzidinedisulfonic acid, 8 g pyridine and 10 ml toluene were added, and then heated and agitated at 140° C. for 1 hour. Then 0.86 g Acrydine Yellow G was added, and the reaction mixture was heated and agitated at 190° C. for 3 hours and 30 minutes. The reaction mixture was poured in methanol, to obtain 31.6 g of polyimide powder. IR absorption spectrum showed the characteristic absorption peaks at 740, 1362, 1722, and 1777 cm$^{-1}$. In TG analysis, weight loss started to occur at 308° C. and 583° C.

EXAMPLE 49

Figure 16:
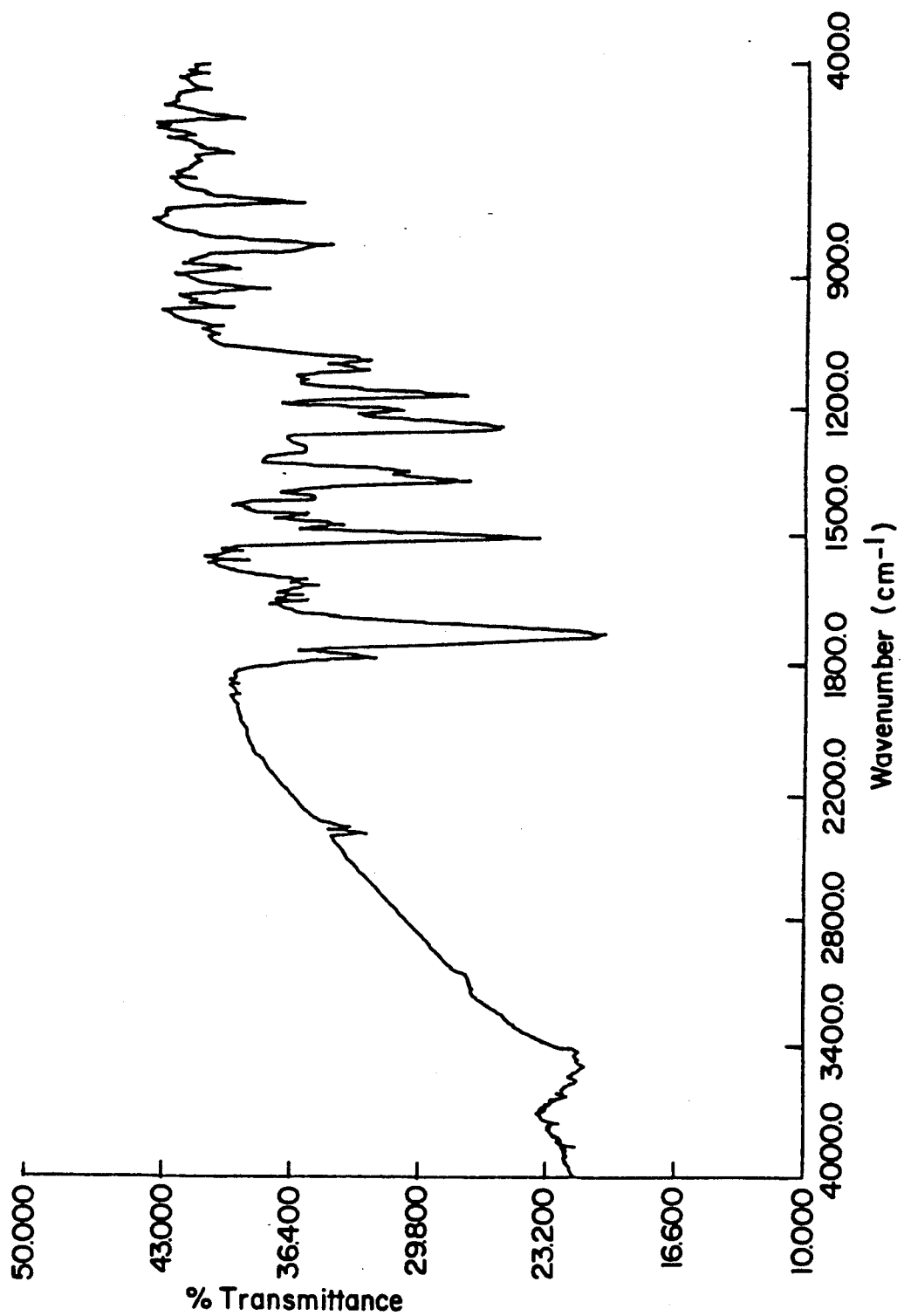
FIG. 16 is a diagram to illustrate the IR spectrum of the product obtained in Example 49.
Figure 17:
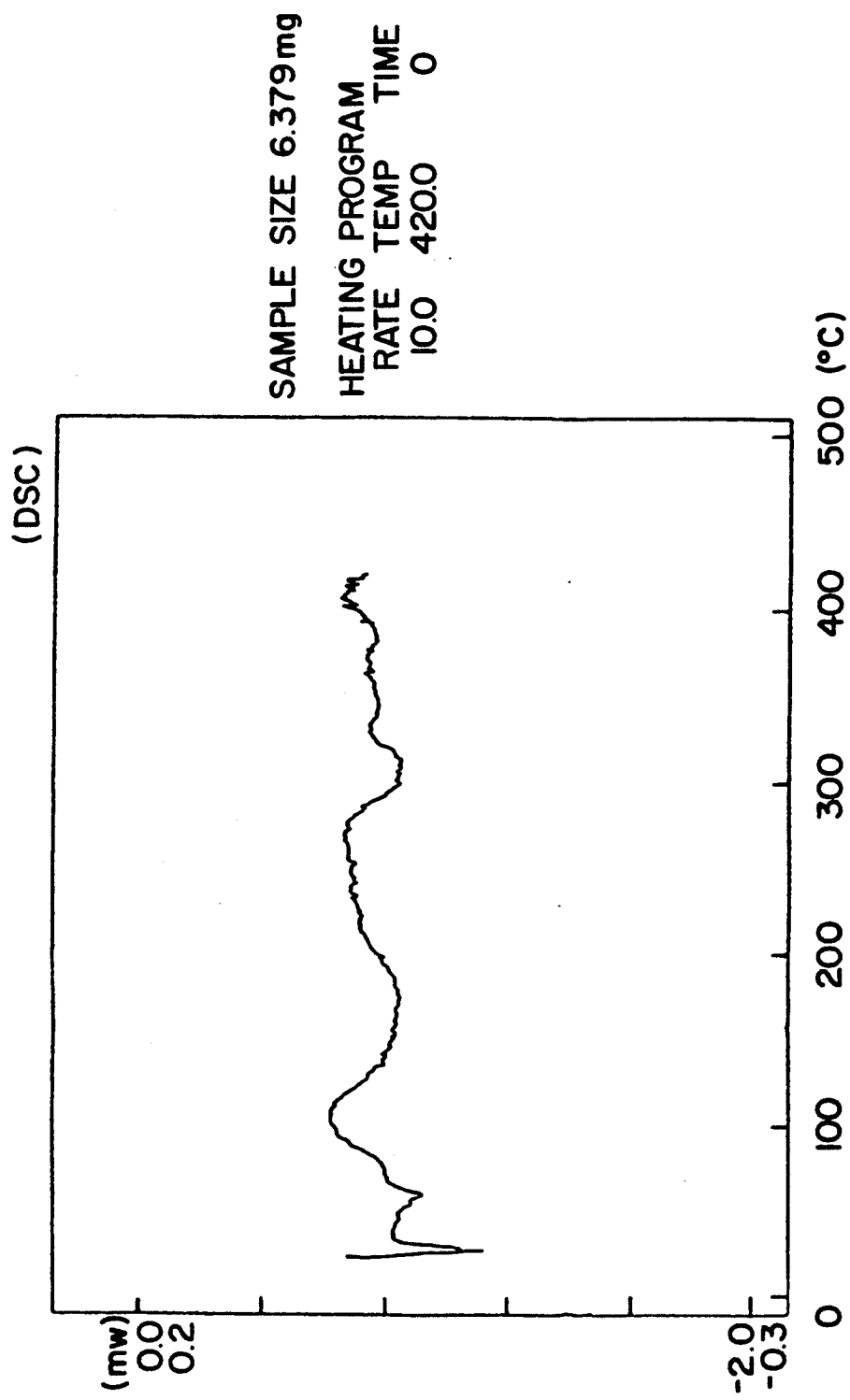
FIG. 17 is a diagram to illustrate the DSC curve of the product obtained in Example 49.
Figure 18:
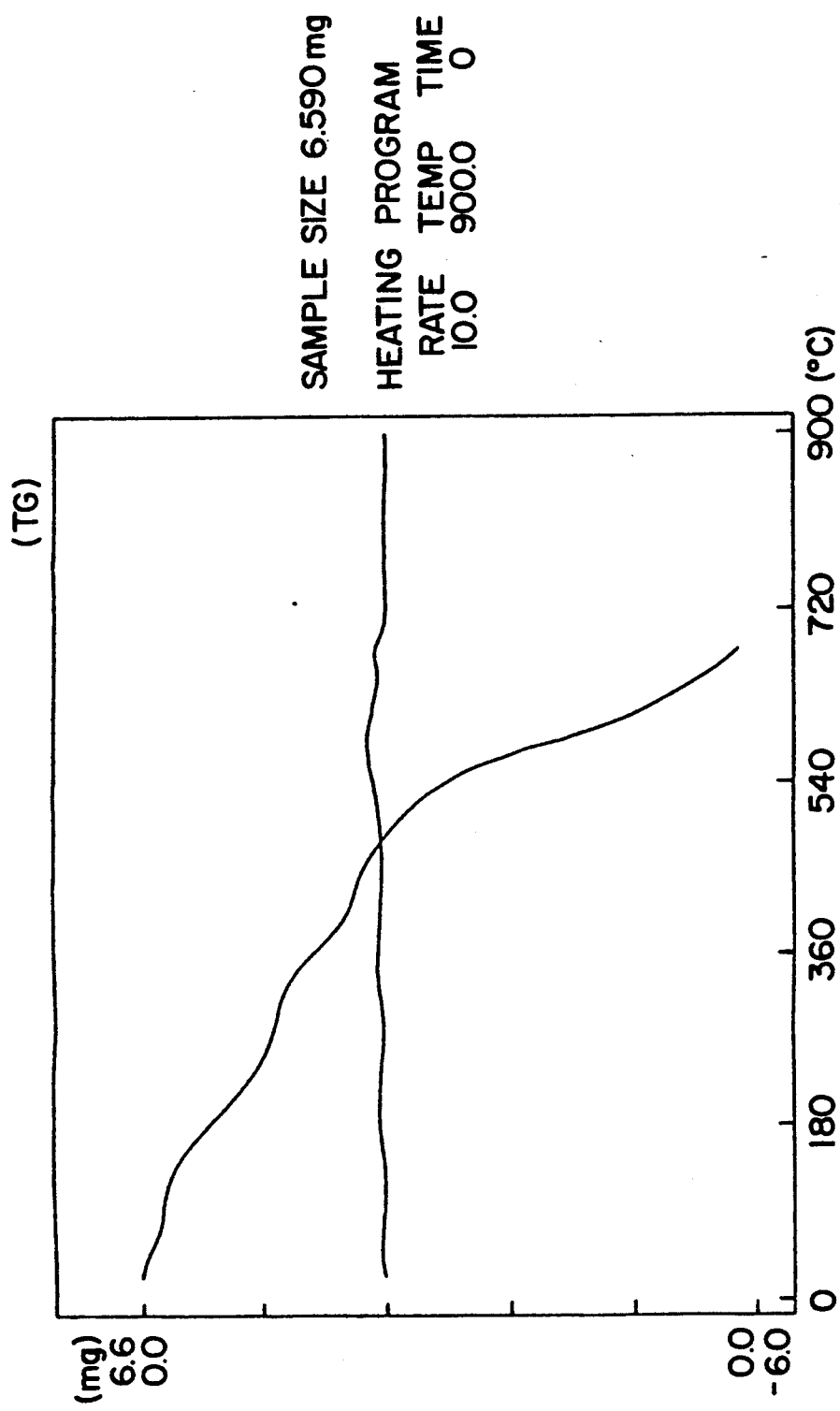
FIG. 18 is a diagram to illustrate the TG curve of the product obtained in Example 49.

The procedure and apparatus of Example 31 were used. 10.91g (50 millimols) pyromellitic dianhydride, (1,2,4,5-benzenetetracarboxylic dianhydride) ("PMDA"), diaminobiphenyl-6,6'-disulfonic acid, 130 g M solution, and 8 g pyridine were added. While introducing nitrogen gas, they were heated and agitated at 80° C. for 1 hour and then at 130° C. for 1 hour (500 rpm). The reaction mixture was cooled in air, and then 10.81 g (25 millimols) bis[4,-(4-aminophenoxy)diphenyl]sulfone, and 10 ml toluene were added, and they were heated and agitated at 190° C. for 5 hours in nitrogen gas atmosphere. Formed water was removed. A highly viscous polyimide solution was thus obtained. As in Example 1, the reaction mixture was poured in methanol, to obtain 35.1 g of polyimide powder. In TG analysis, weight loss started to occur at 321° C. and 524° C. IR spectrum, DSC curve, and TG curve of the product are illustrated, respectively, in FIG. 16, FIG. 17 and FIG. 18.

EXAMPLE 50

The procedure and apparatus of Example 31 were used. 10.91 g (50 millimols) 1,2,4,5-benzenetetracarboxylic dianhydride, 9.31 g (25 millimols) 3,3'-dimethyl-4,4'-diaminobiphenyl-6,6'-disulfonic acid, 130 g M solution, and 8 g pyridine were added to the flask. They were heated and agitated at 60° C. for 30 minutes and then at 130° C. for 1 hour in nitrogen gas atmosphere. The reaction mixture was cooled in air, and then 2.73 g (25 millimols) 2,6diaminopyridine and 10 ml toluene were added. The reaction mixture was heated and agitated at 130° C. for 30 minutes and then at 180° C. for 5 hours in nitrogen gas atmosphere. The reaction mixture was poured in methanol, to obtain 18.1 g of polyimide powder. IR spectrum showed the characteristic absorption peaks of imide at 726, 1379, 1725 and 1780 cm$^{-1}$.

In TG analysis, weight loss started to occur at 325° C. and 509° C.

EXAMPLE 51

(Three-stage polymerization process)

Figure 19:
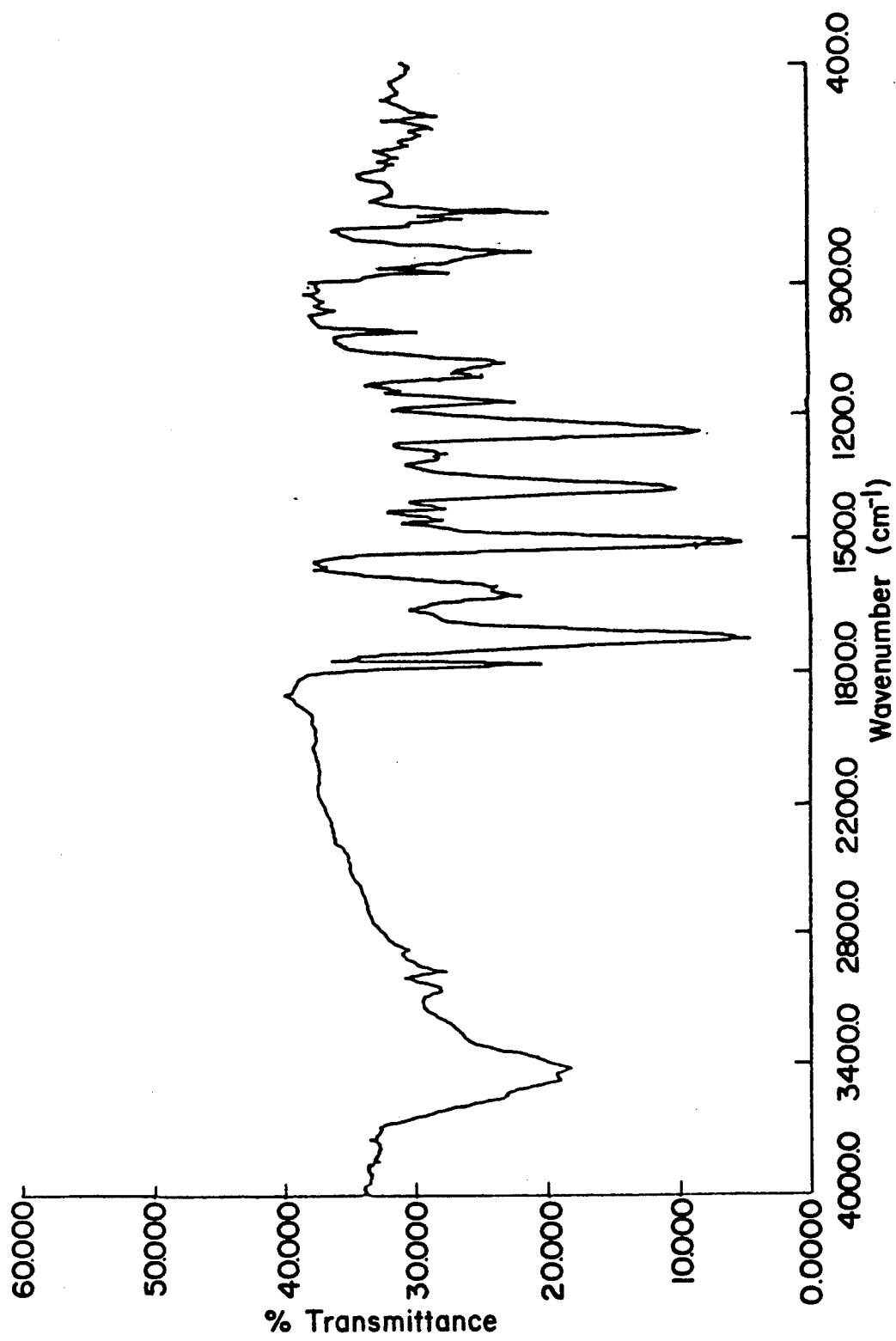
FIG. 19 is a diagram to illustrate the IR spectrum of the product obtained in Example 51.
Figure 20:
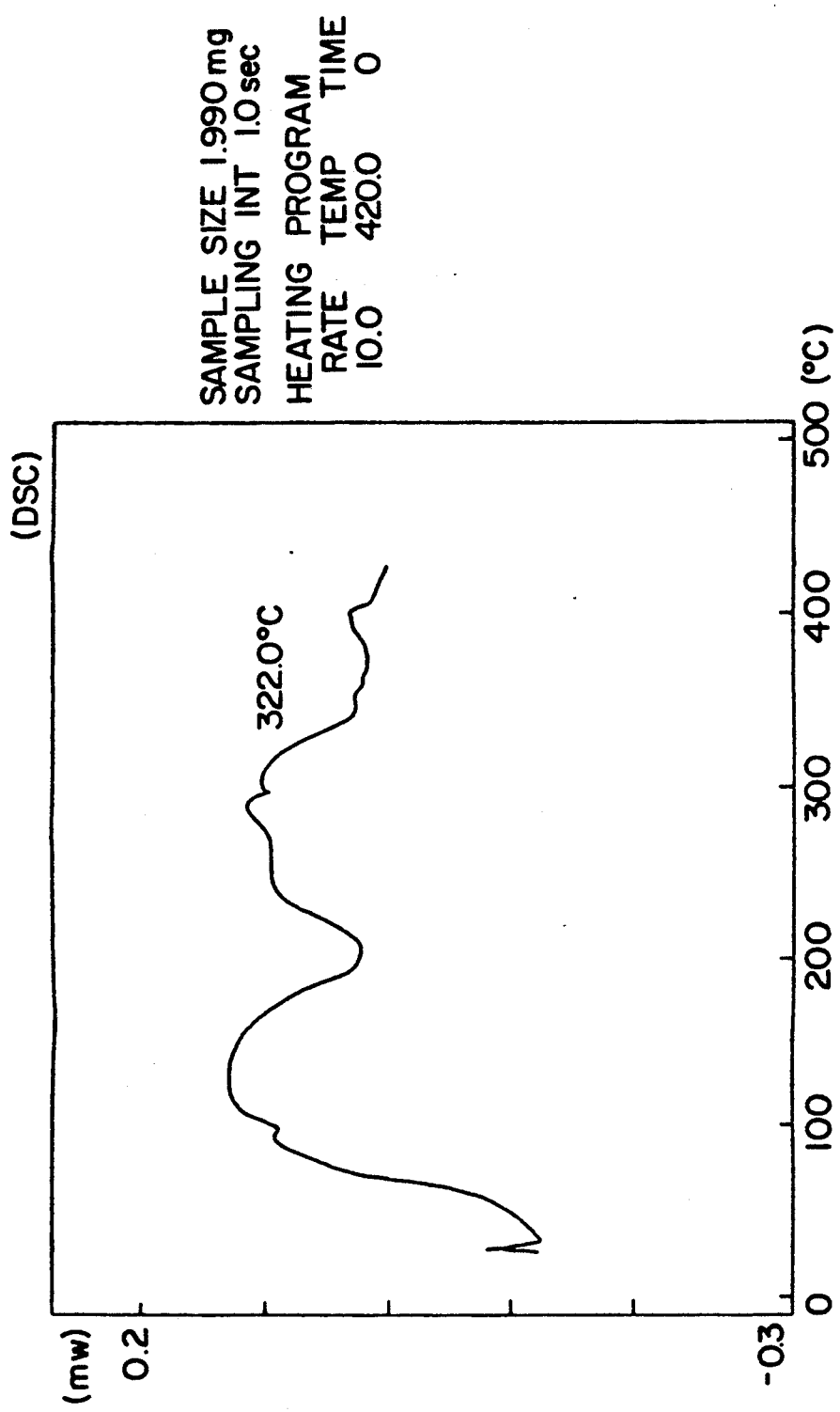
FIG. 20 is a diagram to illustrate the DSC curve of the product obtained in Example 51.
Figure 21:
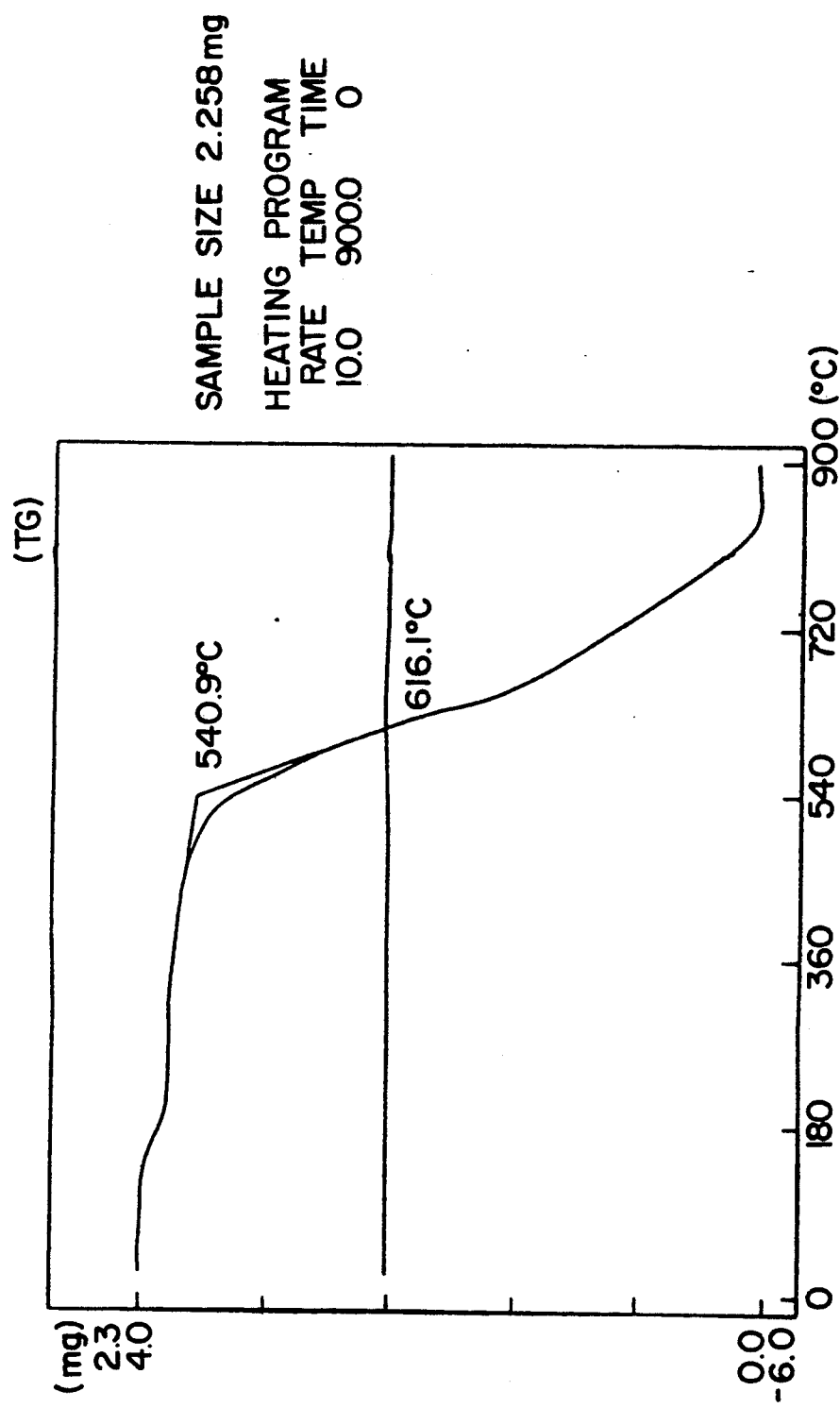
FIG. 21 is a diagram to illustrate the TG curve of the product obtained in Example 51.

The apparatus Of Example 31 was used. 13.24 g (45 millimols) BPDA, 10.02 g (50 millimols) 4,4-millimol diaminodiphenylether, 100 g M solution, 30 g resorcinol, and 3 g pyridine were added. They were agitated at 30° C. for 30 minutes, at 80° C. for 1 hour, at 140° C. for 80 minutes, and then at 180° C. for 2 hours (400 rpm) in a stream of nitrogen gas. After cooling in air, 8.83g (30 millimols) BPDA, 30g M solution, 9 g resorcinol and 1.5 g pyridine were added, and then 10 ml toluene was added. The reaction mixture was heated and agitated at 180° C. for 2 hours in nitrogen gas atmosphere. Subsequently, it was cooled in air, and then 10.81 g (25 millimols) bis[4-(4-aminophenoxy)phenyl]sulfone, 30 g M solution, 9 g resorcinol, 1.5 g pyridine and 10 ml toluene were added. The reaction mixture was agitated for 1 hour, and then heated and agitated at 140° C. for 1 hour and then at 180° C. for 3 hours and 30 minutes. The water formed during the reaction boiled azeotropically with toluene, and water was removed. A highly viscous polyimide solution was thus obtained. The product was poured in 1 liter of methanol, and it was pulverized by a mixer which was rotating at a high speed. The precipitate was filtered, washed with methanol, and dried in air, to obtain 50.3 g of block polyimide. Thermal decomposition temperature was found at 541° C. by TG analysis. IR spectrum showed the characteristic absorption peaks of imide at 739, 1373, 1719 and 1775 cm$^{-1}$. IR spectrum, DSC curve, and TG curve of the product are illustrated in FIG. 19, FIG. 20 and FIG. 21.

The block polyimide in the form of powder as obtained above was dissolved in a mixture solution of M solution and resorcinol at a weight ratio of 10:3 under heating to prepare a 10 wt.% solution of the polyimide. This solution was cast on a glass plate and dried at 120° C. for one hour and at 150° C. for one hour under reduced pressure to give a polyimide film.

EXAMPLE 52

(Three-stage polymerization process)

The procedure and apparatus of Example 51 were used. 14.711 g (50 millimols) BPDA, 18.423 g (45 millimols) 2,2-bis(4-aminophenoxy)phenyl]propane, 100 g M solution, 30 g resorcinol, and 3 g pyridine were added, and they were agitated at room temperature for 30 minutes, at 80° C. for 1 hour and then at 180° C. for 2 hours. The reaction mixture was cooled in air, and then 10.455 g (30 millimols) FDA, 30 g M solution, 9 g resorcinol, 1.5 g pyridine and 10 ml toluene were added. The reaction mixture was heated and agitated at 180° C. for 2 hours. It was cooled in air, and then 7.36 g (25 millimols) BPDA, 30 g M solution, 9 g resorcinol, 1.5 g pyridine and 10 ml toluene were added, and agitated at room temperature 1 hour. Then, it was heated and agitated at 140° C. for 1 hour and then at 180° C. for 3 hours and 30 minutes. The reaction mixture was poured in methanol, to obtain 62.6 g of block polyimide. Thermal decomposition temperature, determined by TG analysis, was 577° C. IR spectrum showed the characteristic absorption peaks of imide at 37, 1374, 1714, and 1775 cm$^{-1}$.

EXAMPLE 53

The procedure and apparatus of Example 31 were used. 8.23 g (40 millimols) 1,2,4,5-benzenetetracarboxylic dianhydride, 2.18 g (20 millimols) 2,6-diaminopyridine, 130 g X solution, 39 g resorcinol, and 4 g pyridine were added, and they were agitated at room temperature for 1 hour, at 80° C. for 1 hour and then at 160° C. for 2 hours and 30 minutes. The reaction mixture was cooled in air, and then 8.65 g (20 millimols) bis[4-(4-aminophenoxy)phenyl]sulfone, 20 g X solution, 6 g resorcinol and 10 ml toluene were added. The reaction mixture was agitated at room temperature for 30 minutes and then heated and agitated at 140° C. for 30 minutes and at 180–190° C. for 4 hours. A viscous polyimide solution was thus obtained. It was poured in methanol, to obtain 19 g of polyimide powder. IR spectrum showed the characteristic absorption peaks at 737, 1357, 1724 and 1778 cm$^{-1}$.

EXAMPLE 54

The procedure and apparatus of Example 31 were used. 11.77 g (40 millimols) BPDA, 2.18 g (20 millimols) 2,6-diaminopyridine, 130 g X solution, 39 g agitated at room temperature for 1 hour, at 80° C. for 1 hour and then at 160° C. for 2 hours and 30 minutes. The reaction mixture was cooled in air, and then 8.65 g (20 millimols) bis[4-(4-aminophenoxy)phenyl]sulfone, 20 g X solution, 6 g resorcinol, and 10 ml toluene were added. The reaction mixture was agitated at room temperature for 30 minutes, at 140° C. for 30 minutes and then at 180–190° C. for 4 hours, to obtain a viscous polyimide solution. The reaction mixture was poured in methanol, to obtain 22 g of polyimide powder. IR spectrum showed the characteristic absorption peaks at 737, 1348, 1711 and 1776 cm$^{-1}$.

EXAMPLE 55

The procedure employed was substantially the same as that of Example 19. 6.62 g (22.5 millimols) BPDA, 8.71 (25 millimols) FDA, 50 g M solution, 10 g resorcinol and 2 g (25 millimols) pyridine were added to the flask as used in Example 14. The mixture was agitated at the rate of 400 rpm in a stream of nitrogen gas at 80° C. for one hour, at 140° C. for one hour and at 180° C. for one hour. Five minutes after cooling the reaction solution in air, 4.41 g (15 millimols) BPDA, 10 g M solution, and 10 ml toluene were added to the reaction solution. Then the reaction mixture solution was agitated at the rate of 400 rpm in a stream of nitrogen gas at 140° C. for 40 minutes and 180° C. for one hour. The water formed during the reaction was removed by azeotropic distillation with toluene. Subsequently, the reaction solution was cooled in air and then 5.41 g (12.5 millimols) bis[4-(4-aminophenoxy)phenyl]sulfone and 30 g M solution were added to the reaction solution. The reaction mixture solution thus obtained was agitated at the rate of 400 rpm in a stream of nitrogen gas 140° C. for 40 minutes and then at 180° C. for one hour while removing all the toluene during the reaction, giving a viscous solution. This viscous solution was treated in the same manner as in Example 14 to obtain 25.6 g of polyimide powder. The inherent viscosity was 0.47. The infrared absorption spectrum showed the characteristic absorption peaks of imide at 733, 1369, 1715 and 1776 cm$^{-1}$. The thermal decomposition temperature was 595° C., and the glass transition temperature was observed at 339° C. by the DSC measurement.

EXAMPLE 56

The procedure employed was substantially the same as that of Example 55. 7.36 g (25 millimols) BPDA, 7.84 g (22.5 millimols) FDA, 50 g M solution, 10 g resorcinol and 2 g (25 millimols) pyridine were used. The mixture was agitated at the rate of 400 rpm in a stream of nitrogen gas at 80° C. for one hour, at 140° C. for one hour and at 180° C. for one hour. Five minutes after cooling the reaction solution in air, 6.49 g (15 millimols) bis[4-(4-aminophenoxy)phenyl]sulfone, 10 g M solution and 10 ml toluene were added to the reaction solution. The reaction solution was then stirred at the rate of 400 rpm in a stream of nitrogen gas at 140° C. for 40 minutes, and at 180° C. for one hour. After cooling the reaction solution, 3.68 g (12.5 millimols) BPDA and 30 g M solution were added. This reaction solution was agitated at the rate of 400 rpm in a stream of nitrogen gas at 140° C. for 40 minutes and at 180° C for one hour while removing all the toluene during the reaction. The reaction solution became viscous at the final stage. This viscous solution was treated in the same manner as in Example 14 to obtain 32.3 g of polyimide powder. The inherent viscosity was 0.66. The infrared absorption spectrum showed the characteristic absorption peaks of imide at 739, 1376, 1721 and 1775 cm$^{-1}$. The thermal decomposition temperature was 572° C. The glass transition temperature was observed at 348° C. by the DSC measurement.

EXAMPLE 57

The procedure employed was substantially the same as that of Example 55. 4.1 g (22.5 millimols) 1,2,4,5-benzenetetracarboxylic dianhydride, 9.31 g (25 millimols) 3,3'-dimethyl-4,4'-diaminobiphenyl-6,6'-disulfonic acid, 50 g M solution, 15 g resorcinol and 12 g (75 millimols) pyridine were used. The solution was agitated at the rate of 400 rpm in a stream of nitrogen gas at 80° C. for one hour, at 140° C. for one hour, and then at 180° C. for one hour. After cooling the solution in air, 3.27 g (15 millimols) 1,2,4,5-benzenetetracarboxylic dianhydride, 50 g M solution, 0.8 g pyridine and 10 ml toluene were added to the reaction solution. The reaction solution was agitated at the rate of 400 rpm in a stream of nitrogen gas at 140° C. for 50 minutes and at 180° C. for one hour. Subsequently, the reaction solution was cooled in air, and then 5,41 g (12.5 millimols) bis[4-(4-aminophenoxy)phenyl]sulfone, 75 g M solution, 0.8 g pyridine and 30 g resorcinol were added to the reaction solution. The reaction solution thus obtained was agitated at the rate of 400 rpm in a stream of nitrogen gas at 140° C. for one hour and then at 180° C. for one hour while removing toluene during the reaction. The reaction solution was treated in the same manner as in Example 55 to obtain 26.1 g of polyimide powder. This powder was not soluble in NMP. The infrared absorption spectrum showed the characteristic absorption peaks of imide at 725, 1376, 1724 and 1778 cm$^{-1}$. The heat absorption began at 327° C. and the decomposition temperature was 500° C. by the TG measurement.

The polyimide powder as obtained above was dissolved in a mixture solution of M solution and resorcinol at a weight ratio of 10:3 under heating to prepare a 5 wt.% solution of the polyimide. This solution was cast on a glass plate and dried at 120° C. for one hour and at 150° C. for one hour under reduced pressure to give a polyimide film.

EXAMPLE 58

The procedure employed was substantially the same as that of Example 57. In this case, however, 5.45 g (25 millimols) 1,2,4,5-benzenetetracarboxylic dianhydride, 8.38 g (22.5 millimols) 3,3'-dimethyl4,4'-diaminobiphenyl-6,6'-disulfonic acid, 50 g M solution, 15 g resorcinol and 12 g (75 millimols) pyridine were used. The solution was agitated at the rate of 400 rpm in a stream of nitrogen gas at 80° C. for one hour, at 140° C. for one hour and 180° C. for one hour. After cooling the reaction solution, 6.49 g (15 millimols) bis[4-(4-aminophenoxy)-phenyl]sulfone, 50 g M solution, 0.8 g pyridine and 15 ml toluene were added to the reaction solution. The reaction solution thus obtained was agitated at the rate of 400 rpm in a stream of nitrogen gas at 140° C. for one hour and at 180° C. for one hour. Subsequently, the reaction solution was cooled in air, and then 2.73 g (12.5 millimols) 1,2,4,5-benzenetetracarboxylic dianhydride, 75 g M solution, 30 g resorcinol and 0.8 g pyridine were added to the reaction solution. The reaction solution was agitated at the rate of 400 rpm in a stream of nitrogen gas at 140° C. for one hour and at 180° C. for one hour. The reaction mixture thus obtained was treated in the same manner as in Example 14 to obtain 24.5 g of polyimide powder which was not soluble in NMP. The infrared spectrum showed the characteristic absorption peaks of imide at 724, 1375, 1724 and 1778 cm$^{-1}$. The absorption began at 327° C. and the thermal decomposition temperature was 500° C. by the TG measurement. No glass transition temperature was observed by the DSC measurement.

The polyimide powder as obtained above was dissolved by heating in a mixture of M solution and resorcinol at a weight ratio of 10:3 to prepare a 5 wt.% solution of the polyimide. This solution was cast on a glass plate and dried at 120° C. for one hour and at 150° C. for one hour under reduced pressure to give a polyimide film.

EXAMPLE 59

The procedure employed was substantially the same as that of Example 1. 22.21 g (50 millimols) 6FDA, 4.36 g (12.5 millimols) FDA, 75 g M solution and 2.5 g pyridine were used. The mixed solution was agitated at the rate of 500 rpm under nitrogen gas at room temperature for 30 minutes and at 160° C. for one hour and at 180° C. for one hour. After cooling the reaction solution in air, 7.96 g (37.5 millimols) 3,3'-dimethyl-4,4'-diaminobiphenyl, 50 g M solution, 2.5 g pyridine and 10 ml toluene were added to the reaction solution. The reaction solution thus obtained was agitated at the rate of 500 rpm in a stream of nitrogen gas at 180° C. for 5 hours.

The reaction solution was treated in the same manner as in Example 1 to obtain 33.0 g of polyimide powder. The inherent viscosity was 0.95. The thermal decomposition temperature was 530° C. The glass transition temperature was observed at 339° C. by the DSC measurement. The infrared absorption spectrum showed the characteristic absorption peaks of imide at 724, 1368, 1729 and 1780 cm$^{-1}$.

A membrane was prepared in the same manner as in Example 14 and gas permeabilities for pure gases were measured and the results are shown in Table 4 and 5. This dense polyimide film showed high permeabilities for gases and high separation factors. Thus, it may be used for actual gas separation membranes.

EXAMPLE 60

The procedure employed was substantially the same as that of Example 1. 22.21 g (50 millimols) 6FDA, 8.72 g (25 millimols) FDA, 75 g M solution and 2.5 g pyridine were used. The solution was agitated at the rate of 500 rpm in a stream of nitrogen gas at room temperature for 30 minutes, at 160° C. for one hour and at 180° C. for one hour. After cooling the reaction solution in air, 6.21 g (25 millimols) 4,4'-diaminodiphenylsulfone, 50 g M solution, 2.5 g pyridine and 10 ml toluene were added to the reaction solution. The reaction solution thus obtained was agitated at the rate of 500 rpm under a stream of nitrogen gas at 180° C. for 5 hours.

The reaction solution was treated in the same manner as in Example 1 to obtain 36.3 g of polyimide powder. The inherent viscosity was 0.4. The thermal decomposition temperature was 539° C. The glass transition temperature was observed at 350° C. by the DSC measurement. The infrared absorption spectrum showed the characteristic absorption peaks of imide at 722, 1370, 1726 and 1780 cm$^{-1}$.

A membrane was prepared in the same manner as in Example 14 and gas permeabilities for $CO_2$ and $CH_4$ were measured and the results are shown in Table 7. Gas permeability —100, a pressurized gas permeability measuring instrument (made by Nippon Bunko) was used at room temperature (17-18° C.) under 1 Kg pressure difference. The pressure at the lower pressure side was atmospheric. As seen from Table 7, a high permeability for $CO_2$ and a high selectivity for $CO_2/CH_4$ were obtained.

TABLE 7

| Sample | $P_{CO}$ Permeability | $P_{CH_4}$ Permeability | $P_{CO}/P_{CH_4}$ |
| --- | --- | --- | --- |
| Example 59 | 3610 | 81.1 | 45 |
| Example 60 | 2000 | 67.4 | 30 |
| Example 3 | 2040 | — | — |

EXAMPLE 61

The procedure employed was substantially the same as that of Example 51.

7.36 g (25 millimols) BPDA, 7.84 g (22.5 millimols) FDA, 50 g M solution, 16 g resorcinol and 2 g (25 millimols) pyridine were used. The solution was heated at 80° C. for one hour, at 140° C. for one hour and at 180° C. for one hour with agitation in a stream of nitrogen gas. Then the reaction solution was cooled in air and added with 6.49 g (15 millimols) bis[4-(4-aminophenoxy)phenyl]sulfone, 10 g M solution and 10 ml toluene. The reaction solution thus prepared was heated at 140° C. for one hour and at 180° C. for one hour with agitation under a stream of nitrogen gas. The reaction solution was cooled in air and then added with 3.68 g (12.5 millimols) BPDA and 30 g M solution and heated at 140° C. for 40 minutes and at 380° C. for one hour with agitation in a stream of nitrogen gas. The reaction solution thus obtained was poured into an excess amount of methanol. As a result, 32.3 g of polyimide powder was obtained.

This polyimide powder was dissolved in a mixture of M solution and resorcinol at a weight ratio of 10:3 under heating to prepare a 10 wt.% solution of the polyimide. This solution was cast on a glass plate and dried at 120° C. for one hour and at 150° C. for one hour under reduced pressure to give a polyimide film.

EXAMPLE 62

The procedure employed was substantially the same as that of Example 50. 10.9 g (50 millimols) PMDA, 13.0 g (25 millimols) HFBAPP, 100 g M solution and 4 g pyridine were used. The solution was agitated in a stream of nitrogen gas at room temperature for 30 minutes and at 160° C. for two hours under heating. Then the reaction solution was cooled in air and added with 8.71 g (25 millimols) FDA and 10 ml toluene. The reaction solution thus prepared was agitated in a stream of nitrogen at room temperature for one hour and at 190° C. for 3 hours under heating. Then the reaction solution was poured into an excess amount of methanol to give precipitates, and these precipitates were dried to give 30.7 g of polyimide powder. This polyimide powder was dissolved in a mixture solution of M solution and resorcinol at a weight ratio of 10:3 under heating to prepare a 5 wt.% solution of the polyimide. The solution thus prepared was cast on a glass plate and dried at 120° C. for one hour and at 150° C. for one hour under reduced pressure to give a polyimide film.

What is claimed is:

1. A tri-component polyimide composition comprising one of the repeating units represented by formulae (I), (II), (III),

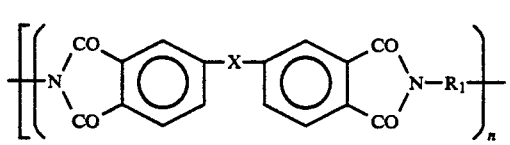
(I)

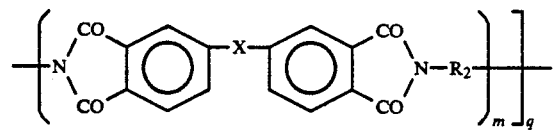
(II)

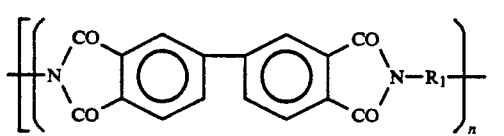
(III)

wherein
$R_1$ is a first aromatic diamine whose amino groups are deleted;
$R_2$ is a second aromatic diamine whose amino groups are deleted;
X is —CO—, —O—, —S—, —SO$_2$—, —C(CH$_3$)$_2$—,

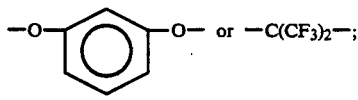
or —C(CF$_3$)$_2$—;

n integer of 1 to 4 and the content of the segment of n equal to 1 is at least 70%;
m is an integer of 1 to 6 and;
q is an integer of 10 to 100; and the tri-component polyimide having a molecular weight of 50,000 to 200,000, based on the standard polystyrene molecular weight.

2. A tri-component polyimide composition comprising one of the repeating units represented by formulae (I)', (II)' and (III)'.

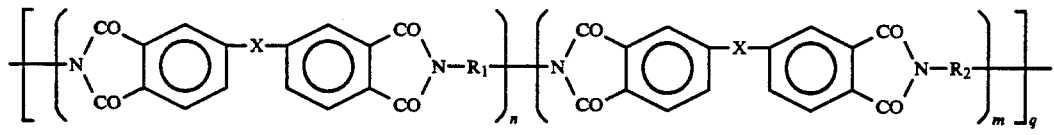
(I)'

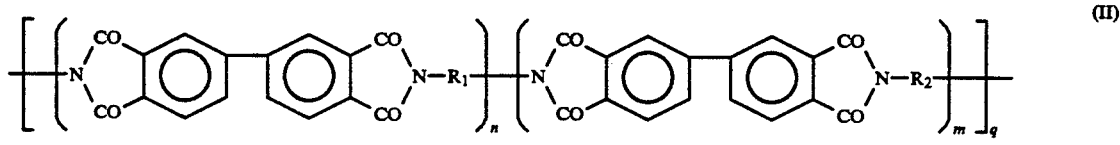
(II)'

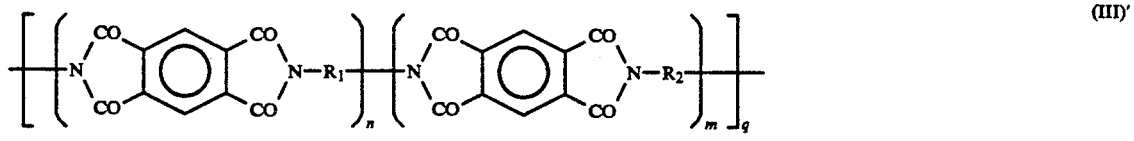
(III)' wherein
$R_1$ is a first aromatic diamine whose amino groups are deleted;
$R_2$ is a second aromatic diamine whose amino groups are deleted;

X is —CO—, —O—, —S—, —SO$_2$—, —C(CH$_3$)$_2$—,

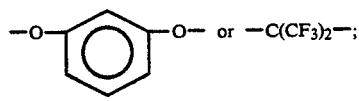 or —C(CF$_3$)$_2$—;

n an integer of 1 to 3 and the content of the segment of n equal to 1 is at least 80%,
m is an integer of 2 to 20; and
q is an integer of 10 to 100; and
the tri-component polyimide having a molecular weight of 50,000 to 400,000, based on the standard polystyrene molecular weight.

3. A tri-component polyimide composition comprising one of the repeating units represented by formulae (I)″, (II)″, and (III)″,

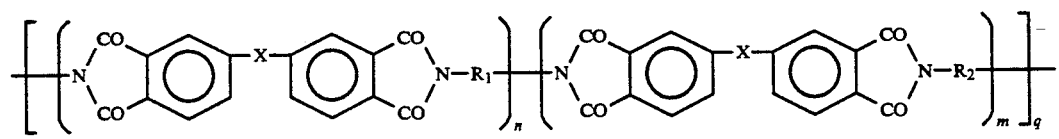 (I)″

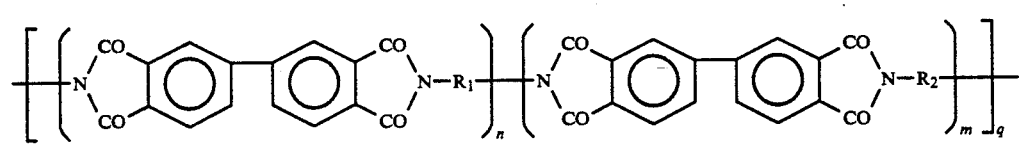 (II)″

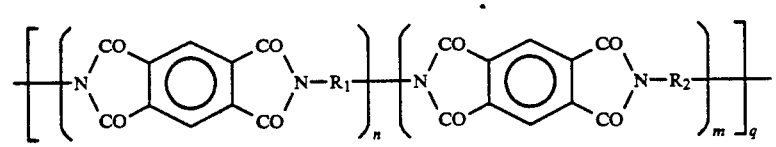 (III)″ wherein
R$_1$ is a first aromatic diamine whose amino groups are deleted;
R$_2$ is a second aromatic diamine whose amino groups are deleted;
X is —CO—, —O—, —S—, —SO$_2$—, —C(CH$_3$)$_2$—,

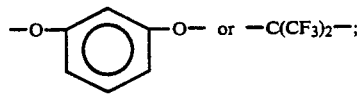 or —C(CF$_3$)$_2$—;

n is an integer of less than 5;
m is an integer of less than 100; and
q is an integer of 2 to 20; and
the tri-component polyimide having a molecular weight of 50,000 to 500,000, based on the standard polystyrene molecular weight.

4. A process for producing a tri-component polyimide composition of claim 1 which comprises reacting one part by mol of one of the acid dianhydrides represented by the formulae

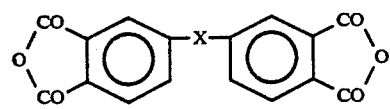

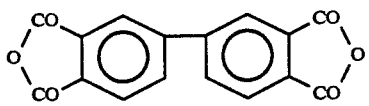

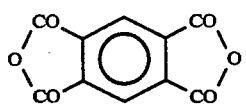

wherein X is the same as defined in claim 1, with ⅓ to ⅛ part by mol of a first aromatic diamine in a reaction medium comprising phenol and at least one compound selected from the group consisting of resorcinol, 2,6-dimethylphenol and 4-methoxyphenol at a temperature of from 100° C. to 250° C. to directly form an imide compound in one step, and reacting the imide compound with a second aromatic diamine in such an amount that the mol ratio of the acid dianhydride employed to the total amount of the first aromatic diamine employed and the second aromatic diamine is 1:0.95–1.05 in the reaction medium at the temperature to conduct direct imidization in one step.

5. A process for producing a tricomponent polyimide composition of claim 2 which comprises reacting one part by mol of one of the acid dianhydrides represented by the formulae

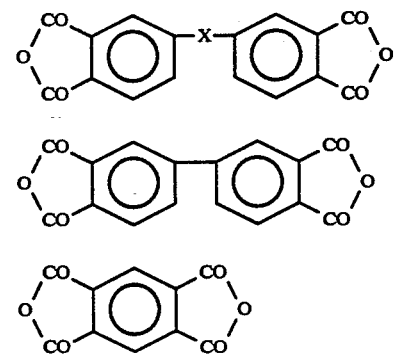

wherein X is the same group as defined in claim 2, with 1/3 to 1/8 part by mol of a first aromatic diamine in a reaction medium comprising phenol and at least one compound selected from the group consisting of resorcinol, 2,6-dimethylphenol and 4-methoxyphenol at a temperature of from 100° C. to 250° C. to directly form an imide compound with a second aromatic diamine in such an amount that the mol ratio of the acid dianhydride employed to the total amount of the first aromatic diamine employed and the second aromatic diamine is 1:09.5–1.05 in the reaction medium at the temperature to carry out direct imidization in one step.

6. A process for producing the tricomponent polyimide composition according to claim 3, which comprises reacting 10 parts by mol of an acid dianhydride selected from the group consisting of the compounds represented by the formula:

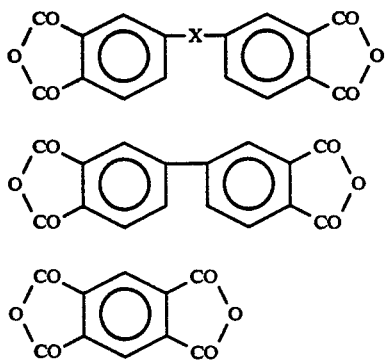

wherein X is the same as defined in claim 3, with 10.5 to 12 parts by mol of a first aromatic diamine in a reaction medium comprising phenol and at least one compound selected from the group consisting resorcinol, 2,6-dimethylphenol and 4-methoxyphenol at a temperature of from 100° C. to 250° C. to directly form an imide compound in one step, reacting the imide compound with 5 to 30 parts by mol of the acid dianhydride in the reaction medium to the temperature to form an imide oligomer whose terminal groups are acid anhydride groups, and reacting the imide oligomer with a second aromatic diamine in such an amount that the mol ratio of the total amount of the acid dianhydride employed to the total amount of the first aromatic diamine employed and the second aromatic diamine is 1:0.95–1.05 in the reaction medium at the temperature to carry out direct imidization in one step.

7. A process for producing a tricomponent polyimide composition of claim 3 which comprises reacting 10 parts by mol of an acid dianhydride selected from the group consisting of the compounds represented by the formula:

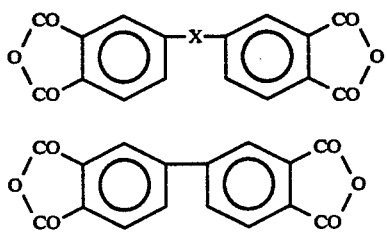

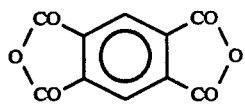

wherein X is the same as defined in claim 3, with 8 to 9.5 parts by mol of a first aromatic diamine in a reaction medium comprising phenol and at least one compound selected from the group consisting of resorcinol, 2,6-dimethylphenol and 4-methoxyphenol at a temperature of from 100° C. to 250° C. to directly form an imide compound in one step, reacting the imide compound with 5 to 30 parts by mol of a second aromatic diamine in the reaction medium at the temperature to form an imide oligomer whose terminal groups are acid anhydride groups, and reacting the imide oligomer with the acid dianhydride in such an amount that the mol ratio of the total amount of the first aromatic amine employed and the second aromatic amine employed to the total amount of the acid dianhydride employed and the acid dianhydride is 0.95–1.05:1 in the reaction medium at the temperature to carry out direct indication in one step.

8. The process of any one of claims 4 to 7, wherein the reaction medium comprises phenol and 4-methoxyphenol.

9. The process of claim 8, wherein the reaction medium further comprises resorcinol.

10. The process of any one of claims 4 to 7, wherein the reaction medium comprises phenol and 2,6-dimethylphenol.

11. The process of claim 10, wherein the reaction medium further comprises resorcinol.

12. The process of any one of claims 4 to 7, wherein the reaction medium comprises phenol and resorcinol.

13. The process of any one of claim 4 to 7, wherein the reaction is carried out in the presence of a base selected from the group consisting of pyridine picoline, triethylamine, methylmorpholine and hexamethylenetetramine.

14. The process of claim 13, wherein the amount of the base is 0.1 to 1 mol per mol of the acid dianhydride.

15. The process of claim 13, wherein the compound is pyridine.

16. The process of any one of claims 4 to 7, wherein the reaction medium comprises a hydrocarbon.

17. The process of claim 16, wherein the hydrocarbon is a compound selected from the group consisting of toluene, xylenes and octanes.

18. The process of claim 17, wherein the hydrocarbon is toluene.

19. A separation membrane prepared from the tricomponent polyimide composition of claim 1.

20. A separation membrane prepared from the tricomponent polyimide composition of claim 2.

21. A separation membrane prepared from the tricomponent polyimide composition of claim 3.

22. The separation membrane of claim 20, wherein the acid dianhydride is 5,5'-[2,2,2-trifluoro-1-(trifluoromethyl)ethylidene-bis-1,3-isobenzeofuran-dione and the first aromatic diamine is 9,9-bis(4-amino phenyl) fluorene.

23. The separation membrane of claim 20, wherein the acid dianhydride is 5,5'-[2,2,2-trifluoro-1-(trifluoromethyl)ethylidene-bis-1,3-isobenzeofuran-dione one of the first aromatic diamines and the second aromatic diamine is 9,9-bis(4-aminophenyl)fluroene and the other is 2,2-bis[4-(4-aminophenoxy)phenyl]hexafluoropropane.

* * * * *

UNITED STATES PATENT AND TRADEMARK OFFICE
CERTIFICATE OF CORRECTION

PATENT NO. : 5,202,411

DATED : April 13, 1993

INVENTOR(S) : Hiroshi Itatani

It is certified that error appears in the above-identified patent and that said Letters Patent is hereby corrected as shown below:

Column 48:

In Claim 7, page 48, line 24, delete "indication" and add -- imidization --.

Signed and Sealed this

Twenty-first Day of December, 1993

Attest:

BRUCE LEHMAN

Attesting Officer

Commissioner of Patents and Trademarks